(12) United States Patent
Sasabe et al.

(10) Patent No.: US 6,362,243 B1
(45) Date of Patent: Mar. 26, 2002

(54) METHOD FOR PRODUCTION OF POROUS CROSS-LINKED POLYMER

(75) Inventors: Masazumi Sasabe, Kakogawa; Katsuhiko Sakamoto, Takatsuki; Hiroshi Yamazaki, Sakai; Koichi Yonemura, Suita; Kenji Kadonaga, Takatsuki; Akiko Mitsuhashi, Sanda; Kazutomo Takahashi, Moriyama; Kozo Nogi, Kakogawa; Kenji Minami, Otsu, all of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/658,171

(22) Filed: Sep. 8, 2000

(30) Foreign Application Priority Data

Sep. 8, 1999 (JP) .......................................... 11-254063
Nov. 4, 1999 (JP) .......................................... 11-314397

(51) Int. Cl.$^7$ ................................. C08J 9/28; C08J 9/36
(52) U.S. Cl. ........................................ 521/64; 521/918
(58) Field of Search ................................. 521/64, 918

(56) References Cited

FOREIGN PATENT DOCUMENTS

| EP | 0 537 053 A1 | 4/1993 | ......... C08F/220/04 |
|----|--------------|--------|----------------------|
| JP | 52-66591 | 6/1977 | ............. C08F/2/32 |
| JP | 0 537 053 B1 | 2/2000 | ............. C08F/2/32 |
| JP | 2000-44611 | 2/2000 | ............. C08F/2/32 |
| WO | WO 97/27240 | 7/1997 | ............. C08J/9/28 |
| WO | WO 97/37745 | 10/1997 | ........... B01D/39/08 |

OTHER PUBLICATIONS

Bhumgara, "Polyhipe Foam Materials as Filtration Media", Filtration & Separation 245–251, 1995.

*Primary Examiner*—Morton Foelak
(74) *Attorney, Agent, or Firm*—Fish & Richardson P.C.

(57) ABSTRACT

This invention has for an object thereof the provision of a method for the production of a porous cross-linked polymer which can freely control the upper and lower surface behavior of the porous cross-linked polymer, the width and the thickness of the polymer and can perform continuously a process ranting from a step of supplying the emulsion through a step of polymerizing it.

The object of this invention, in the production of a porous cross-linked polymer by polymerizing a water-in-oil type high internal phase emulsion, is accomplished by a method for the production of a porous cross-linked polymer characterized by performing continuously a process ranting from a step of supplying the emulsion through a step of polymerizing it while having the outer surface part of the emulsion retain an atmosphere or a state having a lower oxygen content than the ambient air.

11 Claims, 20 Drawing Sheets

Direction of travel of HIPE

Direction of travel of HIPE

Direction of travel of HIPE in the case of $\theta' = 90°$

METHOD FOR PRODUCTION OF POROUS CROSS-LINKED POLYMER

TECHNICAL FIELD

This invention relates to a method for the production of a porous cross-linked polymer which carries out continuously the component steps thereof ranging from a step of supplying a water-in-oil type high internal phase emulsion (hereinafter referred to briefly as "HIPE") through the step of performing polymerization thereof in the production of the porous cross-linked polymer, preferably a porous cross-linked polymer having continuous cells having communicating pores formed in the surface and the interior thereof (hereinafter referred to also as "open cells") by the polymerization of HIPE. More particularly, this invention relates to a method for the production of a porous cross-linked polymer which carries out continuously the component steps thereof ranging from a step of supplying the HIPE through a step of polymerizing the HIPE, and can be widely applied to (1) liquid absorbent materials such as, for example, ① core materials in disposable diapers to be used for absorbing water and excrements including urine; and ② agents for disposing of a waste oil and agents for disposing a waste solvent to be used for absorbing oils and organic solvents; (2) energy absorbent materials such as, for example, sound insulating materials and heat insulators in automobiles and buildings to be used for absorbing sound and heat; and (3) chemical impregnating substrates such as, for example, products of toiletry goods impregnated within aromatic agent, a detergent, a lustering agent, a surface protecting agent, and a flame-retarding agent. Further, this invention aims at providing a method for the production of a porous cross-linked polymer which, by selecting the quality of the material for the part destined to be exposed to the HIPE during the course of polymerization, is endowed with a structure having continuous cells (open cells) having communicating pores formed in the surface and the interior of the porous cross-linked polymer, has an improved liquid-passing speed, a liquid-absorbing ratio, and a liquid-absorbing capacity, and is awarded ample freedom in the selection of the composition of HIPE, the device for polymerization, and the conditions of polymerization.

BACKGROUND

Methods for producing a porous cross-linked polymer by polymerizing the HIPE are disclosed in WO-A-97-27240 and WO-A-97-37745, for example.

WO-A-97-27240 discloses as a method for producing a porous cross-linked polymer by the polymerization of the HIPE through the medium of a film a method for the combined continuous-batch polymerization which comprises continuously filling the HIPE in a vertical (perpendicular) ribbon-like zippered bag of resinous film, reeling the filled bag, and polymerizing the HIPE in the bag batchwisely. It further discloses an operation of slicing the porous cross-linked polymer. It also contains a description to the effect that polypropylene (PP) is a preferred material for the film because it is sparingly adhesive to the porous cross-linked polymer, inexpensive, and capable of being recycled.

Then, WO-A-97-37745 discloses a method for producing a porous cross-linked polymer by coating the HIPE on the surface of a porous substrate (such as a felt), allowing at least a part of the HIPE to impregnate the porous substrate, and polymerizing the HIPE lodged in the substrate. It further discloses the necessity for polymerizing the HIPE as held in contact with such a polar material as PET, glass, or water for the purpose of endowing the porous cross-linked polymer with open cells.

Z. Bhumgara (Filtration & Separation, March, 1995, 245–251) describes the fact that in a copolymer of styrene and divinylbenzene, a porous cross-linked polymer with open cells is obtained by using PET, nylon 66, glass, or steel.

The method for polymerizing the HIPE which is disclosed in the official gazette of WO-A-97-27240, however, has the possibility of suffering the bag packed with the HIPE to acquire a larger thickness in the lower part thereof after the elapse of time from the packing operation and yet allowing the uniformity of thickness thereof to be upped to a certain extent by the subsequent reeling operation. Since the product of this method tends to give an increased thickness to the lower part thereof because of the weight of the HIPE itself and, worse still, tends to induce vertical deviation and separation of the oil phase and the liquid phase, it entails problems such as imposing limits on height (width) and thickness, rendering retention of uniformity of thickness, performance, and quality difficult, and permitting no free control of width and thickness. Further, since the operations ranging from packing the bag with the HIPE through polymerizing the packed HIPE cannot be continuously carried out and consequently the successive stages from the continuous step of packaging the bag with the HIPE through the batch step of polymerizing the HIPE in the bag constitute themselves rate-governing processes, the product has the problem of failing to make the most of the advantage of a continuous packing process. Further, since the method uses a bag made of film and, therefore, obtains exclusively a porous cross-linked polymer unique in terms of property, it entails the problem of failing to obtain a porous cross-linked polymer having different properties on the opposite surfaces thereof.

Though the official gazette of WO-A-97-37745 mentioned above has a description to the effect that the polymerization may be carried out by a batch operation or a continuous operation, whichever may fit the occasion better, it has absolutely no specific suggestion as to a method for continuous production of a HIPE using jointly a porous substrate and a polar material.

It is, therefore, an object of this invention to provide a method for the production of a porous cross-linked polymer which allows the produced porous cross-linked polymer to acquire a controlled surface property, permits free control of the width and the thickness of the polymer to be produced, and enables the operations ranging from supplying the HIPE through polymerizing the HIPE to be carried out continuously.

Further, the invention disclosed in the official gazette of WO-97-27240 neither contemplates selecting a film in view of durability at elevated temperature nor takes into due consideration the property fit for cyclic use of the product. The films disclosed by the prior inventions mentioned above use materials of limited quality. Such prior inventions have absolutely no specific suggestion about selecting a film which is excellent in durability fit for polymerization at elevated temperature (such as resistance to heat, resistance to monomer, resistance to hydrolysis, and suitability for cyclic use) and capable of controlling the surface properties (smoothness, capability of forming a texture with open cells, resistance to preclude formation of pinholes, and property of forming voids) of the produced porous cross-linked polymer.

Further, Z. Bhumgara (Filtration & Separation, March, 1995, 245–251) describes that a copolymer of styrene and divinylbenzene, by using PET, nylon 66, glass, or steel, is enabled to produce a porous cross-linked polymer with open cells. The PET is caused as by calcium chloride contained as a constituent component in the HIPE to succumb readily to hydrolysis with an alkaline water-phase component and this trend of the PET is particularly conspicuous when the temperature of polymerization is high. The nylon has a high water absorbing property and shows a phenomenon of swelling and consequently inducing a dimensional variation. The glass is brittle and deficient in heat transfer. The steel forms rust.

The official gazette contains no mention of a material which forms open cells during the copolymerization of a monomer mixture containing an acrylic ester. Neither does it contain any mention of continuous sheet polymerization.

It is another object of this invention, therefore, to provide a method for the production of a porous cross-linked polymer which, by selecting a sheet material containing a film capable of controlling the surface property of a porous cross-linked polymer to be produced, is enabled to fit the sheet material containing the film for repeated use, promise a reduction in cost, and render the property characteristic.

Then, the official gazette of WO-A-97-27240 has absolutely no specific suggestion of a slice method which enables a process ranging from a step of supplying the HIPE through a step of polymerizing it to a step of slicing the polymerized HIPE to be carried out continuously.

It is yet another object of this invention, therefore, to provide a method for the production of a porous cross-linked polymer which enables a process ranging from a step of supplying the HIPE through a step of slicing the polymerized HIPE to be carried out continuously.

DISCLOSURE OF THE INVENTION

The present inventors, after pursuing a diligent study in search of a novel method for the production of a porous cross-linked polymer which allows a process ranging from a step of supplying the HIPE through a step of polymerizing the HIPE (and further slicing the polymerized HIPE) to be carried out continuously, have perfected this invention.

Specifically, when the present inventors tried a method for producing a porous cross-linked polymer by continuously carrying out a process ranging from a step of supplying the HIPE through a step of polymerizing it (and further slicing the polymerized HIPE), they found this method to entail many problems such as giving rise to a part not thoroughly hardened and suffered to remain in the form of soft cream (or yogurt) notwithstanding the process ranting from the step of supplying the HIPE through the step of polymerizing this HIPE was carried out continuously and the heat treatment was performed at the prescribed hardening temperature for the prescribed length of time and suffering the produced porous cross-linked polymer to sustain in the surface part thereof pinholes and voids resembling pockmarks because the polymer separated water when the HIPE used therein had a W/O ratio reaching a level of some tens to some hundreds or because the polymer, when hardened, emitted free water. Thus, the inventors having published the official gazette of WO-A-97-27240 probably continued such experiments to find that the numerous problems attendant on the method of combination continuous and batch polymerization as contemplated by the invention disclosed in WO-A-97-27240 could be solved by continuously performing the process ranging from the step of supplying the HIPE through the step of polymerizing it (and further slicing the polymerized HIPE) and nevertheless could not do anything more than developing the method of combination continuous and batch polymerization because they failed to solve the technical problems inherent in an attempt to perform continuously the process ranging from the step of supplying the HIPE through the step of polymerizing it (and further slicing the polymerized HIPE). The invention disclosed in the official gazette of WO-A-97-37745 mentioned above, similarly to the invention disclosed in the official gazette of WO-A-97-27240, probably could not offer any specific suggestion on a continuous process of manufacture of the HIPE because the technical problems inherent in an attempt to perform continuously the process ranging from the step of supplying the HIPE through the step of polymerizing it (and further slicing the polymerized HIPE) could not be solved.

In the circumstances, the present inventors were convinced that the method of performing continuously a process ranging from the step of supplying the HIPE through the step of polymerizing it (and further slicing the polymerized HIPE) which remained yet to be developed was the only way of solving the technical problems inherent in a method for combination continuous and batch polymerization and, based on this belief, continued a diligent study with a view to solving such new technical problems as might arise from continuing the process (till the step of slicing the polymer). This invention has been perfected as a result.

To be specific, the problems of this invention are accomplished by the following items (1)–(14).

(1) A method for the production of a porous cross-linked polymer by the polymerization of a water-in-oil type high internal phase emulsion, characterized by causing the outer surface part of said emulsion by means for decreasing an oxygen content to assume an atmosphere or a state having a lower oxygen content than an ambient air and performing continuously a process ranging from a step of supplying said emulsion through a step of polymerizing said emulsion.

(2) A method for the production of a porous cross-linked polymer according to (1) above, wherein said means for decreasing the oxygen content of the outer surface part of the emulsion comprises at least one member selected from the group consisting of:

(A) a means for decreasing an oxygen content by using a gas which represses or prevents the contact of the ambient air with said emulsion by replacing a part or whole of the ambient air contacting with the outer surface part of said emulsion with a gas having a lower oxygen content than the ambient air;

(B) a means for decreasing an oxygen content by using a liquid which represses or prevents the contact of the ambient air with said emulsion by forming a liquid layer or a liquid film on the outer surface part of said emulsion with a liquid exerting no influence on the polymerization; and (C) a means for decreasing an oxygen content by using a solid which represses or prevents the contact of the ambient air with said emulsion by forming a solid layer on the outer surface part of said emulsion with a solid capable of decreasing or nullifying the oxygen-contacting content.

(3) A method according to (2) mentioned above, wherein the means for decreasing the oxygen content by using a gas as set forth in (A) above is means for preventing the contact of the ambient air with the HIPE by having nitrogen gas replace the whole ambient air contacting the outer surface part of the emulsion.

(4) A method according to (2) or (3) mentioned above, wherein the means for decreasing the oxygen content by using a liquid as set forth in (B) above is means for preventing the contact of the ambient air with the emulsion by having an aqueous solution incapable of affecting polymerization form a water layer on the outer surface part of the emulsion.

(5) A method according to any of (2)–(4) mentioned above, wherein the means for decreasing the oxygen content by using a solid as set forth in (C) above is means for repressing or preventing the contact of the ambient air with the emulsion by having a sheet form a sheet layer on the outer surface part of the emulsion.

(6) A method according to (2) above, wherein the means for decreasing the oxygen content of the outer surface part of the emulsion is formed by combining means for preventing the contact of the ambient air with the emulsion by having nitrogen gas replace the whole of the ambient air contacting the outer surface part of the emulsion and means for repressing or preventing the contact of the ambient air with the emulsion by having a sheet form a sheet layer on the outer surface part of the emulsion.

(7) A method according to (2) above, wherein the means for decreasing the oxygen content of the outer surface part of the emulsion is formed by combining means for preventing the contact of the ambient air with the emulsion by having an aqueous solution incapable of affecting polymerization form a water layer on the outer surface part of the emulsion and means for repressing or preventing the contact of the ambient air with the emulsion by having a sheet form a sheet layer on the outer surface part of the emulsion.

(8) A method according to (2) above, wherein the means for decreasing the oxygen content of the outer surface part of the emulsion is formed by comprising means for repressing or preventing the contact of the ambient air with the emulsion by having a sheet form a sheet layer on the outer surface part of the emulsion.

(9) A method according to (2) above, wherein the gas permeability of said sheet layer formed on the outer surface part of said emulsion as the means for decreasing an oxygen content by using a sheet set forth in said means (C) is not more than 100 $cm^3/cm^2 \cdot s$.

(10) A method according to any of (1)–(9) above, wherein the sheet set forth in (C) above to be used as the sheet layer formed on the outer surface part of the emulsion as means for decreasing the oxygen content is one member or a combination of two or more members selected from the group consisting of ① at least one sheet material selected from the group consisting of a film, a non-woven fabric and a woven fabric, ② an endless belt and/or a band-shaped plate made of a metal and/or a resin, ③ an endless belt and/or a band-shaped plate made of a metal and using said sheet material on the surface thereof destined to contact with the outer surface part of said emulsion, and ④ an endless belt and/or a band-shaped plate made of a resin and using said sheet material on the surface thereof destined to contact with the outer surface part of said emulsion.

(11) A method according to any one of (2)–(10) above, wherein said sheet is formed of at least one material selected from the group (I) consisting of a fluorine resin, a silicone resin, heat-resistant resins, thermoplastic polyester resins, and thermoplastic polyester type elastomer resins, and/or is coated with at least one material selected from said group (I).

(12) A method according to any one of claims (2)–(11) above, wherein said sheet is formed of at least one material selected from the group (II) consisting of a fluorine resin, a silicone resin, polyimide, polyphenylene sulfide, polysulfone, polyether sulfone, polyether imide, polyether ether ketone, polybutylene terephthalate, polyethylene naphthalate, polybutylene naphthalate, polycyclohexane terephthalate, and stainless steel or is coated with at least one material selected from said group (II).

(13) A method according to any of (1)–(12) above, wherein a process ranging from a step of supplying the emulsion through a step of polymerizing the emulsion is continuously carried out in a horizontal line.

(14) A method according to any one of (2)–(13) above, wherein said means for decreasing an oxygen content by using a sheet set forth in said means (C) is characterized by the facts that:
  (1) said sheet to be used on the outer surface part of said emulsion is one member or a combination of two or more members selected from the group consisting of ① endless belts and ② endless belts made of a metal or a resin and using said sheet material on the surface thereof contacting with the outer surface part of said emulsion and
  (2) said endless belt has the temperature thereof adjusted with a hot water shower:

(15) A method according to any of (1)–(14) above, which further comprises a step of continuously slicing a porous cross-linked polymer obtained by polymerization.

The present inventors have further discovered a novel material which is free from the defects found in the porous cross-linked polymer with open cells proposed by Z. Bhumgara (Filtration & Separation, March 1995, 245–251) and the official gazette of WO-A-97-27240 (Shell Oil Company) and capable of imparting open cells to the surf ace of a porous cross-linked polymer obtained by polymerizing HIPE. Specifically, they have found that fluorine resins such as polytetrafluoroethylene, tetrafluoroethylene-hexafluoropropylene copolymer, and tetrafluoroethylene-perfluoroalkylvinyl ethers, silicone resins such as dimethyl polysiloxane, dimethyl siloxane-diphenyl siloxane copolymer, and thermosetting silicone resin, heat-resistant resins such as polyimide, polyphenylene sulfide, polysulfone, polyether sulfone, polyether imide, and polyether ether ketone, antihydrolytic polyesters such as polybutylene terephthalate, polyethylene naphthalate, polybutylene naphthalate, polycyclohexane terephthalate, and polycyclohexane terephthalate, and stainless steel are materials which can accomplish the objects of this invention. They have further acquired a knowledge that these materials abound in resistance to heat, resistance to hydrolysis, resistance to water, toughness, and resistance to corrosion, impose sparing restrictions on the composition of HIPE and the conditions of polymerization, and prove suitable as materials for an apparatus for polymerization. This invention has been perfected on the basis of this knowledge.

Specifically, still another object of this invention consists in providing (16) a method for the production of a porous cross-linking agent formed by polymerizing HIPE and possessed of open cells, which method is characterized by the fact that the part of an apparatus for polymerization destined to contact the HIPE is formed of at least one material selected from the group consisting of fluorine resin, silicone resin; polyimide, polyphenylene sulfide, polysulfones, polyether sulfone, polyether imide, polyether ether ketone; polybutylene terephthalate, polyethylene naphthalate, polybutylene naphthalate, polysiloxane terephthalate; and stainless steel and/or is coated with at least one of these materials.

Yet another object of this invention consists in providing (17) a method for the production of a porous cross-linked polymer set forth in (16) above, wherein the monomer composition contained in the HIPE mentioned above contains as an essential component a (meth)acrylic ester.

BEST MODE FOR EMBODYING THE INVENTION

Figure 1A:
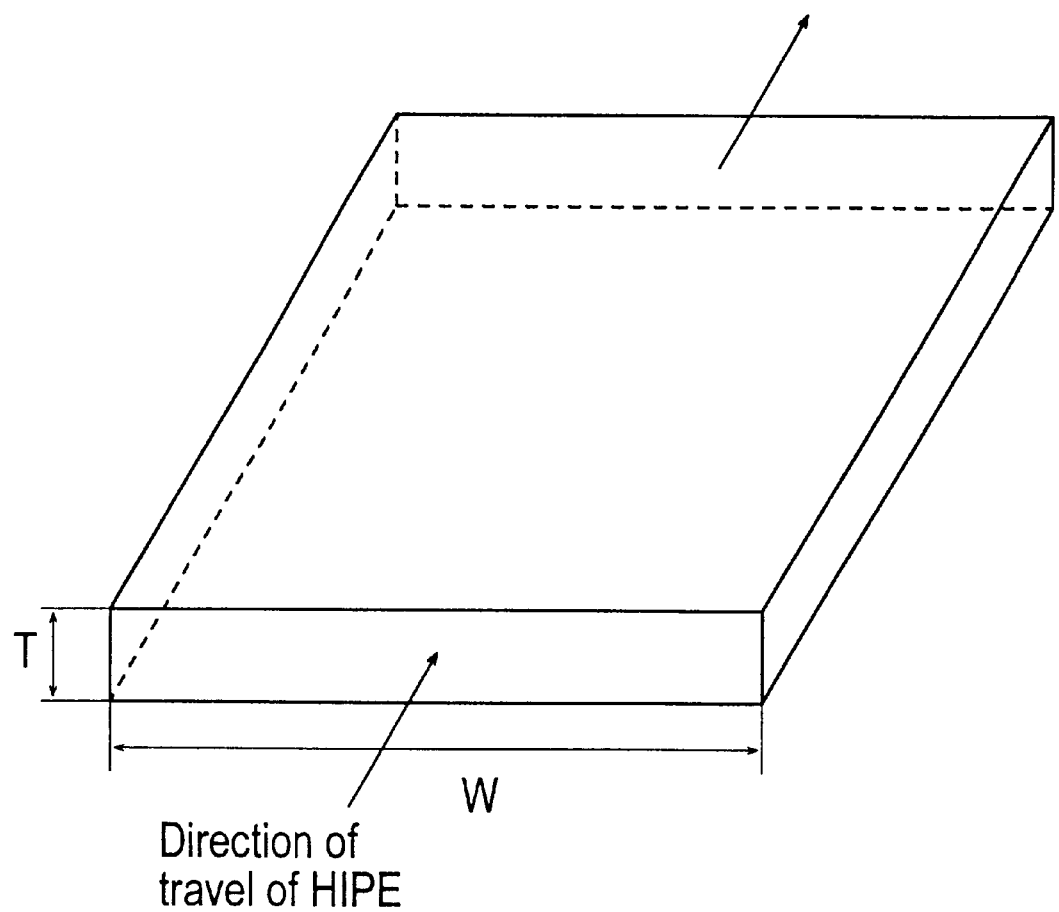
FIG. 1(A) is a schematic diagram illustrating a typical preferred embodiment of a system used in continuously performing a process ranging from a step of supplying HIPE through a step of polymerizing the HIPE in such a manner that the cross-sectional shape of the system perpendicular to the direction of travel of the HIPE may satisfy the relation, $T/W \leq 1$.

This invention concerns a method for the production of a porous cross-linked polymer by the polymerization of a HIPE, which method is characterized by causing the outer surface part of the HIPE by means for decreasing the oxygen content to assume an atmosphere or a state having a lower oxygen content than the ambient air and performing continuously a process ranging from a step of supplying the HIPE through a step of polymerizing it.

Now, the component steps of the method of this invention for the production of a porous cross-linked polymer will be described below in the order of their occurrence.

[I] Raw material (HIPE)

(1) Composition of HIPE

First, the HIPE which can be used in the method of this invention for the production of a cross-linked polymer does not need to be particularly restricted but may be suitably selected from the species well known heretofore. Specifically, the composition of the HIPE has only to contain as essential components thereof (a) a polymerizing monomer containing one polymerizing unsaturated group in the molecule thereof, (b) a monomer composition formed of a cross-linking monomer possessing at least two polymerizing unsaturated groups in the molecule thereof, (c) a surfactant, (d) water, and (e) a polymerization initiator and, when necessary, may contain (f) salt and (g) other additives as arbitrary components thereof.

(a) Polymerizing monomer containing one polymerizing unsaturated group in the molecule thereof.

The monomer composition essential for the composition of the HIPE mentioned above is a polymerizing monomer possessing one polymerizing unsaturated group in the molecule thereof. Though it does not need to be particularly discriminated but has only to be capable of being polymerized in a dispersion or a water-in-oil type high internal phase emulsion and allowed to form an emulsion consequently. It preferably contains a (meth)acrylic ester at least partly, more preferably contains not less than 20 mass % of the (meth) acrylic ester, and particularly preferably contains not less than 35 mass % of the (meth)acrylic ester. When the (meth)acrylic ester is contained as a polymerizing monomer possessing one polymerizing unsaturated group in the molecule thereof proves advantageous because the produced porous cross-linked polymer abounds in flexibility and toughness.

As concrete examples of the polymerizable monomer which is used effectively in this invention, allylene monomers such as styrene; monoalkylene allylene monomers such as ethyl styrene, α-methyl styrene, vinyl toluene, and vinyl ethyl benzene; (meth)acrylic esters such as methyl (meth)acrylate, ethyl (meth)acrylate, butyl (meth)acrylate, isobutyl (meth)acrylate, isodecyl (meth)acrylate, 2-ethylhexyl (meth)acrylate, lauryl (meth)acrylate, stearyl (meth)acrylate, cyclohexyl (meth)acrylate, and benzyl (meth)acrylate; chlorine-containing monomers such as vinyl chloride, vinylidene chloride, and chloromethyl styrene; acrylonitrile compounds such as acrylonitrile and methacrylonitrile; and vinyl acetate, vinyl propionate, N-octadecyl acrylamide, ethylene, propylene, and butene may be cited. These polymerizable monomers may be used either singly or in the form of a combination of two or more members.

The content of the polymerizing monomer is preferred to be in the range of 10–99.9 mass %, based on the total mass of the monomer composition consisting of the polymerizing monomer and a cross-linking monomer. The reason for this range is that the produced porous cross-lined polymer is enabled to acquire pores of minute diameters. The range is more preferably 30–99 mass % and particularly preferably 30–70 mass %. If the content of the polymerizing monomer is less than 10 mass %, the produced porous cross-linked polymer will be possibly friable and deficient in water absorption ratio. Conversely, if the content of the polymerizing monomer exceeds 99.9 mass %, the porous cross-linked polymer consequently produced will be possibly deficient in strength and elastic recovery power and incapable of securing sufficient amount of water absorbed and sufficient velocity of water absorption.

(b) Cross-linking monomer possessing at least two polymerizing unsaturated groups in the molecule.

The other monomer composition essential for the composition of the HIPE mentioned above is a cross-linking monomer possessing at least two polymerizing unsaturated groups in the molecule thereof. Similarly to the polymerizing monomer mentioned above, it does not need to be particularly discriminated but has only to be capable of being polymerized in a dispersion or a water-in-oil type high internal phase emulsion and allowed to form an emulsion consequently.

As concrete examples of the cross-linking monomer which is effectively usable herein, aromatic monomers such as divinyl benzene, trivinyl benzene, divinyl toluene, divinyl xylene, p-ethyl-vinyl benzene, divinyl naphthalene, divinyl alkyl benzenes, divinyl phenanthrene, divinyl biphenyl, divinyl diphenyl methane, divinyl benzyl, divinyl phenyl ether, and divinyl diphenyl sulfide; oxygen-containing monomers such as divinyl furan; sulfur-containing monomers such as divinyl sulfide and divinyl sulfone; aliphatic monomers such as butadiene, isoprene, and pentadiene; and esters of polyhydric alcohols with acrylic acid or methacrylic acid such as ethylene glycol di(meth)acrylate, diethylene glycol di(meth)acrylate, triethylene glycol di(meth) acrylate, polyethylene glycol di(meth)acrylate, 1,3-butane diol di(meth)acrylate, 1,4-butane diol di(meth)acrylate, 1,6-hexane diol di(meth)acrylate, octane diol di(meth)acrylate, decane diol di(meth)acrylate, trimethylol propane di(meth) acrylate, trimethylol propane tri(meth)acrylate, pentaerythritol di(meth)acrylate, pentaerythritol tri(meth)acrylate, pentaerythritol tetra(meth)acrylate, dipentaerythritol di(meth) acrylate, dipentaerythritol tri(meth)acrylate, dipentaerythritol tetra(meth)acrylate, N,N'-methylene bis (meth)acryl amide, triallyl isocyanurate, triallyl amine, tetraallyloxy ethane, hydroquinone, catechol, resorcinol, and sorbitol may be cited. These cross-linking monomers may be used either singly or in the form of a combination of two or more members.

The content of the cross-linked monomer is properly in the range of 0.1–90 mass %, preferably 1–70 mass %, and particularly preferably 30–70 mass %, based on the total mass of the monomer composition consisting of the polymerizing monomer mentioned above and the cross-linking monomer mentioned above. If the content of the cross-linked monomer is less than 0.1 mass %, the produced porous cross-linked polymer will possibly be deficient in strength and elastic recovery force, unable to effect absorption sufficiently per unit volume or unit mass, and incapable of securing absorption in a sufficient amount at a sufficient velocity. Conversely, if the content of the cross-linked monomer exceeds 90 mass %, the porous cross-linked polymer produced consequently will possibly be friable and deficient in water absorption ratio.

(c) Surfactant

The surfactant which is essential for the composition of the HIPE mentioned above does not need to be particularly discriminated but has only to be capable of emulsify a water phase in an oil phase forming the HIPE. It is not limited to the specific examples cited above but may be selected from the nonionic surfactants, cationic surfactants, and amphoteric surfactants heretofore known to the art.

Among these surfactants, as concrete examples of the nonionic surfactant, nonyl phenol polyethylene oxide adduct; block polymer of ethylene oxide and propylene oxide; sorbitan fatty acid esters such as sorbitan monolaurate, sorbitan monomyristylate, sorbitan monopalmitate, sorbitan monostearate, sorbitan tristearate, sorbitan monooleate, sorbitan trioleate, sorbitan sesquioleate, and sorbitan distearate; glycerin fatty acid esters such as glycerol monostearate, glycerol monooleate, diglycerol monooleate, and self-emulsifying glycerol monostearate; polyoxyethylene alkyl ethers such as polyoxyethylene lauryl ether, polyoxyethylene cetyl ether, polyoxyethylene stearyl ether, polyoxyethylene oleyl ether, and polyoxyethylene higher alcohol ethers; polyoxyethylene alkylaryl ethers such as polyoxyethylene nonyl phenyl ether; polyoxyethylene sorbitan fatty acid esters such as polyoxyethylene sorbitan monolaurate, polyoxyethylene sorbitan monomyristylate, polyoxyethylene sorbitan monopalmitate, polyoxyethylene sorbitan monostearate, polyoxyethylene sorbitan tristearate, polyoxyethylene sorbitan monooleate, and polyoxyethylene sorbitan trioleate; polyoxyethylene sorbitol fatty acid esters such as tetraoleic acid polyoxyethylene sorbit; polyoxyethylene fatty acid esters such as polyethylene glycol monolaurate, polyethylene glycol monostearate, polyethylene glycol distearate, and polyethylene glycol monooleate; polyoxyethylene alkyl amines; hydrogenated polyoxyethylene castor oil; and alkyl alkanol amides may be cited. These nonionic surfactants having HLB values of not more than 10, more preferably in the range of 2–6, prove preferable. It is permissible to use two or more such nonionic surfactants in combination. The combined use possibly results in stabilizing the HIPE.

As concrete examples of the cationic surfactant, quaternary ammonium salts such as stearyl trimethyl ammonium chloride, ditallow dimethyl ammonium methyl sulfate, cetyl trimethyl ammonium chloride, distearyl dimethyl ammonium chloride, and alkylbenzyl dimethyl ammonium chloride; alkyl amine salts such as coconut amine acetate and stearyl amine acetate; alkyl betaines such as lauryl trimethyl ammonium chloride, lauryl betaine, stearyl betaine, and lauryl carboxymethyl hydroxyethyl imidazolinium betaine; and amine oxides such as lauryl dimethyl amine oxide may be cited. The use of the cationic surfactant can impart excellent antibacterial properties to the porous cross-linked polymer when the polymer is used for an absorbent material, for example.

The combined use of the nonionic surfactant and the cationic surfactant may possibly improve the HIPE in stability.

The content of the surfactant mentioned above is properly in the range of 1–30 mass parts, preferably 3–15 mass parts, based on 100 mass parts of the total mass of the monomer composition consisting of the polymerizing monomer and the cross-linked monomer. If the content of the surfactant is less than 1 mass part, the shortage will possibly deprive of the HIPE of stability of dispersion and prevent the surfactant from manifesting the effect inherent therein sufficiently. Conversely, if the content of the surfactant exceeds 90 mass parts, the excess will possibly render the produced porous cross-linked polymer unduly friable and fail to bring a proportionate addition to the effect thereof and do any good economically.

(d) Water

The water essential for the composition of the HIPE mentioned above may be purified water or deionized water. Alternatively, with a view to utilizing to advantage the waste water resulting from the production of the porous cross-linked polymer, this waste water may be adopted in its unmodified form or after undergoing a prescribed treatment.

The content of the water may be suitable selected, depending on the kind of use (such as, for example, an absorbent material, sound insulation material, or filter) for which the porous cross-linked polymer possessing continuous cells is intended. For example, it may be decided so that the HIPE may acquire a water phase/oil phase (W/O) ratio required as described herein below.

(e) Polymerization initiator

The polymerization initiator essential for the composition of the HIPE has only to be a polymerization initiator which can be used for reverse-phase emulsion polymerization. It may be soluble in water or in oil, whichever may fit the occasion better. As concrete examples of the polymerization initiator which is used effectively herein, azo compounds such as 2,2'-azobis (2-amidinopropane) dihydrochloride; persulfates such as ammonium persulfate, potassium persulfate, and sodium persulfate; peroxides such as hydrogen peroxide, sodium peracetate, sodium percarbonate, benzoyl peroxide, cumene hydroperoxide, t-butyl hydroperoxide, di-t-butyl peroxide, diisopropyl benzene hydroperoxide, p-methane hydroperoxide, 1,1,3,3-tetramethylbutyl hydroperoxide, 2,5-dimethylhexane-2,5-dihydroperoxide, benzoyl peroxide, and methylethyl ketone peroxide; and redox initiators formed by combining the peroxides mentioned above with such reducing agents as sodium hydrogensulfite, sodium thiosulfate, L-ascorbic acid, iron II salts, formaldehyde, sodium sulfoxylate, glucose, dextrose, and diethanolamine may be cited. These polymerization initiators may be used either singly or in the form of a combination of two or more members.

The content of the polymerization initiator mentioned above is properly in the range of 0.05–15 mass parts, preferably 1.0–10 mass parts, based on 100 mass parts of the total mass of the monomer composition consisting of a polymerizing monomer and a cross-linking monomer, though it is variable with the combination of the polymer composition and the polymerization initiator. If the content of the polymerization initiator is less than 0.05 mass part, the shortage will be at a disadvantage in increasing the amount of the unaltered monomer component and consequently increasing the residual monomer content in the produced porous cross-linked polymer. Conversely, if the content of the polymerization initiator exceeds 15 mass parts, the excess will be at a disadvantage in rendering the polymerization difficult to control and degrading the mechanical property of the produced porous cross-linked polymer.

(f) Salt

The salt as an arbitrary component for the composition of the HIPE mentioned above may be used when it is necessary for improving the stability of the HIPE.

As concrete examples of the salt of this nature, halogenides, sulfates, nitrates, and other similar water-soluble salts of alkali metals and alkaline earth metals such as calcium chloride, sodium sulfate, sodium chloride, and magnesium sulfate may be cited. These salts may be used either singly or in the form of a combination of two or more members. Such a salt is preferred to be added in the water phase. Among other salts mentioned above, polyvalent metal salts prove particularly advantageous from the viewpoint of the stability of the HIPE during the course of polymerization.

The content of the salt mentioned above is proper in the range of 0.1–20 mass parts, preferably 0.5–10 mass parts, based on 100 mass parts. If the content of the salt exceeds 20 mass parts, the excess will be at a disadvantage in suffering the waste water squeezed out of the HIPE to contain the water in an unduly large amount, boosting the cost for the disposal of the waste water, failing to bring a proportional addition to the effect, and not doing any good economically. If the content is less than 0.1 mass part, the shortage will possibly prevent the effect of the addition of the salt from being fully manifested.

(g) Other additive

Varying other additive which are capable of improving the conditions of production, the property of HIPE, and the performance of the porous cross-linked polymer by imparting the performance and the function of their own, they may be suitably used herein. For example, a base and/or a buffer may be added for the purpose of adjusting the pH value. The content of the other additive may be selected within such a range that the additive used may fully manifest the performance, function, and further the economy commensurate with the purpose of addition.

(2) Water phase/oil phase (W/O) ratio

The water phase/oil phase (W/O) ratio (mass ratio) of the HIPE mentioned above does not need to be particularly discriminated but may be suitably selected depending on the kind of use (such as, for example, an absorbent material, sound insulation material, or filter) for which the porous cross-linked polymer possessing continuous cells is intended. When the W/O ratio is in the range of 10/1–100/1, for example, the produced porous cross-linked polymer is suitable for use in various absorbent materials such as disposable diapers and sanitary materials. Since the percentage of voids is fixed by the W/O ratio, however, the W/O ratio is properly not less than 3/1 and preferably in the range of 10/1–250/1, and particularly preferably 10/1–100/1. If the W/O ratio is less than 3/1, the shortage will be at a disadvantage in suffering the porous cross-linking polymer to be deficient in the ability to absorb water and energy and in the degree of openings as well and possibly lowering the degree of openings in the surface of the produced porous cross-linked polymer and preventing the polymer from acquiring an ample capacity for liquid permeation.

(3) Method for preparation of HIPE

The method for production of the HIPE which can be used in this invention does not need to be particularly discriminated. Any of the methods for production of HIPE heretofore known to the art may be suitably used. A typical method for the production of interest will be specifically described below.

First, the components forming an oil phase comprising a monomer composition consisting of a polymerizing monomer and a cross-linking monomer and an oil-soluble polymerization initiator (which may be additionally used or not used where the polymerization initiator to be used is a water-soluble substance) are joined in amounts calculated to account for the contents specified above and are stirred at a prescribed temperature to prepare a homogeneous oil phase.

Meanwhile, the components forming a water phase comprising water and a water-soluble polymerization initiator (which may be additionally used or not used where the polymerization initiator to be used is an oil-soluble substance) and, when necessary, a salt are joined in amounts calculated to account for the contents specified above and are heated to a prescribed temperature in the range of 30–95° C. to prepare a homogeneous water phase.

Then, by mixing the water phase and the oil phase efficiently and exerting a proper shearing force thereon, it is made possible to prepare the HIPE stably. The HIPE which is obtained by the stirring of the water phase and the oil phase generally forms a white emulsion with high viscosity.

(4) Apparatus for production of HIPE

The apparatus for the production of the HIPE mentioned above does not need to be particularly discriminated. Any of the apparatuses for the production of interest which have been heretofore known to the art may be used. For example, the stirring device (emulsifier) to be used for mixing and stirring the water phase and the oil phase may be selected from among the stirring devices and the kneading devices which have been heretofore known to the art. As concrete examples of the stirring device, stirring devices using vanes of the propeller type, the paddle type, and the turbine type, homomixers, line mixers, and pin mills may be cited.

The optimum temperatures of the water phase and the oil phase are properly in the range of 20–100° C. From the viewpoint of the stability of the HIPE, they are preferred to be in the range of 40–95° C. The oil phase and the water phase are mixed after the temperature of the oil phase and/or the water phase is adjusted as prescribed in advance. In this case, since the production of the HIPE uses the water phase in a large amount, it is commendable to select the water phase for the adjustment of temperature mentioned above.

(5) Temperature for formation (temperature for emulsification) of HIPE

The temperature for forming (the temperature for emulsifying) the HIPE is generally in the range of 20–100° C. From the viewpoint of the stability of the HIPE, it is preferably in the range of 30–95° C., more preferably 40–95° C., particularly preferably 45–90° C., and most preferably 50–85° C. If the HIPE forming temperature is less than 20° C., the shortage will be at a disadvantage in heightening the viscosity of the emulsion and consequently rendering the emulsification difficult of handling. Conversely, if the HIPE forming temperature exceeds 100° C., the excess will be at a disadvantage in not allowing the emulsification to proceed under normal pressure and suffering the emulsion obtained under high pressure to be deprived of stability. It is commendable to have the temperature of the oil phase and/or the water phase adjusted in advance to a prescribed forming temperature (emulsifying temperature) and then have the two phases stirred and mixed till emulsification to form the HIPE aimed at. Since the quantity of the water phase is large during the preparation (formation) of the HIPE, it may well be considered commendable to have at least the temperature of the water phase adjusted to a prescribed forming temperature (emulsifying temperature). When the polymerization of the polymerizing monomer or the cross-linking agent is started while the emulsification is in process and then continued till formation of the polymer, the HIPE will be possibly deprived of stability. When the HIPE containing a polymerization initiator (a redox polymerization initiator, for example) from the beginning is to be prepared, therefore, the HIPE forming temperature (emulsifying temperature) is preferred to be a temperature at which the polymerization initiator (oxidizing agent) induces substantially no thermal decomposition. It is commendable to effect emulsification at a temperature lower than the temperature at which the polymerization initiator (oxidizing agent) has a half-time of 10 hours (10 hours half-time temperature).

[II] Production of Porous Cross-linked Polymer (1) Method for polymerization of HIPE In this invention, the method of polymerization which continuously performs a process ranging from a step of supplying HIPE through a step pf polymerizing it as will be described herein below constitutes a main requirement for the constitution thereof. To be specific, the method which comprises causing the outer surface part of the HIPE by means for decreasing an oxygen content to assume an atmosphere or a state having a lower oxygen content than the ambient air and then continuously performing a process ranging from a step of supplying the HIPE through a step of polymerizing it constitutes itself a main requirement for the constitution. This method is capable of wholly solving the various technical problems inherent in the method for combination continuous and batch polymerization disclosed in the official gazette of WO-A-97-27240 mentioned above, allowing the surface property of the porous cross-linked polymer to be designed as one pleases, preventing the continuously supplied HIPE of the form of soft cream (or in the form of yogurt) having only small flowability from leaking, permitting free control of the forming width and the forming thickness f the soft and friable HIPE, and enabling the process to be continuously performed from a step of supplying the HIPE through a step of polymerizing the HIPE. It is further capable of solving technical problems inherent in an attempt to perform continuously a process ranging from a step of supplying the HIPE through a step of polymerizing it, i.e. such problems as suffering part of the HIPE to escape being thoroughly hardened and remain in the form of soft cream (or the form of yogurt) in spite of a heat treatment performed at a prescribed hardening temperature for a prescribed period and, because the HIPE which has a W/O ratio so high as to reach a level of some tens to some hundreds induces separation of water and further because the HIPE, when hardened, generates free water, suffering the produced porous cross-linked polymer to form pinholes and voids resembling pock marks in the surface part thereof.

In this invention, the fact that first the outer surface part of the HIPE is caused by means for decreasing an oxygen content to assume an atmosphere or a state having a lower oxygen content than the ambient air and then the HIPE is polymerized, preferably from a step of supplying the HIPE through a step of polymerizing it forms one of the main requirements for the constitution. The method answering this requirement is capable of solving numerous problems such as the occurrence of an unhardened part in the surface layer part of the outer surface part of the produced porous cross-linking polymer, the infliction of pinholes and voids upon the surface part, the failure to form a texture containing open cells, and the generation of free water when the HIPE is hardened.

By the means for decreasing an oxygen content mentioned above, the outer surface part of the HIPE is only required to assume an atmosphere or a state having a lower oxygen content than the ambient air. Properly, the atmosphere or the state mentioned above has an oxygen content of not more than 2.0 vol. %, preferably not more than 0.2 vol. %, and particularly preferably no oxygen content. If the oxygen content exceeds 2.0 vol. %, the excess will be at a disadvantage in compelling the surface layer part of the outer surface part of the HIPE to escape being polymerized.

The means for decreasing an oxygen content mentioned above is only required to be capable of retaining the HIPE in an atmosphere or a state having a lower oxygen content than the ambient air between the time the HIPE is supplied and the time it is polymerized. As concrete examples of the means, the following means may be cited.

(A) Means for decreasing an oxygen content by using a gas having a lower oxygen content than the ambient air, preferably an inert gas containing no oxygen such as, for example, nitrogen gas, argon gas, helium gas, neon gas, krypton gas, xenon gas, radon gas, and a mixed gas formed of two or more of such gases, particularly nitrogen gas alone or a mixed gas containing nitrogen gas for replacing partly or wholly, preferably wholly, the ambient air contacting the outer surface part of the HIPE thereby repressing or preventing, preferably preventing the contact of the ambient air (among other gases, particularly oxygen gas) with the HIPE, (B) Means for decreasing an oxygen content by using a liquid exerting no effect on polymerization such as, for example, water or an electrolytic aqueous solution for forming a liquid layer or a liquid film, preferably a water layer, on the outer surface part of the HIPE mentioned above thereby repressing or preventing the contact of the ambient air with the HIPE, and (C) Means for decreasing an oxygen content by using a solid capable of reducing or nulling the amount of contacting oxygen, preferably a sheet (inclusive of film and plate, for example) having low or no permeability to gas for forming a sheet layer on the outer surface part of the HIPE mentioned above thereby repressing or preventing the contact of the ambient air with the HIPE may be cited.

These means may be used as suitably combined, when necessary.

Further, in this invention, such weirs and gaskets, etc. which are multifunctionally useful as for ① preventing the continuously supplied HIPE from leaking through the outer surface part thereof, ② retaining the formed HIPE in a fixed shape, ③ protecting the HIPE against a failure to polymerize, and retaining the sheet material on the outer surface part are preferred to be used in addition to the means for decreasing an oxygen content indicated in (A)–(C) above.

Figure 2:
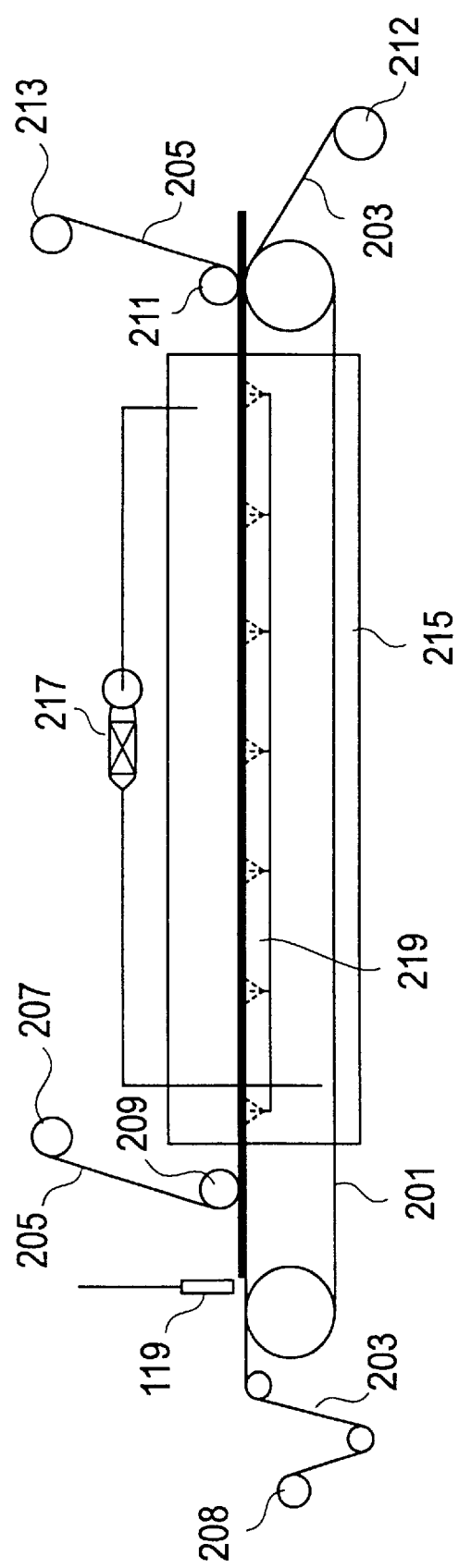
FIG. 2 is a schematic cross section illustrating a typical preferred embodiment of an apparatus for polymerization which can be utilized for a "horizontal" system which is one of the preferred systems contemplated by this invention.
Figure 3:
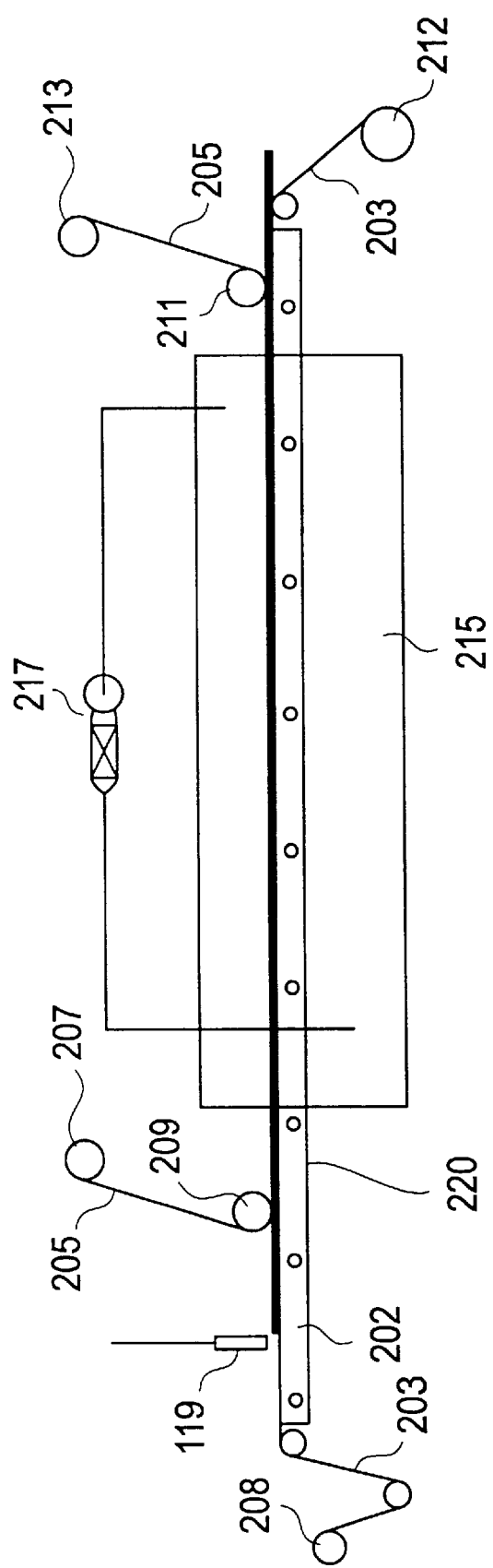
FIG. 3 is a schematic cross section illustrating another typical preferred embodiment of an apparatus for polymerization which can be utilized for a "horizontal" system which is one of the preferred systems contemplated by this invention.

Incidentally, the expression "causing the outer surface part of the HIPE by means for decreasing an oxygen content to assume an atmosphere or a state having a lower oxygen content than the ambient air" as used in the present specification ought not be interpreted in a narrow sense of words but has only to be interpreted as repressing or preventing the contact of the ambient air with the HIPE, as shown in working examples or in FIG. 2 and FIG. 3, (1) at least to the part of polymerization (the case of starting the polymerization from the part of supply is omitted herein because it is embraced in (2) or (3) described below), (2) preferably at least from the part remaining after the supply, or (3) more preferably from the part of supply. That is, in the case of the liquid and the sheet (solid) mentioned above, the part for supplying the HIPE does not always require the outer surface part. In the case of a gas, the HIPE can be supplied while the gas is being replaced. In the case of a liquid or a sheet, since it suffices to represses or prevents the ambient air with the liquid and/or the sheet after the HIPE has been supplied (as depicted in FIG. 2 and FIG. 3), the contact of the ambient air with the HIPE does not need to be strictly repressed or prevented with the liquid or the sheet (further in the case of a gas) from the part of supply. This is because the part of supply through the part after the supply are exposed to the ambient air for a brief span of time and the contact established at all brings only a small influence on the properties of the produced porous cross-linked polymer and the means for decreasing an oxygen content can fully manifest the expected operation and effect as compared with the conventional method (refer to working examples described herein below).

In a preferred mode of embodying this invention, the means for decreasing an oxygen content by using a gas as indicated in (A) above comprises replacing wholly the ambient air contacting the outer surface part of the emulsion mentioned above with nitrogen gas thereby preventing the contact of the ambient air with the HIPE, the means for decreasing an oxygen content by using a liquid as indicated in (B) above comprises forming a water layer on the outer surface part of the emulsion mentioned above with an aqueous solution incapable of affecting polymerization thereby preventing the contact of the ambient air with the emulsion mentioned above, and the means for decreasing an oxygen content by using a solid as indicated in (C) above comprises forming a sheet layer on the outer surface part of the emulsion mentioned above with a sheet thereby repressing or preventing the contact of the ambient air with the emulsion mentioned above.

The means for decreasing an oxygen content on the outer surface part of the emulsion mentioned above is preferred to be a proper combination of the preferred means for decreasing an oxygen content cited above, i.e. (a) a structure formed by combining means for preventing the contact of the ambient air with the emulsion by replacing wholly the ambient air contacting the outer surface part of the emulsion with nitrogen gas and means for repressing or preventing the contact of the ambient air with the emulsion by forming a sheet layer on the outer surface part of the emulsion with a sheet, (b) a structure formed by combining means for preventing the contact of the ambient air with the emulsion by forming a water layer on the outer surface part of the emulsion with an aqueous solution incapable of affecting polymerization and means for repressing or preventing the contact of the ambient air with the emulsion by forming a sheet layer on the outer surface part of the emulsion with a sheet, and (c) a structure formed by combining different means for repressing or preventing the contact of the ambient air with the emulsion by forming a sheet layer on the outer surface part of the emulsion with a sheet. By using such structures as properly combined in continuously performing a process from a step of supplying the HIPE through a step of polymerizing it, it is enabled to enhance the accuracy of retention of the formed HIPE in a fixed shape and the yield of the porous cross-linking polymer, allow free control of the formed HIPE in the shape (in terms of the width (W) and the thickness (T), for example, which will be specifically described hereinbelow), and permit variation of the surface property of the outer surface part of the porous cross-linked polymer (refer to working examples to be cited herein below).

The means for decreasing an oxygen content by using a gas and the means for decreasing an oxygen content by using a liquid among other means for decreasing an oxygen content on the outer surface part of the HIPE are problematic to a certain extent about the drifting property of the monomer. As respects the surface properties of the produced porous cross-linked polymer, the open cell forming property and the surface smoothness do not deserve to be rated as perfectly fine (slightly lower than the levels deserving to be rated as ideal). Besides, the resistance to the infliction of pinholes and voids is relatively satisfactory. Thus, the means of interest can be applied to many uses. The combination thereof with the means for decreasing an oxygen content by the use of a sheet, i.e. means for decreasing an oxygen content on the outer surface part of the HIPE, may well be counted as a preferred mode of producing a porous crosslinked polymer endowed with a modified surface property (refer to Example 5 and Example 6 to be cited herein below).

Then, the means for decreasing an oxygen content by using a sheet, i.e. one of the means for decreasing an oxygen content on the outer surface part of the HIPE, is free from the problem concerning the drifting property of the monomer. The surface properties of the produced porous crosslinked polymer such as, for example, the open cell forming property and the surface smoothness of the outer surface part are satisfactory and the resistant to the infliction of pinholes and voids is likewise satisfactory. Thus, the porous crosslinked polymer obtained by the method under discussion can be applied to many uses. Further, by properly selecting the form of the sheet layer disposed on the outer surface part of the emulsion as means for decreasing an oxygen content by using a sheet, i.e. one of the means for decreasing an oxygen content on the outer surface part of the HIPE, it is made possible to produce a porous cross-linked polymer having a modified surface property.

The sheet layer formed on the outer surface part of the emulsion as the means for decreasing an oxygen content by using a sheet as indicated in (C) above is only required to possess a sealing property exceeding a prescribed level so as to bring an expected effect in decreasing an oxygen content. The sheet layer which possesses a gas permeability (oxygen permeability) exceeding a prescribed level and betraying deficiency in the sealing property cannot be easily used as means for decreasing an oxygen content. From this point of view, the gas permeability of the sheet layer disposed on the outer surface part of the emulsions as means for decreasing an oxygen content on the outer surface part of the HIPE is properly not more than 100 cm$^3$/cm$^2$·s, preferably not more than 5 cm$^3$/cm$^2$·s. If the gas permeability of the sheet layer mentioned above exceeds 100 cm$^3$/cm$^2$·s, the excess will be at a disadvantage in lowering the ability of the sheet layer to decrease an oxygen content and, depending on such conditions as the W/O ratio, possibly suffering the produced porous cross-linked polymer to give rise to an unhardened part. The term "gas permeability" as used herein refers to the result of a determination performed by any of the testing methods specified in 6.27 Gas Permeability of JIS (Japanese industrial standards) L1096 (1990).

The upper limit of the gas permeability mentioned above applies exclusively to the case wherein the exterior of the site of determination is an ambient air. When the means of interest is used in combination with other means for decreasing an oxygen content (particularly the means for decreasing an oxygen content by using a gas having a lower oxygen content than the ambient air as indicated in (A) above), the surpass of the upper limit mentioned above poses no problem. Even when the gas permeability is in the range of 5 cm$^3$/cm$^2$·s to 100 cm$^3$/cm$^2$·s, the aforementioned combined use with the other means for decreasing an oxygen gas possibly alloys the defects such as pinholes and voids. When the hardening temperature of the HIPE is heightened, part of the water in the polymer possibly succumbs to vaporization. In this case, the sheet layer mentioned above possibly proves more advantageous for the purpose of allaying the defects such as pinholes and voids inflicted on the surface of the porous cross-linked polymer when the sheet layer possesses a slightly low sealing property and manifests gas permeability to a certain extent to balance these two properties well (as in a gas permeable film, a porous film, a non-woven fabric, or a woven fabric) than when it possesses a high sealing property (as in a gas barrier film or an ordinary film). In deciding the sealing property (gas permeability) of the sheet layer mentioned above, therefore, it is preferred to be selected by taking into due consideration the conditions of polymerization and performing a preliminary experiment as occasion demands to find the optimum sealing property.

As concrete examples of the sheet to be used as the sheet layer formed on the outer surface part of the emulsion mentioned above in the means for decreasing an oxygen content by using a sheet as indicated in (C) above, ① at least one kind of sheet material selected from the group consisting of film, non-woven fabric, and woven fabric, ② an endless belt and/or a band-shaped plate made of metal and/or resin, ③ an endless belt and/or a band-shaped plate made of metal using the sheet material mentioned above on the surface thereof destined to contact the outer surface part of the emulsion, and ④ an endless belt and/or a band-shaped plate made of resin using the sheet material mentioned above on the surface thereof destined to contact the outer surface part of the emulsion may be cited. These sheets may be used either alone or in the form of a combination of two or more members. This invention defines the sheet, sheet material, and film mentioned above respectively as follows. The "sheet" which is one form of the means for decreasing an oxygen content on the outer surface part of the HIPE does not need to be particularly discriminated but is only required to be in a thin form (thin film or thin plate). It embraces a very wide concept including the forms of ①–④ mentioned above. The "sheet material" is at least one kind selected from the group consisting of film, non-woven fabric, and woven fabric shown in ① above. The "film" is one kind of the sheet material shown in ① above and is only required to be in the form of a thin film.

The material for the at least one kind of sheet material selected from the group consisting of film, non-woven fabric, and woven fabric indicated in ①, i.e. one concrete form of embodying the sheet used for the sheet layer disposed on the outer surface part of the emulsion as means for decreasing an oxygen content by using a sheet indicated in (C) above does not need to be particularly discriminated but is only required to be usable under the conditions of polymerization. It may be suitably selected from the macromolecular materials heretofore known to the art. It is preferred to excel in durability fit for continuous polymerization (various properties including resistance to heat, weatherability, resistance to abrasion, ability to permit recyclic use, and mechanical strengths such as tensile strength) and allow control of the surface properties of the porous cross-linked polymer. As concrete examples of the material, fluorine resins such as polytetrafluoroethylene (hereinafter occasionally referred to simply as "PTFE"), tetrafluoroethylene-perfluoroalkylvinyl ether copolymers (hereinafter occasionally referred to simply as "PFA"), tetrafluoroethylene-hexafluoropropylene copolymers (hereinafter occasionally refered to simply as "FEP"), and tetrafluoroethylene-ethylene copolymers (hereinafter occasionally referred to simply as "ETFE"); silicone resins such as dimethyl polysiloxane and dimethylsiloxane-diphenyl siloxane copolymers; heat-resistant resins such as polyimides (hereinafter occasionally referred to simply as "PI"), polyphenylene sulfides (hereinafter occasionally referred to briefly as "PPS"), polysulfones (hereinafter occasionally referred to briefly as "PSF"), polyether sulfones (hereinafter occasionally referred to briefly as "PES"), polyether imides (hereinafter occasionally referred to briefly as "PEI"), polyether ether ketones (hereinafter occasionally referred to briefly as "PEEK"), and para type aramid resins; thermoplastic polyester resins such as polyethylene terephthalates (hereinafter occasionally referred to briefly as "PET"), polybutylene terephthalates (hereinafter occasionally referred to briefly as "PBT"), polyethylene naphthalates (hereinafter occasionally referred to briefly as "PEN"), polybutylene naphthalates (hereinafter occasionally referred to briefly as "PBN"), and polycyclohexane terephthalates (hereinafter occasionally referred to simply as "PCT"), thermoplastic polyester type elastomer resins (hereinafter occasionally referred to briefly as "TPEE elastomer") such as block copolymers (polyether type) formed of PBT and polytetramethylene oxide glycol and block copolymers polyester type) formed of PBT and polycaprolactone, and polyolefins such as polypropylene may be cited. These materials may be used either singly or in the form of two or more members.

As the material for the sheet material mentioned above, at least one material selected from the group consisting of fluorine resin, silicone resin: polyimide, polyphenylene sulfide, polysulfone, polyether sulfone, polyether imide, polyether ether ketone; polybutylene terephthalate, polyethylene naphthalate, polybutylene naphthalate, and polycyclohexane terephthalate is used particularly advantageously.

The porous cross-linked polymer obtained by using the preferable material mentioned above for the sheet material excels in liquid permeability and gas permeability without entailing such disadvantages as the formation of a skin layer on the surface and the degradation of the degree of aperture. When the porous cross-linked polymer formed or fabricated by the method of production of this invention in the shape of a sheet measuring 16 cm² in area and 5 mm in thickness was tested for liquid-permeability by the method shown in a working example cited herein below, the liquid-passing speed was found to be not less than 0.5 cc/sec. This result clearly indicates that the porous cross-linked polymer sheet possessed excellent liquid-permeability. Particularly when the porous cross-linked polymer is produced by stationary polymerization of the HIPE, it is obtained in the shape identical to the inner contour of a device for polymerization (particularly a polymerization vessel). This method can impart an arbitrary shape to the produced porous cross-linked polymer and, therefore, fits the production of the porous cross-linked polymer in the shape of a sheet of flat or curved surface, a bar, threads, or combination of such shapes. Though the surface area of the porous cross-linked polymer varies with the shape of the produced polymer, the method of production contemplated by this invention permits free control of the degree of aperture of the surface of the porous cross-linked polymer possessing continuous cells (refer to FIGS. 7–28) by suitably selecting the material for the device of polymerization from the group defined above. This method, therefore, enjoys a large merit when it is applied to the production of a porous cross-linked polymer having a large surface area.

The reason for nominating at least one material selected from the group defined above as the material for the part of the device for polymerization which is fasted to contact the HIPE is that to or more such materials may be suitably combined to prepare a complex composition or form a multiplicity of superposed layers by taking into account such factors as mechanical strength and heat resistance. The multiplicity of superposed layers may be formed by combining these materials with other materials. In this case, it suffices as a matter of course that the material mentioned above is used in the part of the uppermost layer (surface layer) of the device of polymerization which is fated to contact the HIPE. The material (basis) of the device for polymerization destined to contact the HIPE and consequently made of iron or stainless steel may be coated with at least one of the materials enumerated above. Alternatively, the part of the device for polymerization which is destined to contact the HIPE may be formed by combining a part formed of such material and a part having the surface thereof coated with such material. The term "device for polymerization" as used herein embraces a device adapted for a method of continuous polymerization and a device for batch polymerization adapted to effect stationary polymerization in a closed vessel. In the method for continuous polymerization, for example, the combined use of a part made of such a material and a part coated therewith for the means of conveyance (such as, for example, a belt conveyor) adapted to convey the HIPE continuously and meantime polymerize the HIPE and the means of conveyance adapted to contact the surface side of the HIPE in accompaniment therewith and meantime prevent oxygen (film type conveyor, for example) possibly proves advantageous. The material to be used for the part of the device for polymerization which is fated to contact the HIPE may be a structure of the device for polymerization itself. Otherwise, it may be the sheet material superposed or applied as a coat on the device made of iron or stainless steel.

When the material mentioned above is used as the sheet material, the thickness of this sheet material does not need to be particularly restricted. Generally, the sheet material can acquire durability fit for continuous polymerization (various properties such as resistance to heat, weatherability, resistance to abrasion, ability to permit recycle use, and mechanical strengths including tensile strength) when the thickness is in the range of 0.01–3.0 mm. It may be fabricated in the form of an endless belt which permits recycle use.

Further, the form of the sheet material mentioned above may be film, non-woven fabric, woven fabric, or combination thereof. ① As concrete examples of the gas-impermeable film (gas permeability in the approximate range of 0–0.002 cm³/cm²·s, gas barrier type films such as aramid film and PET film coated with polyvinylidene chloride (hereinafter occasionally referred to briefly as "PVDC"); and ordinary species of film such as PEN film, PET film, PBT film, PPS film, PI film, ETFE film, polypropylene (hereinafter occasionally referred to briefly as "PP"), and PTFE film may be cited, ② as concrete examples of the gas-permeable film (gas permeability in the approximate range of 0.0001–35 cm³/cm²·s), gas permeable films such as dimethyl polysiloxane film; and porous films such as PTFE type porous film and polyolefin type porous film may be cited, ③ as concrete examples of the woven fabric (gas permeability in the approximate range of 0.1–8 cm³/cm²·s), a PET multifilament type woven fabric may be cited, and ④ as concrete examples of the non-woven fabric (gas permeability in the approximate range of 10–1000 cm³/cm²·s), PET spun bond type non-woven fabrics may be cited.

The mechanical continuous working temperature (UL746B) is available as one of the criteria for rating the heat resisting property of a sheet material. It is known to be 105° C. for PET, 160° C. for PEN, 200° C. for PI, 160° C. for PPS, 240° C. for PEEK, 150° C. for PSF, 180° C. for PES, 170° C. for PEI, and 180° C. for aramid film. The sheet material to be used can be suitably selected, depending on the hardening temperature.

Since ② the endless belt and the band-shaped plate made of metal and/or resin which form another concrete mode of embodying the sheet to be used as the sheet layer formed on the outer face part of the emulsion as the means for decreasing an oxygen content by using a sheet as indicated in (C) above is preferred to be a type having satisfactory corrosion resistance so as to tolerate the corrosion caused by the electrolyte such as calcium chloride which is a component of the HIPE, it is commendable to use as the materials of interest such a metal as stainless steel, carbon steel, or iron or steel (general term for designating such species of iron in practical use as pure iron, pig iron, steel, and ferro alloys which are supplied on a commercial scale) and resin selected for the sheet material mentioned above. As the material for metal, stainless steel proves a favorable selection. The reason for selecting these materials is that they possess durability fit for continuous polymerization (various properties including resistance to heat, weatherability, resistance to abrasion, ability to permit recycle use, and mechanical strengths such as tensile strength), avoid the possibility of forming a skin layer on the surface of a porous cross-linked polymer and consequently degrading the degree of aperture, and impart fully satisfactory permeability to liquid and gas to the produced porous cross-linked polymer.

As another concrete mode of embodying the sheet to be used in the sheet layer formed on the outer surface part of the emulsion as the means for decreasing an oxygen content by using a sheet as indicated in (C) above, it is commendable to use ③ an endless belt and/or a band-shaped plate of metal using the sheet material mentioned above on the surface thereof fated to contact the outer surface part of the emulsion and ④ an endless belt and/or a band-shaped plate of resin using the sheet material mentioned above on the surface thereof fated to contact the outer surface part of the emulsion with a view to selecting a type possessing fully satisfactory resistance to corrosion thereby tolerating the corrosion caused by the electrolyte such as calcium chloride which is a component of the HIPE and for the purpose of concurrently serving as a seal for the outer surface part of the HIPE. As a technique for realizing the "use" of the sheet material on an endless belt and a band-shaped plate of metal or resin, the endless belt and the band-shaped plate made of metal or resin and the sheet material such as a film excelling in durability are only required to be advanced at an identical speed in an identical direction in such a manner as to keep contact with the outer surface part at least during the polymerization of HIPE, preferably between the time the HIPE is supplied and the time the polymerization is completed. The use mentioned above may be otherwise accomplished by applying the sheet material such as a film of satisfactory durability to the endless belt or the band-shaped plate made of metal or resin by the work of adhesion using a suitable adhesive agent or tackifier. Alternatively, the use may be implemented by applying a resinous material of satisfactory durability to the endless belt or the band-shaped plate made of metal or resin thereby forming a sheet material thereon. These are not exclusive examples of the "use" under discussion. The endless belt of resin, for example, is preferred to be manufactured by using as the base the sheet material selected as described above and as the reinforcing material either a fabric or fibers and joining them to the endless belt by a carefully studied method.

Secondly, in the method for production contemplated by this invention, continuously performing a process from a step of supplying the HIPE mentioned above through a step of polymerizing the HIPE while retaining the formed HIPE in the resultant shape constitutes one preferred requirement for the construction of this invention. The fulfillment of this requirement brings the advantage of enabling the formed HIPE to acquire an expected shape and allowing a porous cross-linked polymer of a wholly homogenous quality to be produced with very high productivity. This is an unusually satisfactory achievement even from the commercial point of view.

As respects the method for retaining the formed HIPE in the resultant shape, by supplying (inclusive of an injecting action) the HIPE onto a supporting member of a driving or conveying device or into an inner empty space enclosed with a supporting member thereby forming the HIPE in an expected shape, for example, it is made possible for the HIPE, a fluid of dynamic viscosity having the constitution of soft cream or yogurt and showing only small fluidity and tending to impart a slightly jogging contour to the surface, to form proper weirs or gaskets on the outer surface part thereof and endow the formed HIPE with an effect of retaining the formed HIPE in the resultant shape, an effect of preventing the continuously supplied HIPE from leaking through the outer surface part thereof, an effect of preventing the HIPE from escaping polymerization, and further an effect of enabling the outer surface part of the HIPE to retain the sheet material fast in position. The formed HIPE is enabled to retain the final shape thereof more stably by using a sheet in the sheet layer on the outer surface part of the HIPE as the means for decreasing an oxygen content by using a sheet as indicated in (C) above and nipping the outer surface part of the HIPE vertically or laterally or encompassing the outer surface part in four directions. When the outer surface part of the HIPE is nipped vertically or encompassed in four directions by using a sheet in the sheet layer on the outer surface part of the HIPE as means for decreasing an oxygen content by using a sheet as indicated in (C) above, the retention of the formed HIPE in the final shape may be accomplished by a method of exerting tension to the sheet material or by a method of evenly pressing (depressing) the HIPE from the outer surface part thereof inwardly by the use of a shape adjusting plate disposed on the sheet. These methods are no exclusive examples.

In the method for production according to this invention, the method for continuously performing a process from a step of supplying the HIPE mentioned above through a step of polymerizing the HIPE does not need to be particularly discriminated but may be selected from the various methods shown below.

(1) The continuous operation of a process from a step of supplying the HIPE through a step of polymerizing the HIPE is so performed that the cross-sectional shape of the HIPE taken perpendicularly to the direction of travel may satisfy the relation, $T/W \leq 1$, wherein T and W are as defined in FIG. 1(A).

Figure 1B:
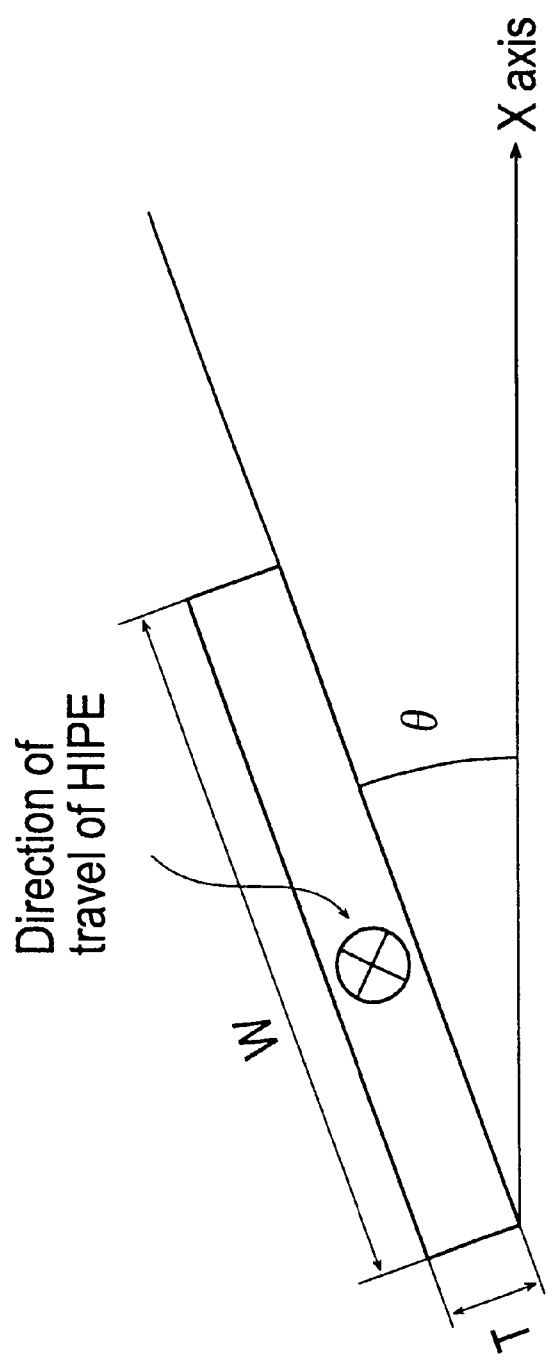
FIG. 1(B) is a schematic diagram illustrating a typical preferred embodiment of a system used in continuously performing a process ranging from a step of supplying HIPE through a step of polymerizing the HIPE in such a manner that a cross section of the system perpendicular to the direction of travel of HIPE may form with the X axis (horizontal axis) an angle $\theta$, wherein satisfies the relation, $0° \leq \theta \leq 90°$, and the cross-sectional shape of the system may satisfy the relation, $T/W \leq 1$.

(2) The continuous operation of a process from a step of supplying the HIPE through a step of polymerizing the HIPE is so performed that in the cross section of the HIPE taken perpendicularly to the direction of travel, the angle, $\theta$, formed between the vertical cross section and the X axis (horizontal axis) may satisfy the expression, $0° \leq \theta \leq 90°$ and the cross-sectional shape may satisfy $T/W \leq 1$, wherein T and W are as defined in FIG. 1(A). The angle, $\theta$, is also depicted in FIG. 1(B) to facilitate comprehension.

Figure 1C:
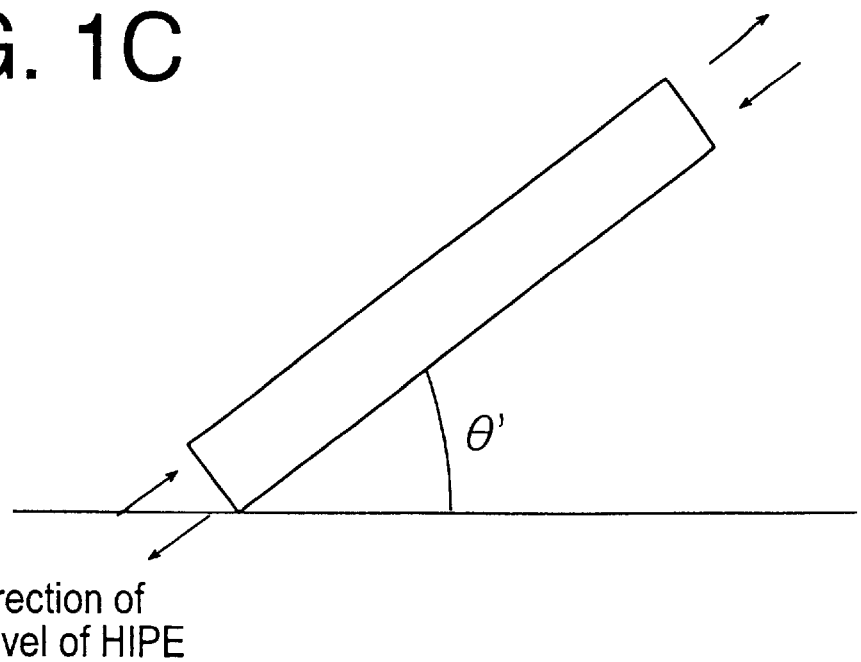
FIGS. 1(C) and (D) are schematic diagrams illustrating a typical preferred embodiment of a system used in continuously performing a process ranging from a step of supplying HIPE through a step of polymerizing the HIPE in such a manner that a cross section of the system perpendicular to the direction of travel of HIPE may form with the X axis (horizontal axis) an angle $\theta$, wherein $\theta$ satisfies the relation, $0° \leq \theta \leq 90°$, and the cross-sectional shape of the system may satisfy the relation, $T/W \leq 1$.
Figure 1D:
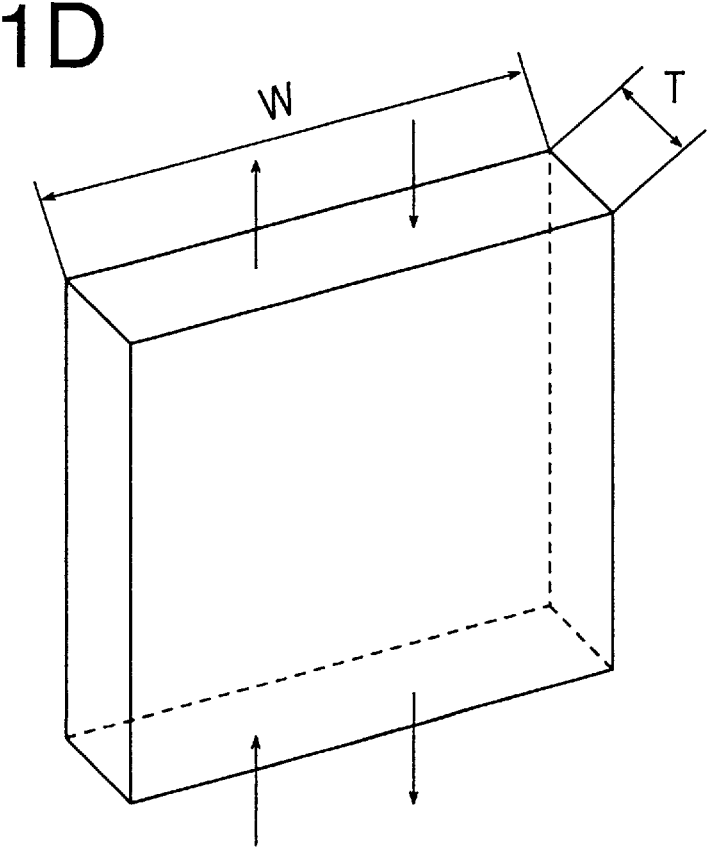
FIG. 1 is a schematic diagram illustrating a typical preferred embodiment of a system used for a method of polymerization according to this invention in continuously performing a process ranging from a step of supplying HIPE through a step of polymerizing the HIPE.

(3) The continuous operation of a process from a step of supplying the HIPE through a step of polymerizing the HIPE is so performed that in the cross section of the HIPE taken parallelly to the direction of travel, the angle, $\theta'$, formed between the parallel cross section and the horizon may satisfy the expression, $0° \leq \theta' \leq 90°$ and the cross-sectional shape may satisfy $T/W \leq 1$, wherein T and W are as defined in FIG. 1(A). The angle, $\theta'$, is also depicted in FIG. 1(C) to facilitate comprehension. The method of interest is enabled to retain the formed HIPE in the resultant shape more stably by encompassing the outer surface part of the HIPE as nipped in four directions by the use of a sheet in the sheet layer on the outer surface part of the HIPE as the means for decreasing an oxygen content by using a sheet as indicated in (C) above. It enables the HIPE to be formed in an expected shape particularly by using a sheet in the sheet layer on a supporting member of a driving or conveying device and injecting or compressing the HIPE in an inner empty space enclosed with the supporting member.

The cross-sectional shapes involved in (1)–(3) are invariably depicted rectangularly so as to facilitate the relation between T and W. This invention uses the methods mentioned above as basic forms. Naturally, a modified version having the cross-sectional shape formed as a trapezoid instead of a rectangle or a square is embraced in the technical scope of this invention. In the method for production contemplated by this invention, the method for continuously performing a process from a step of supplying the HIPE through a step of polymerizing it does not need to be limited to the methods (1)–(3) mentioned above. Optionally the methods of (1)–(3) mentioned above may be suitably combined or they may be partly altered into suitably modified versions.

Thirdly, in the method for production contemplated by this invention, continuously performing a process from a step of supplying the HIPE mentioned above through a step of polymerizing it by the horizontal method (the method of (1) mentioned above satisfying T/W<1 or the method of (2) mentioned above satisfying θ=0° and satisfying T/W<1 as well) constitutes one of the preferred requirements for the construction of this invention. The term "horizontal method" as used herein refers to an operation of continuously performing a series of steps of supplying the raw material, HIPE, onto a horizontally conveyed supporting member of a driving and conveying device thereby forming an HIPE layer thereon through polymerizing the HIPE layer (specifically heat-treating the layer at a prescribed hardening temperature for a prescribed period). The formation of this layer of the HIPE may be effected by simultaneously forwarding and shaping the HIPE at the time of supplying the HIPE or by shaping the supplied HIPE in the form of a layer by the use of a proper molding member. When the raw material, HIPE, is supplied onto the horizontally conveyed supporting member of a driving or conveying device, the HIPE may be directly supplied or indirectly supplied onto the supporting member. The term "indirectly" means possible inclusion of the case in which a sheet issued as the means for decreasing oxygen concentration for an endless belt and/or a band-shaped plate serving as the supporting member and the raw material, HIPE, is supplied onto the sheet. That is, by varying a substance which the HIPE contacts, the porous cross-linked structure of the surface layer part of the contacting surface of the produced porous cross-linked polymer is properly varied to suit the purpose of use.

(2) Forming thickness and shape of HIPE

The forming thickness of the HIPE does not need to be particularly restricted because the product resulting from the polymerization can be sliced into segments of a suitable thickness as will be described more specifically herein below. The term "thickness" as used herein is to be construed, for the sake of definition independent of the methods (1)–(3) mentioned above, as designating the size "T" shown in FIG. 1 utilized for the description of the methods (1)–(3) mentioned above (applicable similarly herein below). When the forming thickness, T, of the HIPE is unduly large, the excess entails problems such as rendering the properties of the porous cross-linked polymer ununiform in the direction of "T" and compelling the polymerization to induce discernible separation of water, probably slightly depending on the method to be used. It is, therefore, commendable to select the method which is optimum for the forming thickness. In the aforementioned "horizontal method" which is one of the ideal methods, it is commendable for the layer of the HIPE to be formed in a thickness which is properly not more than 100 mm, preferably not more than 50 mm, and more preferably not more than 30 mm. Decreasing the forming thickness to not more than 20 mm brings a further conspicuous effect of enabling the hardening temperature aimed at to be reached rapidly and allowing the polymerization to be completed in an unusually short span of time. Even when the forming thickness of the HIPE exceeds 50 mm, it suffices to adjust the speed of conveyance of the HIPE so that a long hardening time may be secured for the polymer at a relatively low temperature. The lower limit to the forming thickness of the HIPE does not need to be particularly restricted but may be properly decided to suit the purpose of use. Even when porous cross-linked polymers are produced in a small unit thickness, they may be used as properly superposed to secure the performance and the quality expected of liquid absorbents, energy absorbents, and substrates for impregnation with a chemical agent. When the thickness is less than 0.5 mm, however, the polymer allows no easy handling. The shape of the formed HIPE product does not need to be particularly restricted but may be arbitrarily selected.

The polymer which is obtained by the method of this invention is characterized by excelling in dimensional accuracy not only in the direction of length but also in the direction of width. While the method disclosed in the official gazette of WO-A-97-27240 encounters difficulty in retaining uniformity of the thickness in the direction of width and in the quality as well, the method of this invention imposes no such restriction and allows production of a sheet exceeding 100 cm in width and excelling in uniformity of thickness and quality.

(3) Hardening temperature

The hardening temperature of the HIPE generally falls in the range of normal room temperature –120° C. From the viewpoint of the stability of HIPE and the speed of polymerization, it is preferably in the range of 40–400° C., more preferably 80–100° C., and particularly preferably 95–100° C. If the hardening temperature is below the normal room temperature, the shortage will be at a disadvantage in necessitating allocation of a long time to the polymerization, requiring the apparatus to be newly provided with cooling means, and impairing the economy from the commercial point of view. Conversely, if the hardening temperature exceeds 120° C., the excess will be at a disadvantage in possibly suffering the produced porous cross-linked polymer to include pores not uniform in diameter and degrading the capacity of the porous cross-linked polymer for absorption. Further, the forming temperature of the HIPE ($T_0$) (=the temperature at the time of starting elevation of temperature by heating) and the hardening temperature ($T_1$) are preferred to satisfy this relation, $T_0 \leq T_1$. The reason for this relation is that even for the sake of effecting continuous polymerization by the use of a conveying device, the procedure of supplying the HIPE onto the belt of a conveyor and thereafter heating it to a prescribed hardening temperature proves advantageous from the viewpoints of temperature control, performance and quality of the product, and design of the relevant apparatus. The relation of $T_0$ and $T_1$, therefore, is only required to satisfy $T_0 \leq T_1$. For the purpose of producing the porous cross-linked polymer uniformly, the temperature difference [$T_0 - T_1$] between $T_0$ and $T_1$ is preferred to be not more than 50° C. If the temperature difference [$T_0 - T_1$] exceeds 50° C., the excess will be at a disadvantage in suffering the surface of HIPE to be locally heated because of a rapid elevation of temperature and consequently rendering the production of a uniform porous cross-linked polymer difficult. From the standpoint of the performance and quality of the produced porous cross-linking polymer and the control of the temperature, the hardening temperature (temperature of polymerization) [$T_1$] is preferred to be set in the prescribed temperature (±several degrees C.) range by controlling externally the amount of energy. The hardening temperature may vary during the course of polymerization within the temperature range defined above. This manner of polymerization is not excluded from the present invention.

After the polymerization (after the elapse of the hardening time of the polymer), the produced polymer is cooled or gradually cooled to the prescribed temperature. Depending on the method used for the polymerization, the polymer may be shifted without being cooled to the step for a subsequent treatment such as dehydration or compression which will be described more specifically herein below.

(4) Speed of temperature elevation by heating

When the hardening temperature of the HIPE is higher than the forming temperature thereof, the speed of temperature elevation by heating to the hardening temperature necessary for the polymerization of HIPE does not need to be particularly restricted. Though it cannot be defined uniquely because it varies with the composition and the thickness of the HIPE and with the means for temperature elevation by heating, it is preferred to be not less than 5° C./min. If the speed of temperature elevation by heating is less than 5° C./min, the shortage will be at a disadvantage in retarding the polymerization and aggravating the discernible water separation during the course of polymerization. The speed of temperature elevation by heating is preferred to be in the range of 5–60° C./min. If the speed of temperature elevation by heating is unduly high past 60° C./min, the excess will be at a disadvantage in not enabling the emulsified state of HIPE to be retained stably and possibly suffering the HIPE to be crushed. The term "speed of temperature elevation by heating" as used herein is determined by the formula: $[(T_{0.9}-T_0)/(t_{0.9}-t_0)]$. In the above formula, $T_0$ stands for a temperature of HIPE at the time $[t_0]$ for starting temperature elevation by heating (a forming temperature of HIPE). $T_{0.9}$ stands for a temperature which corresponds to a temperature difference equivalent to 90% of a temperature difference between the temperature $[T_0]$ and a prescribed hardening temperature $[T_1]$ taken as 100%, i.e., $[T_{0.9}]=[T_0]+([T_1]-[T_0])\times 0.9$. $t_0$ stands for a time for starting temperature elevation by heating, or in the case of the absence of the time for starting temperature elevation by heating, a time for supplying HIPE. $t_{0.9}$ stands for a time required for reaching the temperature $[T_{0.9}]$.

(5) Time for temperature elevation by heating

At the speed of temperature elevation by heating mentioned above, the total time for temperature elevation by heating is not less than 15 second, preferably in the range of 15 seconds–10 minutes, more preferably 30 seconds–7 minutes, and particularly preferably 1–5 minutes. If the temperature elevation is completed in a period of less than 15 seconds or more than 10 minutes, the deviation will be possibly at a disadvantage in not enabling the HIPE to be retained stably during the course of temperature elevation, aggravating the water separation, and suffering the polymerization to proceed ununiformly. The term "time for temperature elevation by heating" as used herein refers to the total time $[t_1-t_0]$ which elapses from the time for starting the temperature elevation of HIPE by heating $[t_0]$ till the time $[t_1]$ at which the temperature of HIPE reaches the prescribed hardening temperature $[T_1]$ (for stabilization). Exclusively in the case of satisfying the relation $T_0 \geq T_1$, the time for supplying HIPE is taken as $[t_0]$ on account of the absence of the time for starting temperature elevation by heating.

(6) Time for hardening polymer

The time for hardening the polymer as contemplated by this invention cannot be defined uniquely because it is variable with the composition of HIPE and the forming thickness [T]. The method of this invention for continuously performing the process from the step of supplying HIPE through the step of polymerizing it, as compared with the conventional method for combination continuous and batch polymerization, is highly effective in carrying out the polymerization stable in a short span of time in the range of some tens of seconds–60 minutes. For example, it suffices in this case only to control the speed of a traveling conveying device so that the polymerization is completed at the time that the conveying device passes through the interior of a proper polymerization vessel. The time for hardening the polymer is preferred to be in the range of 60 seconds–60 minutes. If the hardening time of the polymer exceeds 60 minutes, the excess will be at a disadvantage in degrading the productivity of the porous cross-linked polymer because of the necessity for elongating a hardening furnace or lowering the speed of conveyance. If the hardening time is less than 60 seconds, the shortage will be at a disadvantage in not allowing the porous cross-linked polymer to acquire fully satisfactory properties because the polymerization is not completed. Of course, this invention does not need to exclude the adoption of a hardening time of the polymer longer than the upper limit of the range specified above. The term "hardening time of the polymer" as used herein refers to the total time $[t_2-t_0]$ from the time $[t_0]$ for starting temperature elevation by heating till the time $[t_2]$ for completing the polymerization.

(7) Polymerization device (the device for continuously performing the operation from the step of supplying HIPE through the step of polymerizing it)

The polymerization device that can be used in this invention does not need to be particularly restricted but has only to be capable of continuously performing the operation from the step of supplying HIPE through the step of polymerizing it as described above.

Now, the polymerization device which can be utilized for the "horizontal" method, i.e. one of the preferred methods of this invention, will be described below with reference to the accompanying drawings. Even the polymerization device not intended for the method just mentioned may be adopted as suitably combined with a conventionally known polymerization device on the basis of the "horizontal" method.

FIG. 2 is a schematic side view of a polymerization device resorting to an endless belt which can be utilized for the "horizontal" method of this invention. FIG. 3 is a schematic side view of a polymerization device resorting to a jacketed bandshape plate which can be utilized for the "horizontal". method of this invention.

As illustrated in FIG. 2 and FIG. 3, an endless belt type conveyor (driving and conveying device) 201 made of stainless steel and adapted to travel at a fixed speed in a horizontal direction is disposed horizontally or a jacketed band-shaped plate 202 is disposed horizontally relative to an HIPE supplying part 119. An unwind wind type sheet material 203 formed of a PET film adapted to travel on the belt of a conveyor 201 at the same speed in the same direction as the belt or a PET film adapted to travel on a band-shaped plate 202 (i.e. means for decreasing an oxygen content in the lower part of HIPE) is disposed so as to extract the HIPE continuously from the HIPE supplying part 119, supply continuously the HIPE about X m in width and about Y mm in thickness (defined by the setting height of a rotary roller 209) onto the sheet material 203 and, at the same time, shape it into a smooth layer. An unwind wind type sheet material 205 formed of a PET film adapted to travel on the belt of a conveyor 201 at the same speed in the same direction as the belt or a PET film adapted to travel on the PET film traveling on the band-shaped plate 202 at the same speed in the same direction as the PET film (i.e. means for decreasing an oxygen content in the upper part of HIPE) is disposed as mounted on the HIPE similarly formed. (Naturally, these upper and lower sheet materials may be fabricated in the pattern of an endless belt by using a substance excelling in durability and mold release property with a view to recycle use and further other means for decreasing an oxygen content may be adopted in the place of these means for decreasing an oxygen content.) In the case of the sheet materials in the pattern of an endless belt made of stainless steel, the speeds of rotation of the unwind wind rollers 208 and 212 are controlled so that the sheet material 203 may travel at the same speed in the same direction as the belt of the conveyor 201. The rotary rollers 209 and 211 and unwind wind rollers 207 and 213 are disposed at suitable heights at the front and at the rear of the conveyor 201 and the speeds of rotation of the unwind wind rollers 207 and 213 are controlled so that the sheet material 205 may be advanced and meanwhile allowed to exert tension necessary for fixing the thickness of the HIPE. Consequently, the sheet materials 203 and 205 are maintained horizontally as parted vertically with a fixed distance and allowed to advance in the same direction at the same speed. In the case of the jacketed band-shaped plate, the speeds of rotation of the unwind wind rollers 208 and 212 and the unwind wind rollers 207 and 213 are controlled so that the sheet materials 203 and 205 may be allowed to travel at the same speed in the same direction synchronously. The rotary rollers 209 and 211 and the unwind wind rollers 207 and 213 are disposed at suitable heights at the front and at the rear of the jacketed band-shaped plate 202 and the speeds of rotation of the unwind wind rollers 207 and 213 are controlled so that the sheet material 205 may be advanced and meanwhile allowed to exert tension necessary for fixing the thickness of the HIPE. At the opposite ends (opposite sides) on the belt of the conveyor 201 or on the band-shaped plate 202, continuous gaskets or weirs (not shown) having a diameter (height) of Y mm and adapted to travel along the opposite sides thereon are disposed.

A polymerization furnace 215 shaped like a tunnel is disposed so that ① the belt of the conveyor 201 supporting the HIPE may travel in the horizontal direction inside the passage (tunnel) of a polymerization furnace or ② the sheet material 203 carrying the HIPE on the band-shaped plate 202 may travel in the horizontal direction inside the tunnel of a polymerization furnace. Further, heating (temperature elevating) means is provided so that the HIPE conveyed inside the tunnel of a polymerization furnace 215 may be heated from above and from below. As the heating (temperature elevating) means mentioned above, a temperature elevating means 217 which is formed of a hot air circulating device is disposed above the HIPE being conveyed inside the tunnel of the polymerization furnace 215. Below the HIPE conveyed inside the tunnel of the polymerization furnace 215, ① temperature elevating means 219 formed of a hot water showering device (hot water spraying device) adapted to blow hot water directly against the lower part of the belt or ② temperature elevating means 220 formed of a hot water supplying device (hot water circulating device) adapted to supply hot water to the jacket of the band-shaped plate is disposed so that the HIPE may be rapidly heated for temperature elevation through the medium of the belt or the band-shaped plate or the sheet material 203 thereon.

The hot air circulating device used as the temperature elevating means 217 is concurrently used as a thermally hardening means for polymerizing the HIPE at a prescribed hardening temperature stably for a prescribed time. By the hot air from the hot air circulating device, therefore, the HIPE conveyed inside the tunnel of the polymerization furnace 215 is rapidly heated through the medium of the sheet material 205 till the temperature thereof is elevated to the hardening temperature. It is, thereafter, retained at the prescribed hardening temperature.

Similarly, the hot water showering device used as the temperature elevating means 219 or the hot water supplying device used as temperature elevating means 220 is concurrently used as thermally hardening means. For example, the HIPE conveyed inside the tunnel of the polymerizing furnace 215 is rapidly heated till a hardening temperature ① by the blowing of the hot water from the hot water showering device from below the belt through the medium of the belt and the sheet material 203 or ② by circulating the hot water from the hot water supplying device through the medium of the band-shaped plate and the sheet material 203 and, thereafter, retained at the prescribed hardening temperature.

The temperature elevating means or the thermally hardening means do not need to be limited to those mentioned above. Such means as oscillators and varying infrared heaters using continuous output magnetrons capable of utilizing radiation energies and emitting such active thermal energies as microwaves, far infrared rays, and near infrared rays, and hot air circulating devices, hot water spraying devices, and hot water circulating devices for blowing thermal media such as hot water and hot air may be utilized alternatively. Further, the latter half zone of the polymerizing furnace 215 may be used as a cooling zone for rapidly cooling the porous cross-linked polymer after the polymerization. This concurrent use may be fully coped with by lowering the set temperatures of the hot air circulating device, the hot water blowing device, or the not water circulating device mentioned above. The use of nitrogen gas for the hot air permits the necessary sealing to be effected with nitrogen gas and eliminates the need for using the sealing material. Then use of the hot water spraying device in the upper part permits the necessary sealing to be attained with a water layer in the place of the sheet material. This device functions not only as means for decreasing an oxygen content but also as heating means.

One mode of the polymerization device for embodying this invention has been described. Naturally, the polymerization device applicable to the method for production contemplated by this invention does not need to be limited thereto.

Further, the material used in the part of the polymerization device which is not fated to contact the HIPE does not need to be particularly restricted. It suffices to select the optimum material from among the materials satisfying the technical standards of requirements such as strength (durability) and resistance to corrosion in consideration of economy and the problem of ecology and the ability of recyclic use. For example, the relevant parts made of such metals as aluminum, iron, and stainless steel (including alloys), such synthetic resins as polyethylene, polypropylene, fluorine resin, polyvinyl chloride, and unsaturated polyester resin, and fiber reinforced resins (FRP) having such synthetic fibers reinforced with fibers such as glass fibers and carbon fibers. When the temperature elevating means is subjected to high-frequency dielectric heating through the medium of microwaves, the materials for the device and the sheet must be selected attentively because the device and the sheet have the possibility of catching fire (owing to eddy current).

(8) Shape of porous cross-linked polymer

The shape of the porous cross-linked polymer which is obtained by the step of polymerization mentioned above does not need to be particularly restricted but may be selected arbitrarily.

(9) Step of slicing porous cross-linked polymer

In the present invention, the porous cross-linked polymer obtained by continuously performing the process from the step of supplying the HIPE through the step of polymerizing it as described above can be continuously sliced.

The method for continuously slicing the porous cross-linked polymer does not need to be particularly restricted.

Figure 4:
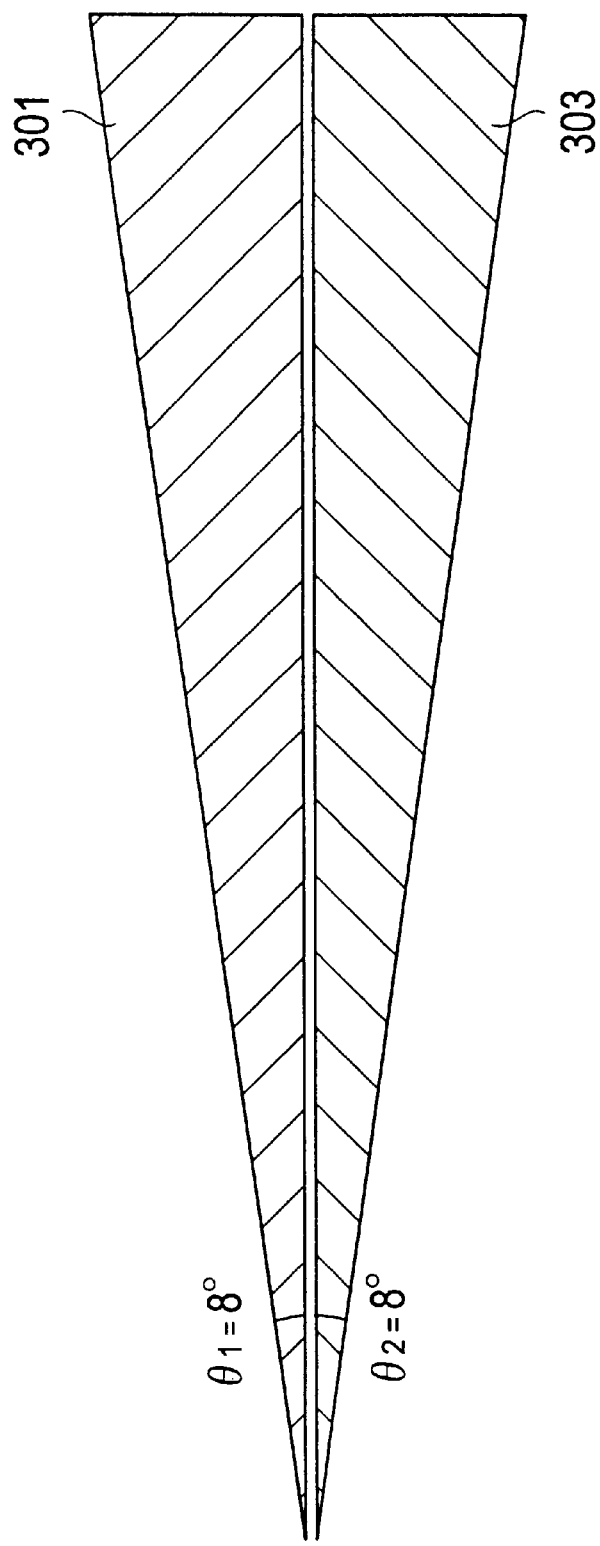
FIG. 4. is a diagram illustrating a preferred embodiment of the cross-sectional structure of an upper and a lower guide on the inlet side of a horizontal endless band knife f a belt conveyor system for continuously slicing a porous cross-linked polymer obtained by a "horizontal" system, which is one of the preferred systems for the method of production according to this invention. It depicts the cross-sectional structure of au upper and a lower guide on the inlet side of the horizontal endless band knife, the angles $\theta_1$ and $\theta_2$ of the upper and the lower guide from the horizontal levels are both set at 8°.
Figure 5:
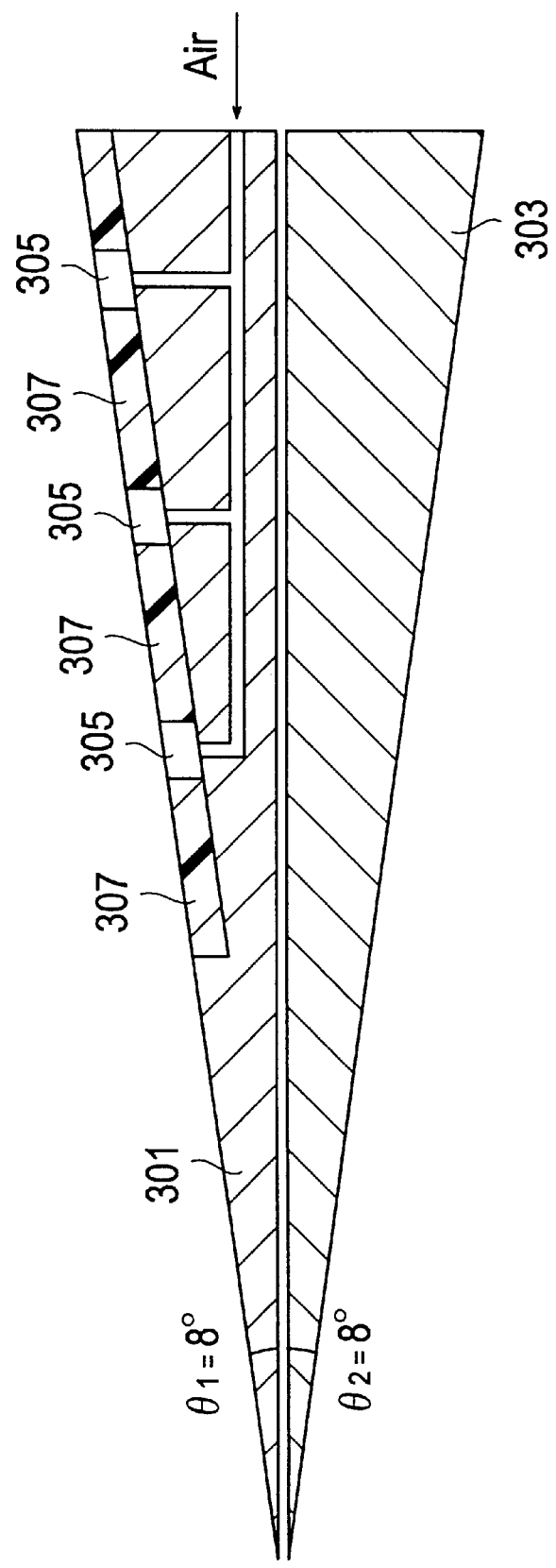
FIG. 5 is a diagram illustrating another preferred embodiment of the cross-sectional structure of an upper and a lower guide on the inlet side of a horizontal endless band knife f a belt conveyor system for continuously slicing a porous cross-linked polymer obtained by a "horizontal" system, which is one of the preferred systems for the method of production according to this invention. It depicts the cross-sectional structure of au upper and a lower guide on the inlet side of the horizontal endless band knife, the angles $\theta_1$ and $\theta_2$ of the upper and the lower guide from the horizontal levels are both set at 8°. The upper guide is provided in the surface layer part thereof with ① an air blowing mechanism possessed of an air blowing outlet and ② a mold release means formed of a tetrafluoroethylene resin (Teflon) plate.
Figure 6:
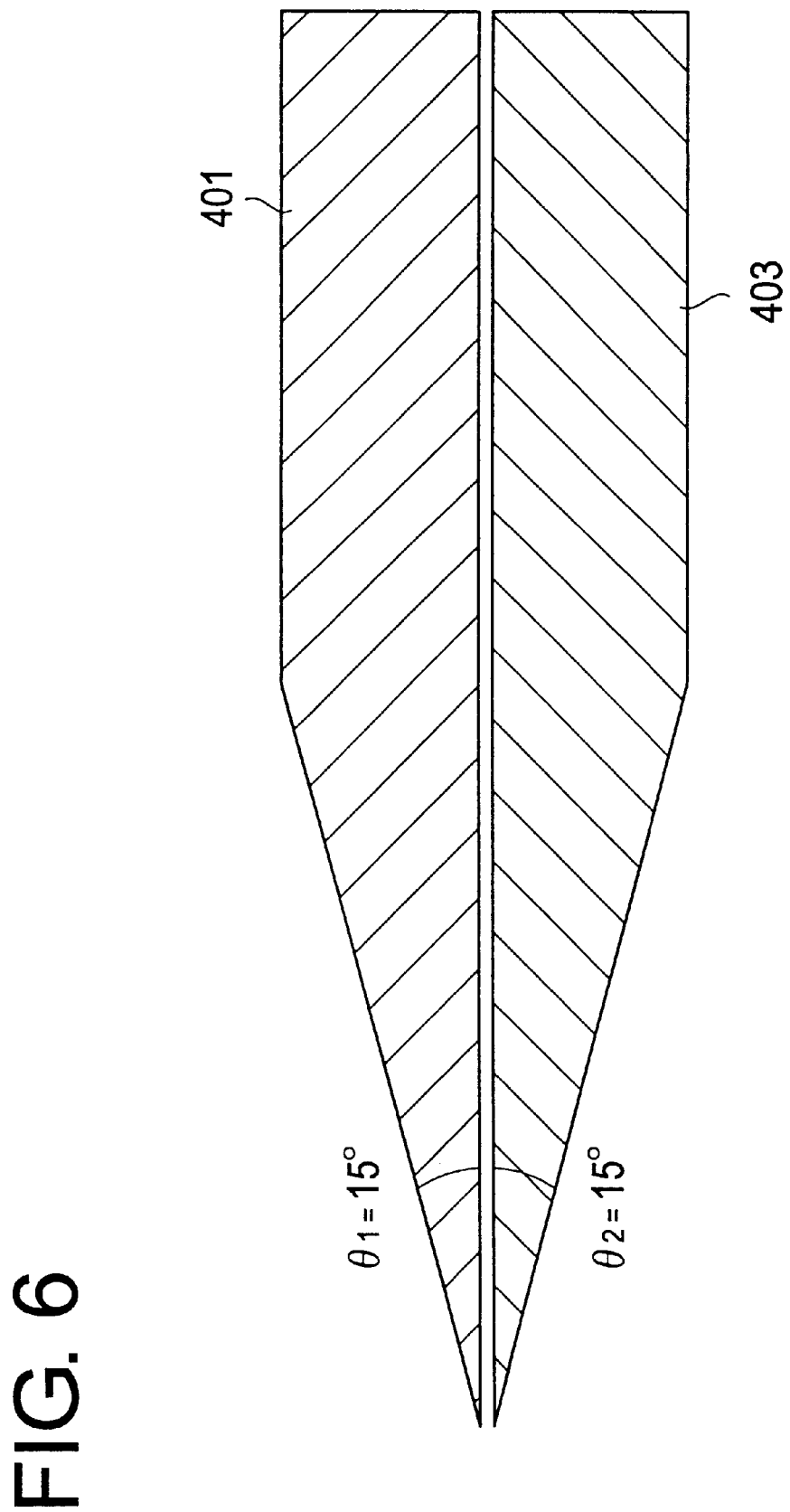
FIG. 6 is a diagram illustrating an unpreferred embodiment of the cross-sectional structure of an upper and a lower guide on the inlet side of a horizontal endless band knife f a belt conveyor system for continuously slicing a porous cross-linked polymer obtained by a "horizontal" system, which is one of the preferred systems for the method of production according to this invention. It depicts the cross-sectional structure of au upper and a lower guide on the inlet side of the horizontal endless band knife, the angles $\theta_1$ and $\theta_2$ of the upper and the lower guide from the horizontal levels are both set at 15°.
Figure 7:
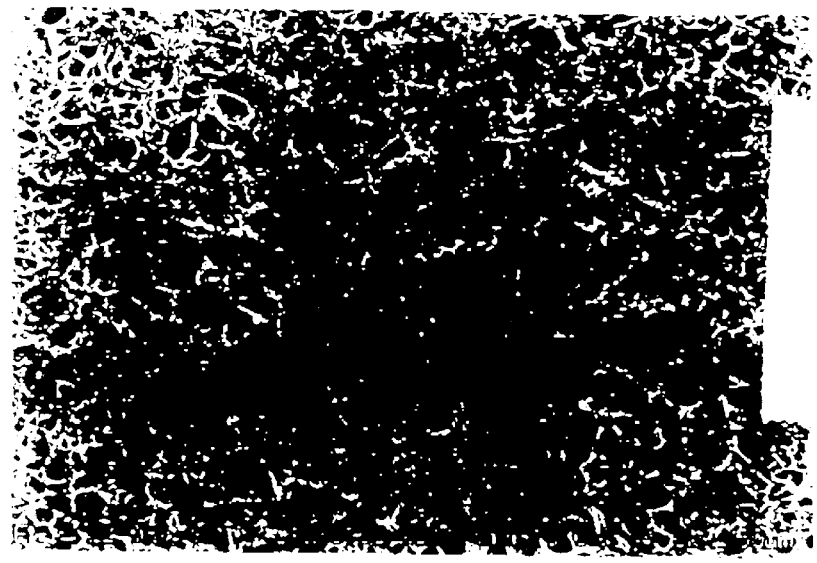
FIG. 7 is an electron photomicrograph (1000 magnifications) of the upper surface (the surface contacting nitrogen gas) of a porous cross-linked polymer (5) of this invention obtained in Example 5.

The conventionally known slicing means may be suitably utilized. Now, the method for slicing the porous cross-linked polymer obtained by the preferred "horizontal" method vertically (horizontally) will be described specifically as a typical example. First, the method for slicing the polymer vertically (horizontally) prefers to use a belt conveyor type horizontal endless band knife from the viewpoint of retaining the porous cross-linked structure on the sliced surface and preventing the sliced porous cross-lined polymer from sustaining a crack or fold. Particularly from the viewpoint of repressing possible vertical vibration of the endless band knife and heightening the accuracy of slicing thickness, it is commendable to specify the construction of upper and lower guides for the band knife. The construction of the upper and lower guides for the band knife will be explained with reference to drawings. FIG. 4 and FIG. 5 are drawings illustrating the modes of embodying the cross-sectional constructions of an upper and a lower guide on the inlet side of a preferred horizontal type endless band knife (i.e. the side forming an entrance for the porous cross-linked polymer being conveyed; applicable similarly hereinafter) and FIG. 6 is a schematic cross section illustrating as a type specimen the cross-sectional constructions of an upper and a lower guide on the inlet side of a not highly preferable horizontal type endless band knife. By decreasing the angles of inclination, $\theta_1$ and $\theta_2$, of the upper guide 301 and the lower guide 303 on the inlet side of the horizontal endless band knife from the horizontal positions as illustrated in FIG. 4 and FIG. 5, it is made possible to convey the sliced porous cross-linked polymer (not shown) without being folded or cracked. When the angles of inclination, $\theta_1$ and $\theta_2$, of the upper guide 401 and the lower guide 403 on the inlet side of the horizontal endless band knife from the horizontal positions are increased as illustrated in FIG. 6, the sliced porous cross-linked polymer (not shown) is eventually folded or cracked and, depending on the magnitude of the angle of inclination, the sliced porous cross-linked polymer being conveyed along the upper guide after the pattern of a shaving is eventually rolled up. The angle of inclination, $\theta_1$, of the upper guide on the inlet side of the horizontal endless band knife from the horizontal position is properly not more than 10° and preferably in the range of 5–8°. If the angle of inclination, $\theta_1$, of the upper guide from the horizontal position is less than 5°, the guide will suffer the stiffness thereof to decrease and will no longer be capable of repressing the vertical oscillation of the endless band knife and retaining the accuracy of slicing thickness. If the angle of inclination, $\theta_1$, of the upper guide from the horizontal position exceeds 10°, the excess will be at a disadvantage in causing the porous cross-linked polymer formed on the upper side in a thickness of X mm when the porous cross-linked polymer 2 X mm in thickness is sliced into two segments to show a discernible sign of inclination toward sustaining a fold or a crack (refer to FIGS. 4–6). The angle of inclination, $\theta_2$, of the lower guide on the inlet side of the horizontal endless band knife from the horizontal position is properly not more than 20° and preferably in the range of 5–15°. Since the sliced segments are already capable of being conveyed, the sliced segments of the porous cross-linked polymer will not fold or crack even when the angle of inclination of the lower guide is larger than that of the upper guide. If the angle of inclination, $\theta_2$, of the lower guide from the horizontal position exceeds 20°, the excess will be at a disadvantage in causing the porous cross-linked polymer formed on the lower side in a thickness of Y mm when the porous cross-linked polymer 2Y mm in thickness is sliced into two segments to sustain a fold or a crack during the process of conveyance.

For the sake of enhancing slippage between the porous cross-linked polymer formed on the upper side by slicing and the upper guide and allaying the inclination of the segment toward folding or cracking, methods such as (A) boring a proper number of air (or water) spraying holes 305 as properly spaced in the upper guide 301 and disposing mold release means such as a gas (or liquid) spraying mechanism for blowing air through the holes (or emitting a flow of water, for example, and forming a liquid film), (2) applying to the inclined surface of the upper guide (the surface of contact with the porous cross-linked polymer) a fluorine resin sheet 307 having a low level of critical surface tension or a sheet or a film of fluorine resin having only small resistance to slippage, and (3) forming the upper guide itself with a material excellent in the mold release property or a fluorine resin offering small resistance to slippage prove advantageous.

When the porous cross-linked polymer is to be continuously sliced subsequently to the polymerization, the polymer may be formed in the shape of a layer (n×X) mm in thickness and this polymer may be sliced at n−1 stages into sheets or films 3 mm in thickness to give rise to n sheets or films. In this case, a method for sequentially slicing the polymer may be implemented by serially arranging a plurality of such horizontal endless band knives on the route of conveyance, with the slicing surfaces (heights from the conveying device) thereof positioned stepwise.

As another mode of embodying the method of continuously slicing the porous cross-linked polymer of this invention, as in the case of $\theta=90°$ depicted in FIG. 1 (B), for example, simultaneous slicing may be implemented by disposing a plurality of vertical endless band knives on the route of conveyance. Since the endless band knives offer no resistance to gravity, they eliminate the need for particularly using a support and, consequently, obviates the necessity for being provided with such guides as mentioned above. Since a plurality of polymers can be sliced all at once, this construction unusually excels in rationality and economy as evinced by the ability to shorten the route of conveyance and curtail the slicing time and moreover brings the advantage of preventing the sliced segments of the porous cross-linked polymer from sustaining fracture.

If the slicing speed of the porous cross-linked polymer is unduly high, the porous cross-linked polymer will possibly sustain a fold or a crack. The slicing speed, therefore, is properly not more than 100 m/minute, preferably in the range of 1–30 m/minute.

The temperature at which the porous cross-linked polymer is sliced is preferred to be higher than the glass transition point of the porous cross-linked polymer. If this temperature is lower than the glass transition point of the polymer, the shortage will possibly be at a disadvantage in fracturing the porous structure of the polymer and altering the pore diameters.

(10) Step of after-treatment (reduction to finished product) after formation of porous cross-linked polymer (a) Dehydration The porous cross-linked polymer produced by the polymerization or, as occasion demands, formed further by the slicing operation after the polymerization is generally dehydrated by compression, suction by decompression, or combination thereof. Generally, in consequence of the dehydration of this nature, the portion 50–98% of the water used is dehydrated and the remainder survives as lodged in the porous cross-linked polymer.

The ratio of dehydration is suitably set, depending on the purpose for which the porous cross-linked polymer is used.

Generally, it suffices to set the ratio of dehydration that the porous cross-linked polymer may assume a water content in the range of 1–10 g or a water content in the range of 1–5 g, per g of the porous cross-linked polymer in a perfectly dried state.

(b) Compression

The porous cross-linked polymer of this invention can be obtained in a form compressed to one of several divisions of the original thickness. The compressed sheet has a smaller inner volume than the original porous cross-linked polymer and permits a decrease in the cost of transportation or storage. The porous cross-linked polymer in the compressed state is characterized by being disposed to absorb water when exposed to a large volume of water and resume the original thickness and exhibiting the ability to absorb water at a higher speed than the original polymer.

For the porous cross-linked polymer to acquire a compressed form, it suffices to adopt compressing means conforming to the shape of the porous cross-linked polymer so as to exert uniform pressure to the porous cross-linked polymer and compress it uniformly. This invention prefers the steps following the polymerization to be performed continuously by using a proper conveying device so that the porous cross-linked polymer may be conveyed and dehydrated meantime and thereafter compressed by being passed between rolls or belts separated with an adjusted interval. Generally the sheet is caused to decrease the thickness thereof to a certain extent by the work of compression or the work of suction by decompression at the step of dehydration mentioned above. The need for deliberately incorporating the step of compression is no longer exist when the sheet which has undergone the step of dehydration has a thickness in the prescribed range.

The temperature at which the porous cross-linked polymer is compressed during the preceding step of dehydration and the current step of compression is preferred to be higher than the glass transition point of the porous cross-linked polymer. When the temperature of interest is lower than the glass transition point of the polymer, the shortage possibly fractures the porous structure and alter the pore diameters.

From the viewpoint of saving the space for transportation or storage and facilitating the handling, it is effective to compress the polymer to not more than ½ of the original thickness. Preferably, the compression is made to not more than ¼ of the original thickness.

(c) Cleaning

For the purpose of improving the surface condition of the porous cross-linked polymer, the porous cross-linked polymer may be washed with pure water, an aqueous solution containing an arbitrary additive, or a solvent.

(d) Drying

The porous cross-linked polymer obtained by the preceding steps, when necessary, may be dried by heating as with hot air or microwaves or may be moistened for adjustment of the water content.

(e) Cutting

The porous cross-linked polymer obtained by the preceding steps, when necessary, may be cut in expected shape and size and fabricated into a finished product fitting the purpose of use.

(f) Impregnation

The polymer may be endowed with functionality by being impregnated with a detergent or an aromatic agent.

EXAMPLE

Now, this invention will be described more specifically below with reference to working examples.

Example 1

An oil phase was prepared by adding and uniformly dissolving 0.4 mass part of diglycerin monooleate to a mixture consisting of 5.0 mass parts of 2-ethylhexyl acrylate and 3.0 mass parts of 55% divinyl benzene. Separately, a water phase was prepared by dissolving 8.0 mass parts of calcium chloride and 0.2 mass part of potassium persulfate in 395 mass parts of purified water and heated to a temperature of 55° C. The oil phase and the water phase were continuously supplied at a ratio of 1/48 into a dynamic mixing device and mixed and emulsified therein, to produce HIPE (1).

This HIPE (1) was continuously cast on a PET film (lower sheet) of a driving and conveying device composed of a horizontally disposed endless steel belt 60 cm in width and the PET film and provided at the opposite ends thereof with gaskets of tubes measuring 5 mm in diameter and made of soft vinyl chloride resin by the use of a coater so as to form a layer of 50 cm in width and 5 mm in thickness. Then, another PET film (upper sheet) was overlaid on the resultant layer, subsequently heated to 85° C. by the circulation of a hot air, and passed over a period of 60 minutes through a polymerizing furnace furnished with a 85° C. hot water shower adapted to spray hot water of 85° C. to the lower steel belt thereby polymerizing the HIPE. The porous cross-linked polymer consequently obtained (hereinafter occasionally referred to briefly as "polymer") (1) had smooth upper and lower surfaces and a thickness of 5±0.2 mm. The opposite ends in the direction of width of the polymer (1) which were contacting with the gaskets were cut to afford a polymer sheet. The yield was 99.6%. The evaluation results are shown in Table 1 below.

Example 2

A HIPE (1) manufactured in the same manner as in Example 1 was applied to a PET film (lower sheet) of a driving and conveying device composed of a horizontally disposed jacketed band-shaped steel plate 1.1 m in width and the PET film and provided at the opposite ends thereof with gaskets of tubes measuring 5 mm in diameter and made of polytetrafluoroethylene (made by DuPont and sold under the trademark designation of "Teflon", hereinafter occasionally referred to briefly as "Teflon") by the use of a coater so as to form a layer 1.0 min width and 5 mm in thickness. Then, another PET film (upper sheet) was overlaid on the resultant layer, subsequently heated to 85° C. by circulation of a hot air to the upper PET film, and passed over a period of 60 minutes through a polymerizing furnace furnished with a 85° C. hot water supply unit adapted for feeding the hot water to the lower jacketed band-shaped steel plate thereby polymerizing the HIPE. The porous cross-linked polymer consequently obtained (2) had smooth upper and lower surfaces and a thickness of 5±0.3 mm. The opposite ends in the direction of width of the polymer (2) which were contacting the gaskets were cut to afford a polymer sheet. The yield was 99.7%. The evaluation results are shown in Table 1 below.

Example 3

A polymer (3) was obtained by repeating the procedure of Example 1 while changing the width of the endless steel bent and the PET film to 1.6 m, forming the layer of the HIPE in a width of 1.5 m, and passing the layer over a period of 30 minutes through the polymerizing furnace kept at 90° C. with hot air. The yield of the polymer sheet obtained by cutting the opposite ends in the direction of width of the polymer (3) was 99.8%. The evaluation results are shown in Table 1 below.

Example 4

A polymer (4) was obtained by repeating the procedure of Example 2 while changing the width of the band-shaped steel plate and the PET film to 2.7 m, forming a layer of the HIPE in a width of 2.5 m, and passing the layer over a period of 60 minutes through the polymerizing furnace kept at 85° C. with hot air. The polymer (4) had smooth upper and lower surfaces and a thickness of 5±0.5 mm. The yield of the polymer sheet obtained by cutting the opposite ends in the direction of width of the polymer (3) was 99.8%. The evaluation results are shown in Table 1 below.

to form a layer 5 mm in thickness and the bag filled with the layer of HIPE was taken up by the use of a winding device possessing a vertical axis so as to form a roll having as uniform a thickness as permissible in the direction of height. The roll was then placed in a batch type polymerizing furnace and polymerized at 60° C. for 8 hours. Since the polymer (2) for comparison extracted from the bag of polypropylene was thick in the lower part and thin in the upper part, a portion of 90 mm from the lower end and a portion of 30 mm from the upper end were cut. The yield was 88.0%. The polymer (2) for comparison obtained by cutting the upper part and the lower part had a thickness accuracy of 5.0±1.2 mm. The evaluation results are shown in Table 1 below.

TABLE 1

| | Method of polymerization | Width or height (m) | Thickness accuracy (mm) | Yield (%) |
|---|---|---|---|---|
| Example 1 | Horizontal method<br>Upper: PET film<br>Lower: PET film<br>60 cm steel belt | 0.5 Width | 5 ± 0.2 | 99.6 |
| Example 2 | Horizontal method<br>Upper: PET film<br>Lower: PET film<br>1.1 m band-shaped plate | 1.0 Width | 5 ± 0.3 | 99.7 |
| Example 3 | Horizontal method<br>Upper: PET film<br>Lower: PET film<br>1.6 m steel belt | 1.5 Width | 5 ± 0.3 | 99.8 |
| Example 4 | Horizontal method<br>Upper: PET film<br>Lower: PET film<br>2.7 m band-shaped plate | 2.5 Width | 5 ± 0.5 | 99.8 |
| Comparative Example 1 | Combination continuous packing + batch polymerization method<br>Bag made of PP and fitted with a zipper<br>Packing Taking up Polymerization | 0.5 Height | 5 ± 1.0<br>Lower part tending to thicken | 88.0<br>Since lower part tended to thicken, 40 mm cut from the lower end and 20 mm cut from the upper end |
| Comparative Example 2 | Combination continuous packing + batch polymerization method<br>Bag made of PP and fitted with a zipper<br>Packing Taking up Polymerization | 1.0 Height | 5 ± 1.2<br>Lower part tending to thicken | 88.0<br>Since lower part tended to thicken, 90 mm cut from the lower end and 30 mm cut from the upper end |

Comparative Example 1

A HIPE (1) manufactured in the same manner as in Example 1 was packed in a bag having a height of 0.5 m, made of polypropylene (PP), and fitted with a fastener so as to form a layer of HIPE 5 mm in thickness and the bag was taken up meantime by the use of a winding device possessed of a vertical axis so as to assume as uniform a thickness as permissible in the direction of height. The roll of HIPE was placed in a batch type polymerizing furnace and polymerized therein at 60° C. for 8 hours. The polymer (1) for comparison extracted from the bag of polypropylene was thick in the lower part and thin in the upper part. Thus, the part 40 mm from the lower end and the part 20 mm from the upper end were cut. The yield, therefore, was 88.0%. The polymer (1) for comparison obtained by cutting the upper and the lower part had a thickness of 5.0±1.0 mm. The evaluation results are shown in Table 1 below.

Comparative Example 2

A HIPE (1) manufactured in the same manner as in Example 1 was packed in a bag having a height of 1.0 m, made of polypropylene (PP), and fitted with a fastener to as

Example 5

A HIPE (1) manufactured in the same manner as in Example 1 was continuously applied to a PET film (lower sheet) of a horizontally disposed driving and conveying device composed of an endless belt made of SUS 316 and the PET film and provided in the opposite ends thereof with gaskets of tubes having a diameter of 5 mm and made of soft vinyl chloride resin so as to form a layer 5 mm in thickness by the use of a coater and the upper part of the device was swept with nitrogen gas to give rise to a nitrogen atmosphere. The layer of HIPE was then passed over a period of 60 minutes through a polymerizing furnace provided with a 90° C. nitrogen gas circulation unit for supplying the nitrogen gas to the upper part and a 90° C. hot water shower unit for spraying the belt of SUS316 in the lower part with the hot water so as to be polymerized therein. The upper surface of the polymer (5) consequently obtained showed a slight sign of undulation and slightly lowered smoothness. The electron photomicrographs (1000 magnifications) of the upper surface (the surface held in contact with nitrogen gas) and the lower surface (the surface held in contact with the PET film) were visually examined to determine the cell structure. The upper surface was found to have cells of small pore diameters and show a conspicuous inclination toward clogging and the lower surface to form open cells having a large degree of aperture. When the polymer (5) was examined to determine the condition of pinholes and voids, it was found to contain an average of 5 to 6 pinholes or voids not more than 2 mm in diameter per 1 m². The results of the test of the polymer (5) for performance are shown in Table 2 below and the electron photomicrographs of the upper and lower surfaces are shown respectively in FIG. 7 and FIG. 8.

Example 6

A HIPE (1) manufactured in the same manner as in Example 1 was continuously applied to a PET film (lower sheet) of a horizontally disposed driving and conveying device composed of an endless belt made of SUS 316 and the PET film and provided in the opposite ends thereof with gaskets of tubes having a diameter of 7 mm and made of soft vinyl chloride resin so as to form a layer 5 mm in thickness by the use of a coater and the upper part of the device was swept with the same water phase as used in Example 1 and kept by heating at 60° C. (prepared during the stage of production of HIPE) to form up to the upper ends of the gaskets a state sealed with a water layer 2 mm in thickness. Then, the layer of HIPE was passed over a period of 60 minutes through a polymerizing furnace provided with a 85° C. hot water circulation unit for supplying the hot water to the upper part and a 85° C. hot water shower unit for spraying the belt of SUS316 in the lower part with the hot water so as to be polymerized therein. The upper surface of the polymer (6) consequently obtained showed a slight sign of undulation and slightly lowered smoothness. The electron photomicrographs (1000 magnifications) of the upper surface (the surface held in contact with the water layer) and the lower surface (the surface held in contact with the PET film) were visually examined to determine the cell structure. The upper surface was found to have cells of small pore diameters and show a conspicuous inclination toward clogging and the lower surface to form open cells having a large degree of aperture. When the polymer (5) was examined to determine the condition of pinholes and voids, it was found to contain an average of 3 to 4 pinholes or voids not more than 2 mm in diameter per 1 m². The results of the test of the polymer (6) for performance are shown in Table 2 below and the electron photomicrographs of the upper and lower surfaces are shown respectively in FIG. 9 and FIG. 8 (since the lower surface was held in contact with the PET film similarly in Example 5 and was possessed of the same cell structure, it was adopted as an alternative; this measure similarly applies hereinafter to the surface held in contact with a PET film)

Example 7

A HIPE (1) manufactured in the same manner as in Example 1 was continuously applied to a PP film (lower sheet) of a horizontally disposed driving and conveying device composed of an endless belt made of SUS 316 and the PP film and provided in the opposite ends thereof with gaskets of tubes having a diameter of 5 mm and made of soft vinyl chloride resin so as to form a layer 5 mm in thickness by the use of a coater. Then, the layer was overlaid with a PP film (upper sheet) and passed over a period of 60 minutes through a polymerizing furnace provided.with a 85° C. hot air circulation unit for supplying the hot air to the upper part and a 85° C. hot water shower unit for spraying the belt of SUS316 in the lower part with the hot water so as to be polymerized therein. The upper surface of the polymer (6) consequently obtained showed no sign of undulation and enjoyed satisfactory smoothness. The electron photomicrographs (1000 magnifications) of the upper surface (the surface held in contact with the PP film) and the lower surface (the surface held in contact with the PP film) were visually examined to determine the cell structure. The upper and lower surfaces were both found to have cells of small pore diameters and show an inclination toward clogging. When the polymer (7) was examined to determine the condition of pinholes and voids, it was found to contain an average of 0 to 2 pinholes or voids not more than 2 mm in diameter per 1 m². The results of the test of the polymer (7) for performance are shown in Table 2 below and the electron photomicrographs of the upper and lower surfaces are shown respectively in FIG. 10 (since the upper and lower surfaces were held in contact with the same film and were possessed of the same cell structure, one electron photomicrograph was used for illustration; this measure similarly applies hereinafter to the surface held in contact with the same film).

Example 8

Figure 8:
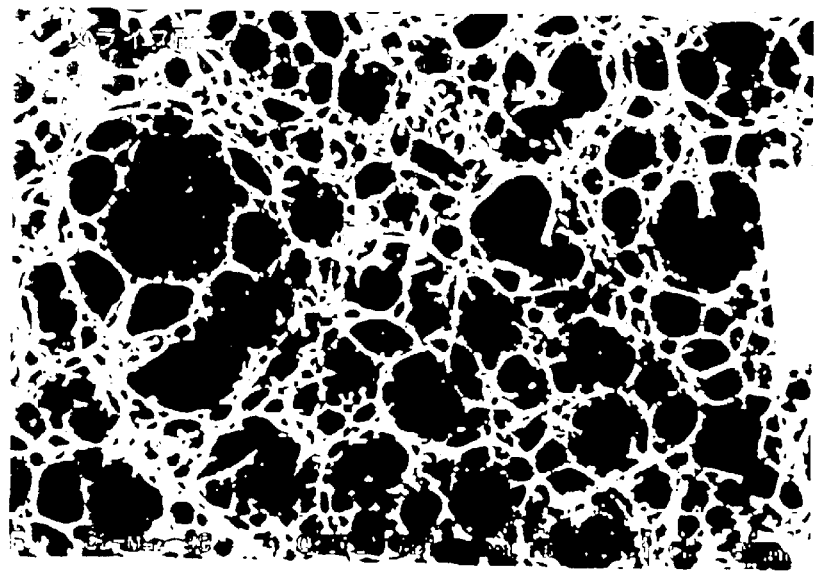
FIG. 8 is an electron photomicrograph (1000 magnifications) of the lower surface (the surface contacting the PET film) etc. of the porous cross-linked polymer (5) of this invention obtained in Example 5.
Figure 9:
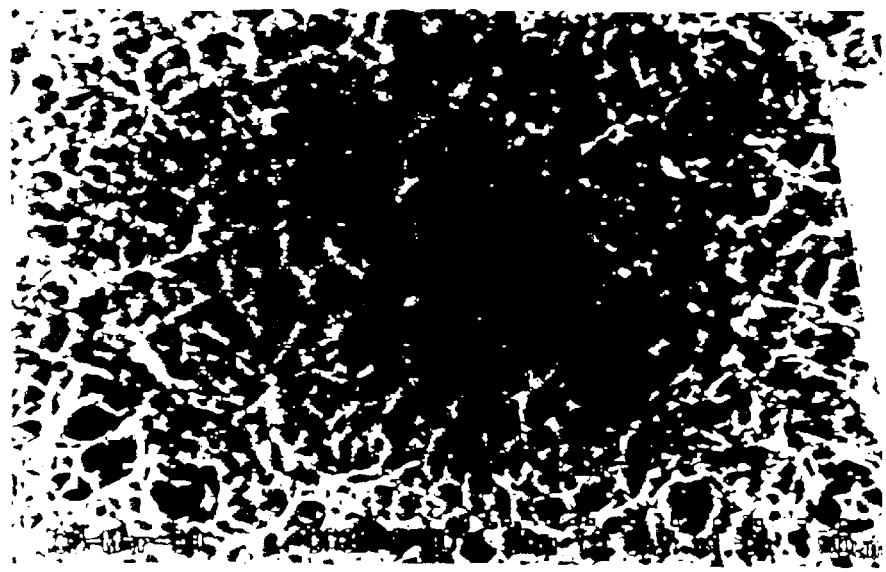
FIG. 9 is an electron photomicrograph (1000 magnifications) of an upper surface (the surface contacting the water layer) of a porous cross-linked polymer (6) of this invention obtained in Example 6.
Figure 10:
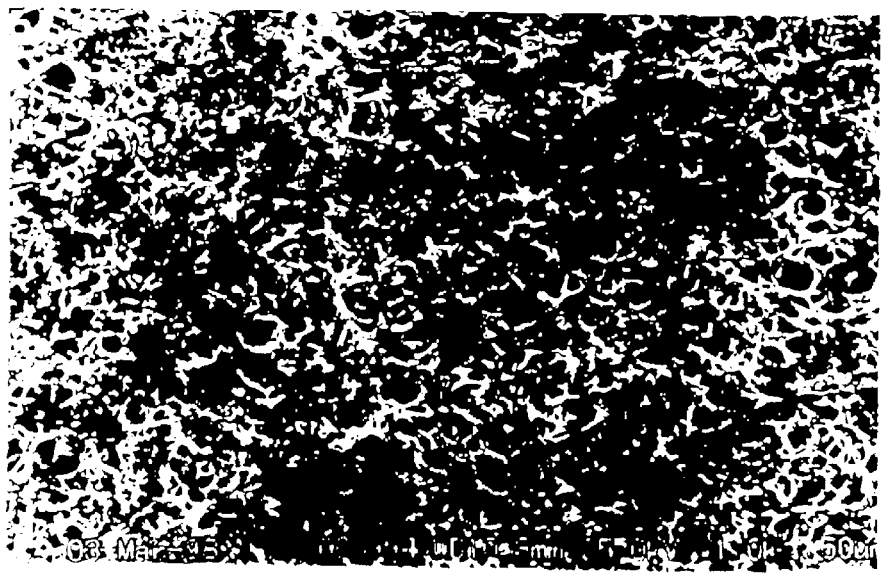
FIG. 10 is an electron photomicrograph (1000 magnifications) of an upper and a lower surface (the surfaces contacting the water layer) of the porous cross-linked polymer (6) of this invention obtained in Example 7.

A polymer (8) was obtained by repeating the procedure of Example 7 while having the upper sheet and the lower sheet both formed of PET film. The upper surface of the polymer (8) thus obtained showed no sign of undulation and enjoyed satisfactory smoothness. When the electron photomicrographs (1000 magnifications) of the upper surface (the surface held in contact with the PET film) and the lower surface (the surface held in contact with the PET film) were visually examined to determine the cell structure, the upper and lower surfaces were both found to have formed open cells of a large degree of aperture. When the polymer (8) was further observed visually to determine the condition of pinholes and voids, it was found to contain an average of 3–4 pinholes or voids not more than 2 mm in diameter per 1 m². The results of the test of the polymer (8) for performance are shown in Table 2 below and the electron photomicrographs of the upper and lower surfaces are shown in FIG. 8.

Example 9

Figure 11:
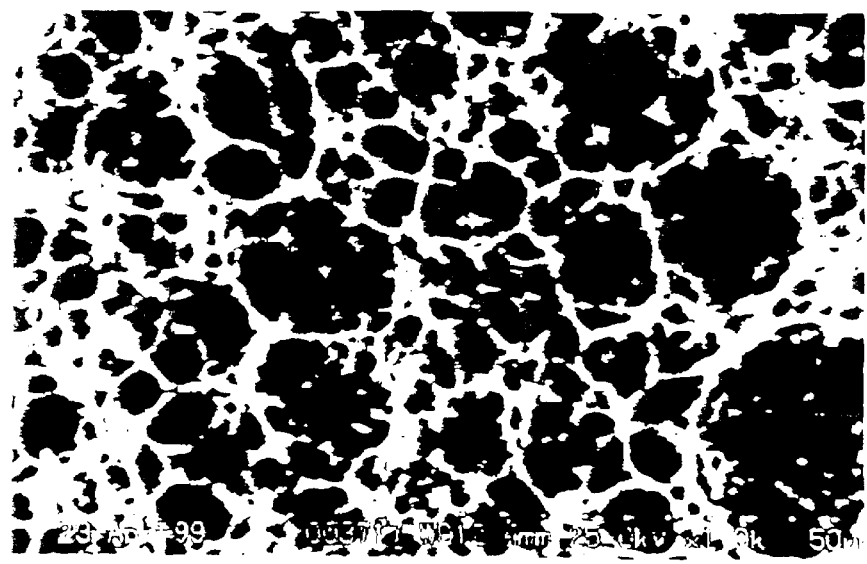
FIG. 11 is an electron photomicrograph (1000 magnifications) of an upper and a lower surface (the surfaces contacting the PBT film) of a porous cross-linked polymer (9) of this invention obtained in Example 9.

A polymer (9) was obtained by repeating the procedure of Example 7 while having the upper sheet and the lower sheet both formed of PBT film. The upper surface of the polymer (9) thus obtained showed no sign of undulation and enjoyed satisfactory smoothness. When the electron photomicrographs (1000 magnifications) of the upper surface (the surface held in contact with the PBT film) and the lower surface (the surface held in contact with the PBT film) were visually examined to determine the cell structure, the upper and lower surfaces were both found to have formed open cells of a large degree of aperture. When the polymer (9) was further observed visually to determine the condition of pinholes and voids, it was found to contain an average of 3–4 pinholes or voids not more than 2 mm in diameter per 1 m². The results of the test of the polymer (9) for performance are shown in Table 2 below and the electron photomicrographs of the upper and lower surfaces are shown in FIG. 11.

Example 10

Figure 12:
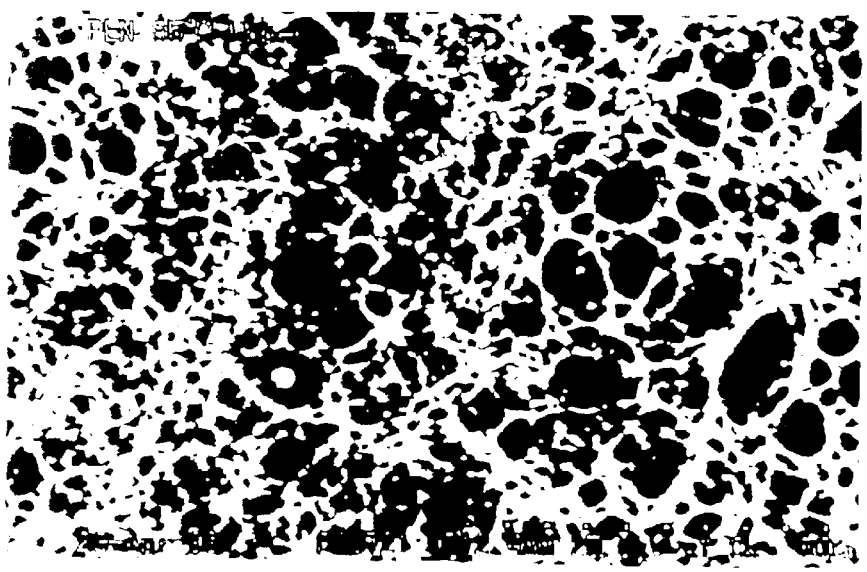
FIG. 12 is an electron photomicrograph (1000 magnifications) of an upper and a lower surface (the surfaces contacting the PEN film) of a porous cross-linked polymer (10) of this invention obtained in Example 10.
Figure 13:
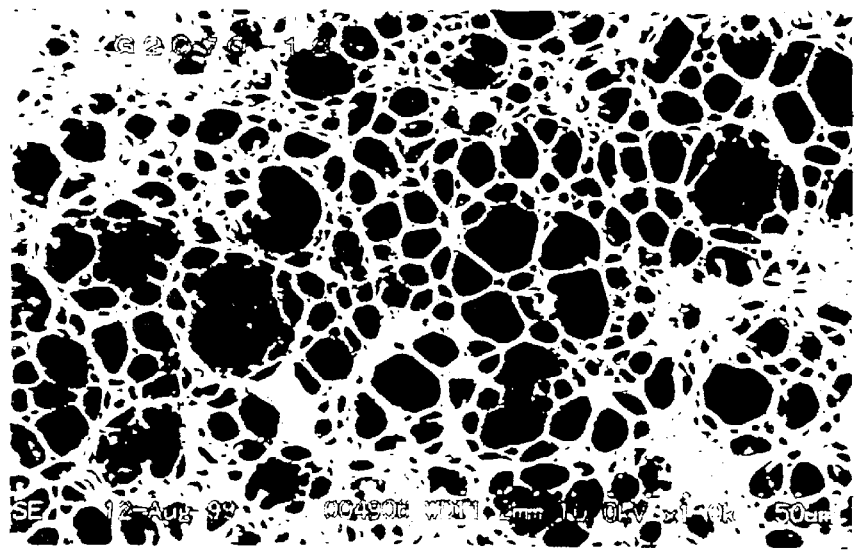
FIG. 13 is an electron photomicrograph (1000 magnifications) of an upper surface (the surface contacting a non-woven fabric obtained from PET long fibers) of a porous cross-linked polymer (11) of this invention obtained in Example 11.
Figure 14:
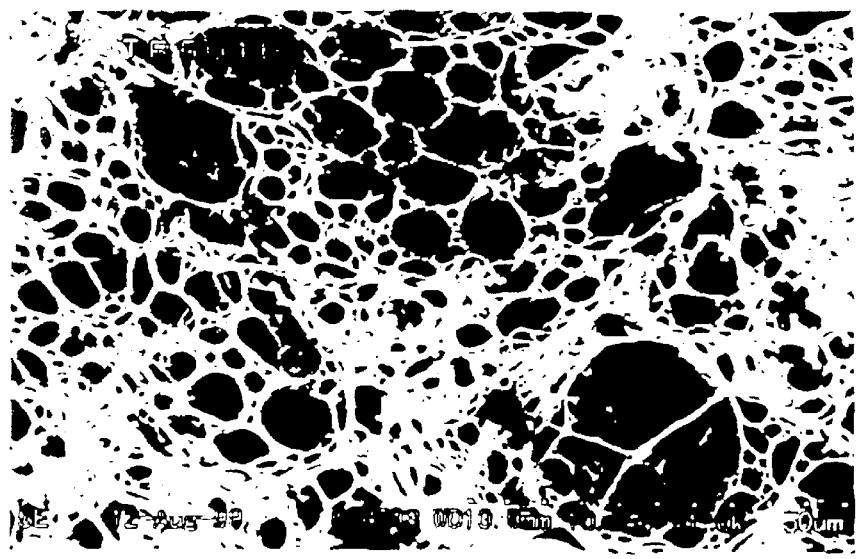
FIG. 14 is an electron photomicrograph (1000 magnifications) of an upper surface (the surface contacting a woven fabric obtained from PET multifilaments) of a porous cross-linked polymer (12) of this invention obtained in Example 12.

A polymer (10) was obtained by repeating the procedure of Example 7 while having the upper sheet and the lower sheet both formed of PEN film. The upper surface of the polymer (10) thus obtained showed no sign of undulation and enjoyed satisfactory smoothness. When the electron photomicrographs (1000 magnifications) of the upper surface (the surface held in contact with the PEN film) and the lower surface (the surface held in contact with the PEN film) were visually examined to determine the cell structure, the upper and lower surfaces were both found to have formed open cells of a large degree of aperture. When the polymer (10) was further observed visually to determine the condition of pinholes and voids, it was found to contain an average of 3–4 pinholes or voids not more than 2 mm in diameter per 1 m$^2$. The results of the test of the polymer (10) for performance are shown in Table 2 below and the electron photomicrographs of the upper and lower surfaces are shown in FIG. 12.

Example 11

A HIPE (1) manufactured in the same manner as in Example 1 was continuously applied to a PET film (lower sheet) of a horizontally disposed driving and conveying device composed of an endless belt made of SUS 316 and the PP film and provided in the opposite ends thereof with gaskets of tubes having a diameter of 5 mm and made of soft vinyl chloride resin so as to form a layer 5 mm in thickness by the use of a coater. Then, the layer was overlaid with a non-woven fabric (upper sheet) obtained from long PET fibers and having a gas permeability of 33 cm$^3$/cm$^2$ s and subsequently swept with nitrogen gas to form an atmosphere of nitrogen thereon. It was passed over a period of 60 minutes through a polymerizing furnace provided with a 90° C. nitrogen gas circulation unit for supplying the nitrogen gas to the upper part and a 90° C. hot water shower unit for spraying the belt of SUS316 in the lower part with the hot water so as to be polymerized therein. The upper surface of the polymer (11) consequently obtained showed an undulation and slightly lowered smoothness. The electron photomicrographs (1000 magnifications) of the upper surface (the surface held in contact with the non-woven fabric obtained from long PET fibers) and the lower surface (the surface held in contact with the PET film) were visually examined to determine the cell structure. The upper surface was found to form cells slightly smaller in diameter than the cells in the lower PET film and show a slight inclination toward clogging and the lower surface was found to have open cells of a large degree of aperture. When the polymer (11) was further observed visually to determine the condition of pinholes and voids, it was found to contain an average of 0–2 pinholes or voids not more than 2 mm in diameter per 1 m$^2$. The results of the test of the polymer (11) for performance are shown in Table 2 below and the electron photomicrographs of the upper and lower surfaces are shown respectively in FIG. 13 and FIG. 8.

Example 12

A polymer (12) was obtained by repeating the procedure of Example 7 while forming the upper sheet with a woven fabric (gas permeability 0.5 cm$^3$/cm$^2$·s) obtained from PET multifilaments. The upper surface of the polymer (12) thus obtained showed no sign of undulation and slightly lowered smoothness. The electron photomicrographs (1000 magnifications) of the upper surface (the surface held in contact with the woven fabric obtained from PET multifilaments) and the lower surface (the surface held in contact with the PET film) were visually examined to determine the cell structure. The upper surface was found to form cells slightly smaller in diameter than the cells in the lower PET film and show a slight inclination toward clogging and the lower surface was found to have open cells of a large degree of aperture. When the polymer (12) was further observed visually to determine the condition of pinholes and voids, it was found to contain an average of 0–2 pinholes or voids not more than 2 mm in diameter per 1 m$^2$. The results of the test of the polymer (12) for performance are shown in Table 2 below and the electron photomicrographs of the upper and lower surfaces are shown respectively in FIG. 14 and FIG. 8.

Example 13

Figure 15:
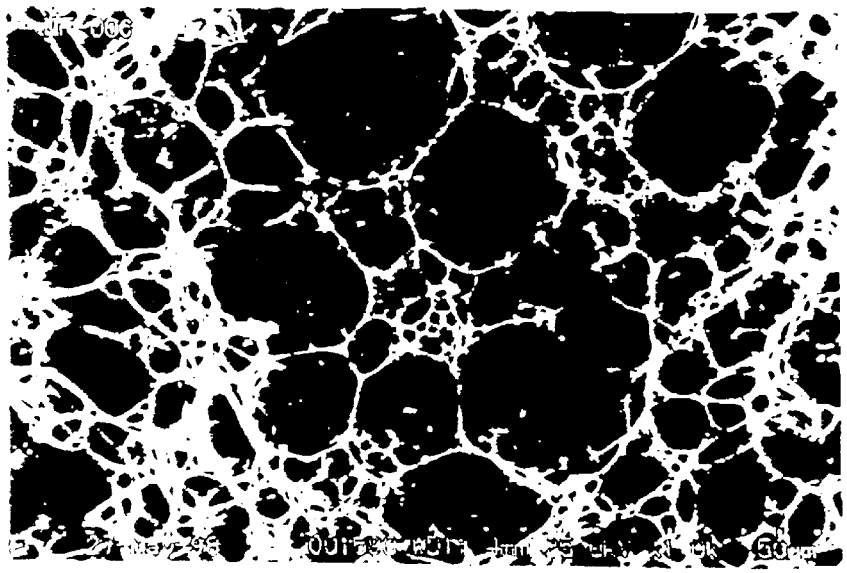
FIG. 15 is an electron photomicrograph (1000 magnifications) of an upper and a lower surface (the surfaces contacting a PTFE porous film) of a porous cross-linked polymer (13) of this invention obtained in Example 13.

A polymer (13) was obtained by repeating the procedure of Example 7 while forming the upper sheet with a porous film of PTFE (gas permeability 0.04 cm$^3$/cm$^2$·s). The upper surface of the polymer (13) thus obtained showed no sign of undulation and comparatively satisfactory smoothness. The electron photomicrographs (1000 magnifications) of the upper surface (the surface held in contact with the porous film of PTFE) and the lower surface (the surface held in contact with the PET film) were visually examined to determine the cell structure. The upper and lower surfaces were both found to form open cells of a large degree of aperture. When the polymer (13) was further observed visually to determine the condition of pinholes and voids, it was found to contain an average of 0–2 pinholes or voids not more than 2 mm in diameter per 1 m$^2$. The results of the test of the polymer (13) for performance are shown in Table 2 below and the electron photomicrographs of the upper and lower surfaces are shown in FIG. 15.

Example 14

Figure 16:
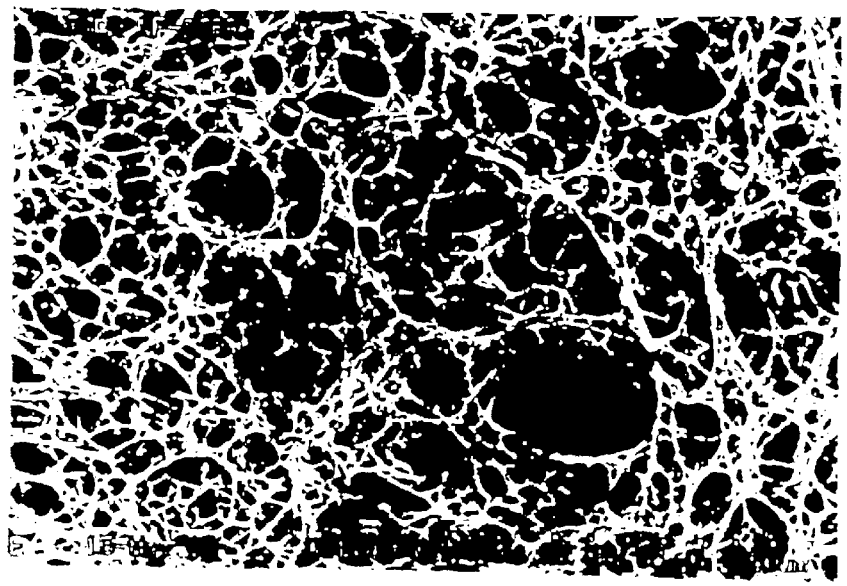
FIG. 16 is an electron photomicrograph (1000 magnifications) of an upper and a lower surface (the surfaces contacting a PFA film) of a porous cross-linked polymer (14) of this invention obtained in Example 14.

A polymer (14) was obtained by repeating the procedure of Example 7 while forming the upper sheet with a PFA film and the lower sheet with a PFA film applied to a belt of SUS 316 with a silicone type tackifier (made by Toray Dow Coating K.K. and sold under the trademark designation of "Silicone SD4580 PSA). The upper surface of the polymer (14) thus obtained showed no sign of undulation and enjoyed comparatively satisfactory smoothness. The electron photomicrographs (1000 magnifications) of the upper surface (the surface held in contact with the PFA film) and the lower surface (the surface held in contact with the PFA film applied to the belt of SUS 316 with a silicone type tackifier) were visually examined to determine the cell structure. The upper and lower surfaces were both found to form open cells of a large degree of aperture. When the polymer (14) was further observed visually to determine the condition of pinholes and voids, it was found to contain an average of 3–4 pinholes or voids not more than 2 mm in diameter per 1 m$^2$. The results of the test of the polymer (14) for performance are shown in Table 2 below and the electron photomicrographs of the upper and lower surfaces are shown in FIG. 16.

Example 15

Figure 17:
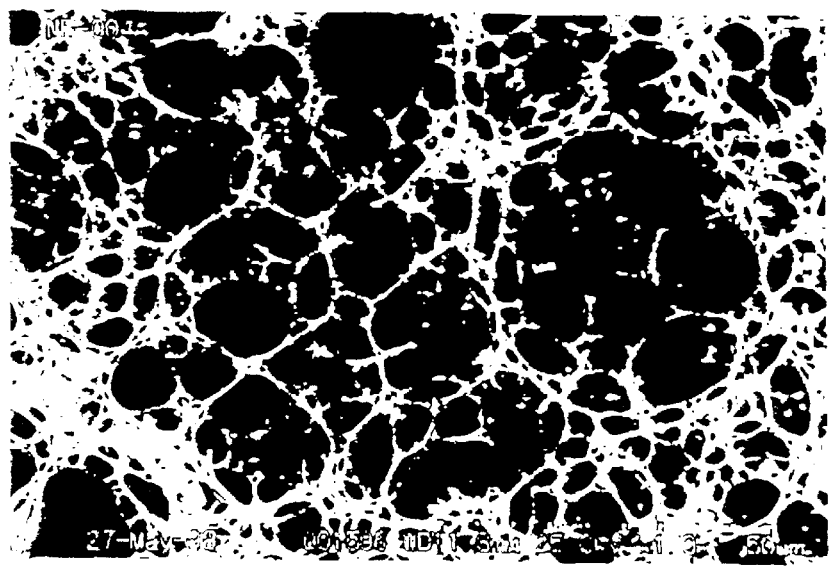
FIG. 17 is an electron photomicrograph (1000 magnifications) of an upper and a lower surface (the surfaces contacting a FPE film) of a porous cross-linked polymer (15) of this invention obtained in Example 15.

A polymer (15) was obtained by repeating the procedure of Example 7 while forming the upper sheet with a FPE film and the lower sheet with a FPE film applied to a belt of SUS 316 with a silicone type tackifier (made by Toray K.K. and sold under the trademark designation of "Epoxy Type Adhesive Agent TE2001). The upper surface of the polymer (15) thus obtained showed no sign of undulation and enjoyed satisfactory smoothness. The electron photomicrographs (1000 magnifications) of the upper surface (the surface held in contact with the FPE film) and the lower surface (the surface held in contact with the FPE film applied to the belt of SUS 316 with an epoxy type adhesive agent) were visually examined to determine the cell structure. The upper and lower surfaces were both found to form open cells of a large degree of aperture. When the polymer (15) was further observed visually to determine the condition of pinholes and voids, it was found to contain an average of 3–4 pinholes or voids not more than 2 mm in diameter per 1 m$^2$. The results of the test of the polymer (15) for performance are shown in Table 2 below and the electron photomicrographs of the upper and lower surfaces are shown in FIG. 17.

Example 16

Figure 18:
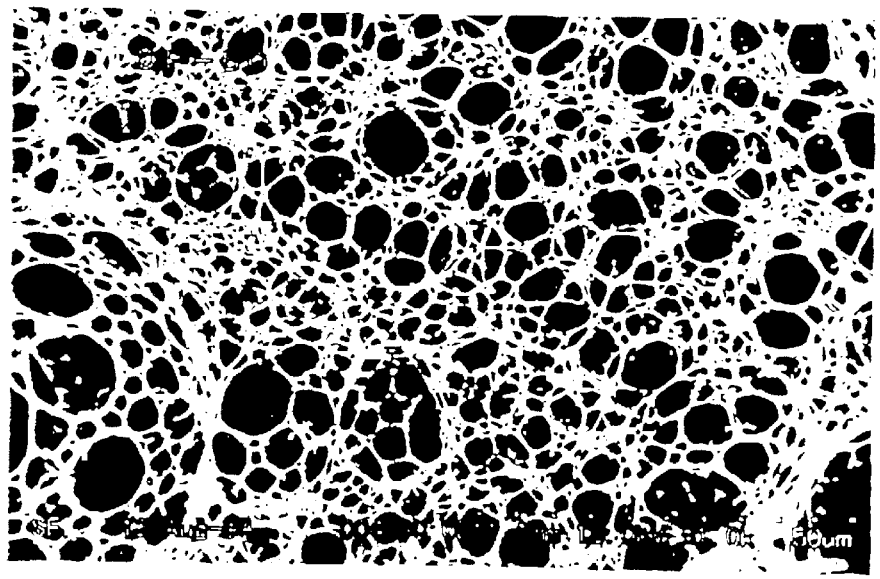
FIG. 18 is an electron photomicrograph (1000 magnifications) of an upper and a lower surface (the surfaces contacting a PET film coated with silicone resin) of a porous cross-linked polymer (16) of this invention obtained in Example 16.

A polymer (16) was obtained by repeating the procedure of Example 7 while forming the upper and lower sheets both with a PET film coated with a silicone resin as a mold release agent. The upper surface of the polymer (15) thus obtained showed no sign of undulation and enjoyed satisfactory smoothness. The electron photomicrographs (1000 magnifications) of the upper surface (the surface held in contact with the PET film) and the lower surface (the surface held in contact with the PET film coated with a silicone resin) were visually examined to determine the cell structure. The upper and lower surfaces were both found to form open cells of a large degree of aperture. When the polymer (16) was further observed visually to determine the condition of pinholes and voids, it was found to contain an average of 0–2 pinholes or voids not more than 2 mm in diameter per 1 m$^2$. The results of the test of the polymer (16) for performance are shown in Table 2 below and the electron photomicrographs of the upper and lower surfaces are shown in FIG. 18.

Example 17

Figure 19:
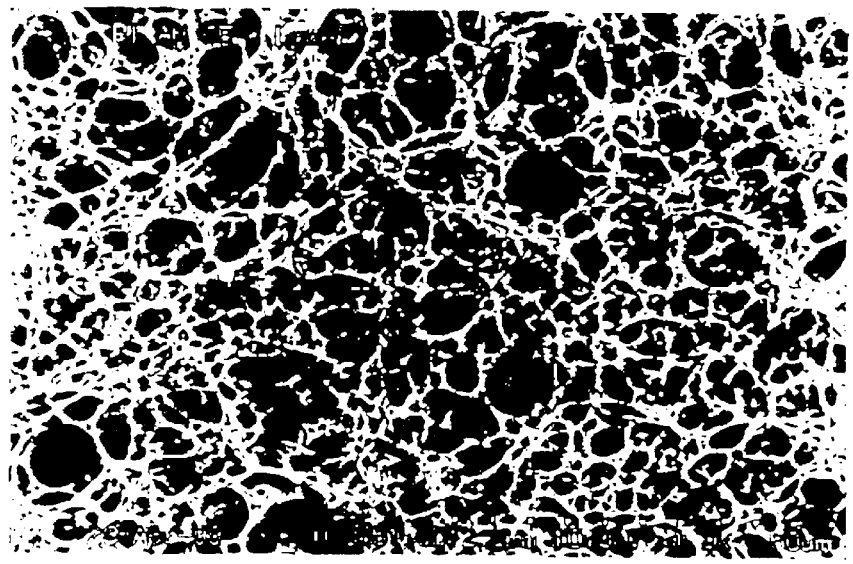
FIG. 19 is an electron photomicrograph (1000 magnifications) of an upper and a lower surface (the surfaces contacting a PI film) of a porous cross-linked polymer (17) of this invention obtained in Example 17.

A HIPE (1) manufactured in the same manner as in Example 1 was continuously applied to a PI film (lower sheet) of a horizontally disposed driving and conveying device composed of a jacketed band-shaped plate of steel and the PI film and provided in the opposite ends thereof with square bars having a thickness of 5 mm and made of polytetrafluoroethylene (made by DuPont and sold under the trademark designation of "Teflon") so as to form a layer 5 mm in thickness by the use of a coater. Then, the layer was overlaid with a PI film (upper sheet). It was passed over a period of 60 minutes through a polymerizing furnace provided with a 85° C. hot air circulation unit for delivering the hot air to the upper PI film and a 85° C. hot water supply unit for feeding the hot water to the lower jacketed band-shaped steel plate so as to be polymerized therein. The upper surface of the polymer (17) consequently obtained showed no sign of undulation and enjoyed satisfactory smoothness. The electron photomicrographs (1000 magnifications) of the upper surface (the surface held in contact with the PI film) and the lower surface (the surface held in contact with the PI film) were visually examined to determine the cell structure. The upper and lower surfaces were both found to form open cells of a relatively large degree of aperture. When the polymer (17) was further observed visually to determine the condition of pinholes and voids, it was found to contain an average of 0–2 pinholes or voids not more than 2 mm in diameter per 1 m$^2$. The results of the test of the polymer (17) for performance are shown in Table 2 below and the electron photomicrographs of the upper and lower surfaces are shown in FIG. 19.

Example 18

Figure 20:
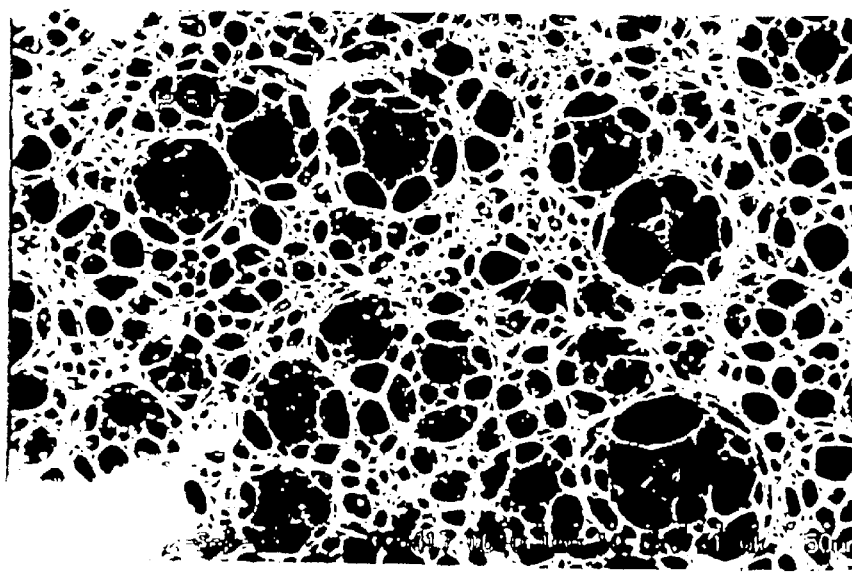
FIG. 20 is an electron photomicrograph (1000 magnifications) of an upper and a lower surface (the surfaces contacting a PSF film) of a porous cross-linked polymer (18) of this invention obtained in Example 18.

A polymer (18) was obtained by repeating the procedure of Example 17 while forming the upper and lower sheets both with a PSF film. The upper surface of the polymer (18) thus obtained showed no sign of undulation and enjoyed satisfactory smoothness. The electron photomicrographs (1000 magnifications) of the upper surface (the surface held in contact with the PSF film) and the lower surface (the surface held in contact with the PSF film) were visually examined to determine the cell structure. The upper and lower surfaces were both found to form open cells of a relatively large degree of aperture. When the polymer (18) was further observed visually to determine the condition of pinholes and voids, it was found to contain an average of 3–4 pinholes or voids not more than 2 mm in diameter per 1 m$^2$. The results of the test of the polymer (16) for performance are shown in Table 2 below and the electron photomicrographs of the upper and lower surfaces are shown in FIG. 20.

Example 19

Figure 21:
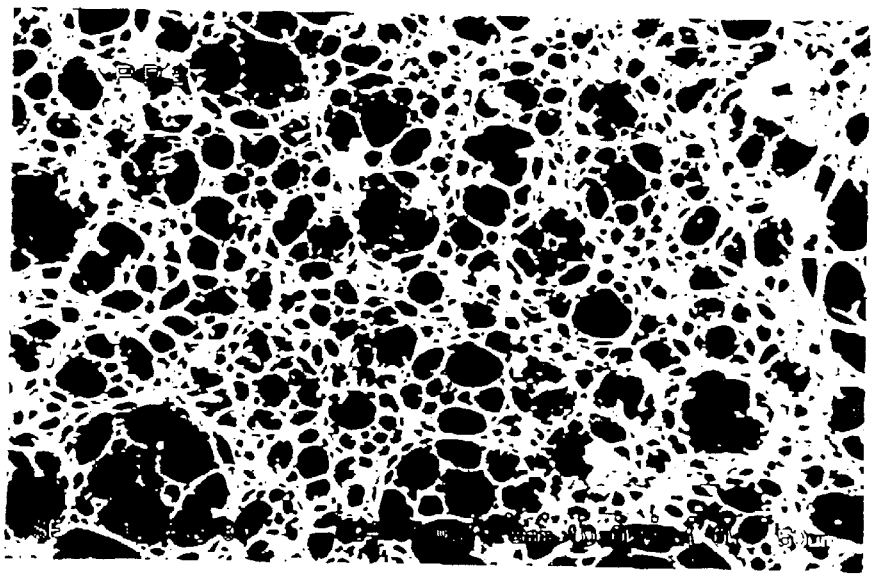
FIG. 21 is an electron photomicrograph (1000 magnifications) of an upper and a lower surface (the surfaces contacting a PPS film) of a porous cross-linked polymer (19) of this invention obtained in Example 19.

A polymer (19) was obtained by repeating the procedure of Example 17 while forming the upper and lower sheets both with a PPS film. The upper surface of the polymer (19) thus obtained showed no sign of undulation and enjoyed satisfactory smoothness. The electron photomicrographs (1000 magnifications) of the upper surface (the surface held in contact with the PPS film) and the lower surface (the surface held in contact with the PPS film) were visually examined to determine the cell structure. The upper and lower surfaces were both found to form open cells of a relatively large degree of aperture. When the polymer (19) was further observed visually to determine the condition of pinholes and voids, it was found to contain an average of 0–2 pinholes or voids not more than 2 mm in diameter per 1 m$^2$. The results of the test of the polymer (19) for performance are shown in Table 2 below and the electron photomicrographs of the upper and lower surfaces are shown in FIG. 21.

Example 20

Figure 22:
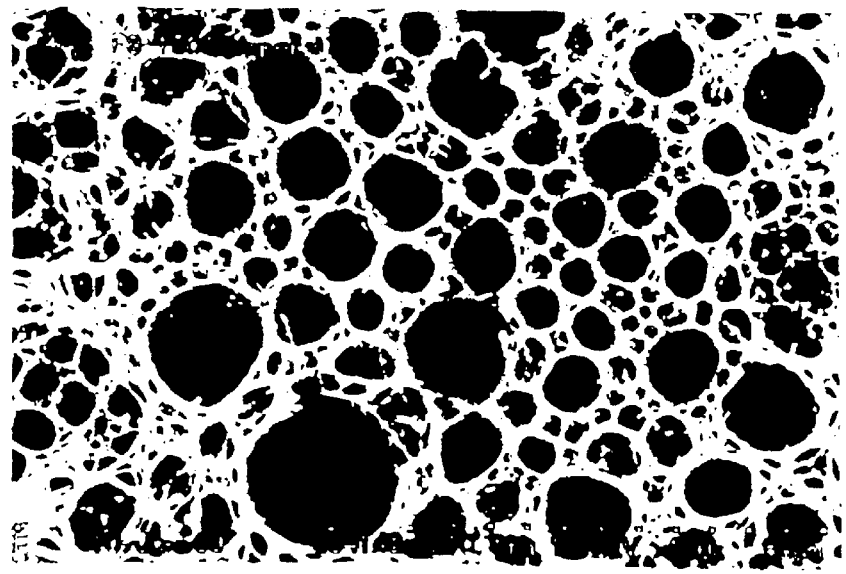
FIG. 22 is an electron photomicrograph (1000 magnifications) of an upper and a lower surface (the surfaces contacting a PES film) of a porous cross-linked polymer (20) of this invention obtained in Example 20.

A polymer (20) was obtained by repeating the procedure of Example 17 while forming the upper and lower sheets both with a PES film. The upper surface of the polymer (19) thus obtained showed no sign of undulation and enjoyed satisfactory smoothness. The electron photomicrographs (1000 magnifications) of the upper surface (the surface held in contact with the PES film) and the lower surface (the surface held in contact with the PES film) were visually examined to determine the cell structure. The upper and lower surfaces were both found to form open cells of a relatively large degree of aperture. When the polymer (20) was further observed visually to determine the condition of pinholes and voids, it was found to contain an average of 3–4 pinholes or voids not more than 2 mm in diameter per 1 m$^2$. The results of the test of the polymer (20) for performance are shown in Table 2 below and the electron photomicrographs of the upper and lower surfaces are shown in FIG. 22.

Example 21

Figure 23:
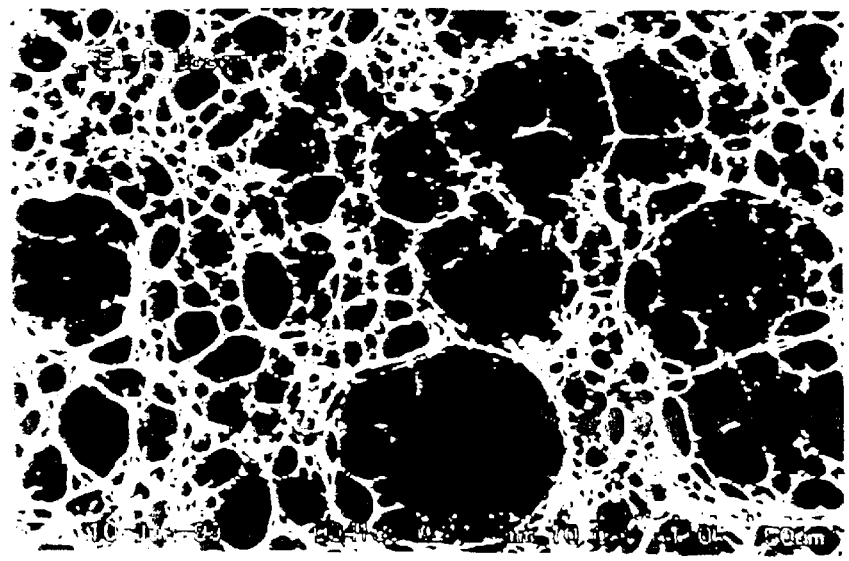
FIG. 23 is an electron photomicrograph (1000 magnifications) of an upper and a lower surface (the surfaces contacting a PEI film) of a porous cross-linked polymer (21) of this invention obtained in Example 21.

A polymer (21) was obtained by repeating the procedure of Example 17 while forming the upper and lower sheets both with a PEI film. The upper surface of the polymer (21) thus obtained showed no sign of undulation and enjoyed satisfactory smoothness. The electron photomicrographs (1000 magnifications) of the upper surface (the surface held in contact with the PEI film) and the lower surface (the surface held in contact with the PEI film) were visually examined to determine the cell structure. The upper and lower surfaces were both found to form open cells of a relatively large degree of aperture. When the polymer (21) was further observed visually to determine the condition of pinholes and voids, it was found to contain an average of 3–4 pinholes or voids not more than 2 mm in diameter per 1 m². The results of the test of the polymer (21) for performance are shown in Table 2 below and the electron photomicrographs of the upper and lower surfaces are shown in FIG. 23.

Example 22

Figure 24:
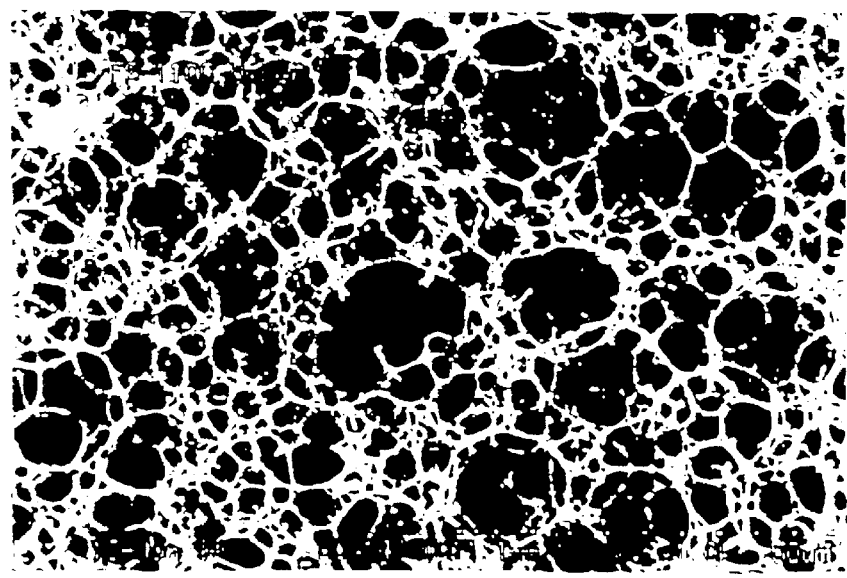
FIG. 24 is an electron photomicrograph (1000 magnifications) of an upper and a lower surface (the surfaces contacting a PEEK film) of a porous cross-linked polymer (22) of this invention obtained in Example 22.

A polymer (22) was obtained by repeating the procedure of Example 17 while forming the upper and lower sheets both with a PEEK film. The upper surface of the polymer (22) thus obtained showed no sign of undulation and enjoyed satisfactory smoothness. The electron photomicrographs (1000 magnifications) of the upper surface (the surface held in contact with the PEEK film) and the lower surface (the surface held in contact with the PEEK film) were visually examined to determine the cell structure. The upper and lower surfaces were both found to form open cells of a large degree of aperture. When the polymer (22) was further observed visually to determine the condition of pinholes and voids, it was found to contain an average of 2 pinholes or voids not more than 2 mm in diameter per 1 m². The results of the test of the polymer (22) for performance are shown in Table 2 and the electron photomicrographs of the upper and lower surfaces are shown in FIG. 24.

Example 23

Figure 25:
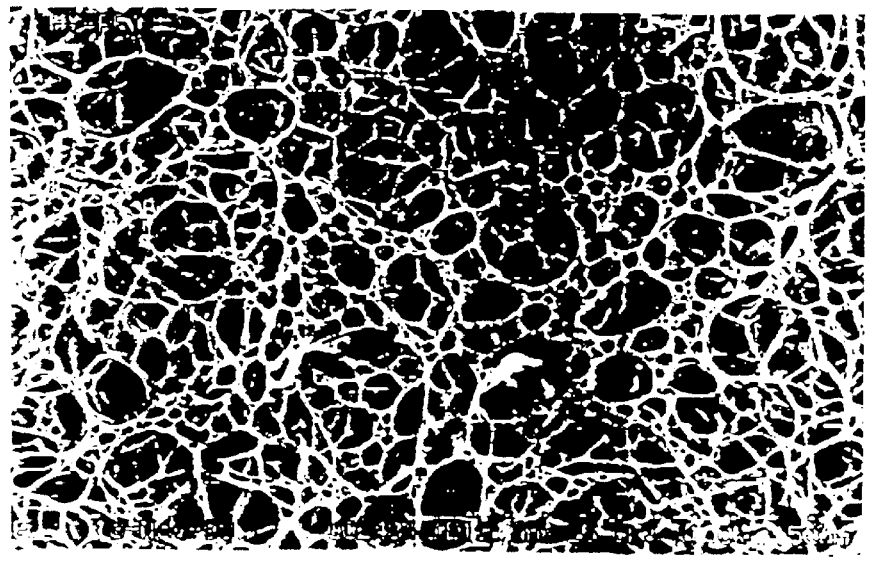
FIG. 25. is an electron photomicrograph (1000 magnifications) of a lower surface (the surface contacting a TPEE elastomer belt) of a porous cross-linked polymer (23) of this invention obtained in Example 23.

A HIPE (1) manufactured in the same manner as in Example 1 was continuously applied to a TPEE elastomer belt (lower sheet) of a horizontally disposed driving and conveying device formed of a resinous endless belt of TPEE elastomer and provided in the opposite ends thereof with gaskets of tubes having a diameter of 5 mm and made of Teflon so as to form a layer 5 mm in thickness by the use of a coater. Then, the layer was overlaid with a PET film (upper sheet). It was passed over a period of 60 minutes through a polymerizing furnace provided with a 90° C. hot air circulation unit for delivering the hot air to the upper PET film and the lower TPEE elastomer belt so as to be polymerized therein. The upper surface of the polymer (23) thus obtained showed no sign of undulation and enjoyed satisfactory smoothness. The electron photomicrographs (1000 magnifications) of the upper surface (the surface held in contact with the PET film) and the lower surface (the surface held in contact with the TPEE elastomer belt) were visually examined to determine the cell structure. The upper and lower surfaces were both found to form open cells of a large degree of aperture. When the polymer (23) was further observed visually to determine the condition of pinholes and voids, it was found to contain an average of 3–4 pinholes or voids not more than 2 mm in diameter per 1 m². The results of the test of the polymer (23) for performance are shown in Table 2 below and the electron photomicrographs of the upper and lower surfaces are shown in FIG. 8 and FIG. 25.

Example 24

Figure 26:
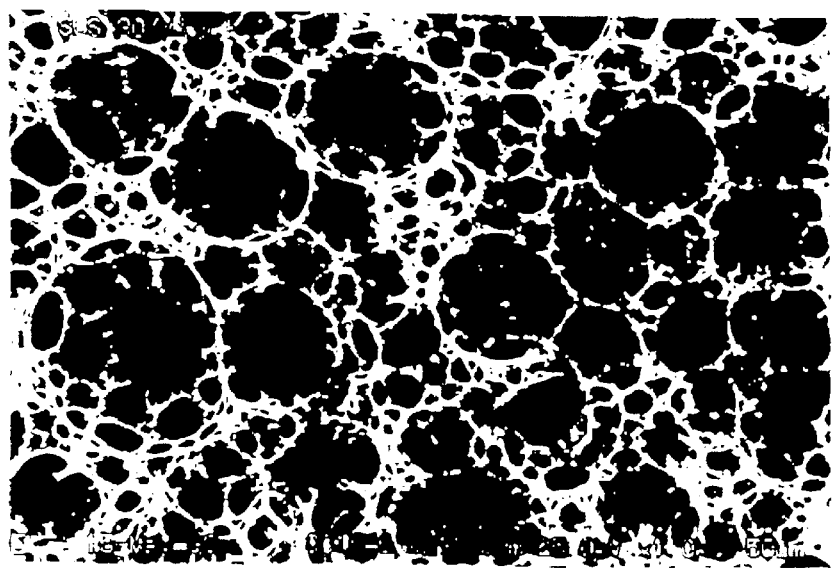
FIG. 26 is an electron photomicrograph (1000 magnifications) of an upper and a lower surface (the surfaces contacting a belt made of SUS 316) of a porous cross-linked polymer (24) of this invention obtained in Example 24.

A HIPE (1) manufactured in the same manner as in Example 1 was continuously applied to a lower endless belt (lower sheet) of SUS 316 of a horizontally disposed driving and conveying device formed of an upper and a lower endless belt made of SUS 316 and provided in the opposite ends thereof 5 with a total of 4 gaskets of square bars tubes having a diameter of 5 mm and made of polytetrafluoroethylene (made by DuPont and sold under the trademark designation of "Teflon") so as to form a layer 5 mm in thickness by the use of a coater. Then, the layer was overlaid with an upper endless belt (upper sheet) made of SUS 316. It was passed over a period of 60 minutes through a polymerizing furnace provided with a 85° C. hot air circulation unit for delivering the hot air to the upper belt of SUS 316 and a 85° C. hot water shower unit for spraying the lower belt of SUS 316 with the hot water. The polymer (24) thus obtained was divided substantially evenly into three parts. The upper and lower surfaces of the polymer (24) consequently obtained had slightly lowered smoothness because of the adhesiveness of the polymer (24) to the belt of SUS 316. The electron photomicrographs (1000 magnifications) of the upper surface (the surface held in contact with the belt of SUS 316) and the lower surface (the surface held in contact with the belt of SUS 316) were visually examined to determine the cell structure. The upper and lower surfaces were both found to form open cells of a large degree of aperture. When the polymer (24) was further observed visually to determine the condition of pinholes and voids, it was found to contain an average of 3–4 pinholes or voids not more than 2 mm in diameter per 1 m². The results of the test of the polymer (23) for performance are shown in Table 2 below and the electron photomicrographs of the upper and lower surfaces are shown in FIG. 8 and FIG. 26.

Example 25

A HIPE (1) manufactured in the same manner as in Example 1 was continuously applied to a lower endless belt (lower sheet) of PET film of a horizontally disposed driving and conveying device formed of an endless belt of PET film as an upper side and a synchronously operating combination of an endless belt of PET film and an endless belt of SUS 316 as a lower side and provided in the opposite ends thereof with gaskets of tubes having a diameter of 5 mm and made of soft vinyl chloride resin so as to form a layer 5 mm in thickness by the use of a coater. Then, the layer was overlaid with an upper endless belt (upper sheet) made of PET film. It was passed over a period of 60 minutes through a polymerizing furnace provided with a 85° C. hot air circulation unit for delivering the hot air to the upper endless belt of PET film and a 85° C. hot water shower unit for spraying the lower belt of SUS 316 with the hot water so as to polymerize therein. The upper surface of the polymer (25) consequently obtained showed no sign of undulation and enjoyed satisfactory smoothness. The electron photomicrographs (1000 magnifications) of the upper surface (the surface held in contact with the PET film) and the lower surface (the surface held in contact with the PET film) were visually examined to determine the cell structure. The upper and lower surfaces were both found to form open cells of a large degree of aperture. When the polymer (25) was further observed visually to determine the condition of pinholes and voids, it was found to contain an average of 3–4 pinholes or voids not more than 2 mm in diameter per 1 m². The results of the test of the polymer (24) for performance are shown in Table 2 below and the electron photomicrographs of the upper and lower surfaces are shown in FIG. 8 and FIG. 8.

Comparative Example 3

A HIPE (1) manufactured in the same manner as in Example 1 was continuously applied to a PET film (lower sheet) of a horizontally disposed driving and conveying device formed of an endless belt of SUS 316 and the PET film and provided in the opposite ends thereof with gaskets of tubes having a diameter of 5 mm and made of soft vinyl chloride resin so as to form a layer 5 mm in thickness by the use of a coater and the upper part of the layer was swept with air so as to give rise to an atmosphere of air thereon. Then, the layer was passed over a period of 60 minutes through a polymerizing furnace provided with a 90° C. air circulation unit for delivering the air to the upper part and a 85° C. hot water shower unit for spraying the lower belt of SUS 316 with the hot water. Since the upper part of the polymer (3) for comparison consequently obtained remained yet to be polymerized and had a sticky surface, the upper surface defied evaluation of the smoothness thereof, the cell structure thereof, and the condition of pinholes and voids thereof. The results of the test of the polymer (3) for performance are shown in Table 2 and the electron photomicrograph (1000 magnifications) of the lower surface is shown in FIG. 8.

as undulation, jogging, and decline of smoothness due to adhesion of extraneous matter.

② Basis of evaluation

The condition of inclusion of surface defects (undulation, jogging, and decline of smoothness due to adhesion of extraneous matter) in each test piece was rated on the four-point scale, wherein:

◎ An average of 5–6 test pieces are free from surface defect and excellent in smoothness ○ An average of 3–4 test pieces are free from surface defect and relatively excellent in smoothness

TABLE 2

| | Method of sealing upper part or material of sheet | Material of lower sheet | Smoothness of upper surface | Cell structure of upper surface | Pinholes or voids | Cell structure of lower surface |
|---|---|---|---|---|---|---|
| Example 5 | Under nitrogen atmosphere | PET film/SUS316 belt | Δ Undulation | Δ | Δ | ◎ |
| Example 6 | Sealed with water layer | PET film/SUS316 belt | Δ Undulation | Δ | ○ | ◎ |
| Example 7 | PP film | PP film/SUS316 belt | ◎ | Δ | ◎ | Δ |
| Example 8 | PET film | PET film/SUS316 belt | ◎ | ◎ | ○ | ◎ |
| Example 9 | PBT film | PBT film/SUS316 belt | ◎ | ◎ | ○ | ◎ |
| Example 10 | PEN film | PEN film/SUS316 belt | ◎ | ○ | ○ | ○ |
| Example 11 | Non-woven fabric of long PET fibers: gas permeability 33 | PET film/SUS316 belt | Δ Undulating surface | ○ | ◎ | ◎ |
| Example 12 | Woven fabric of PET: gas permeability 0.5 | PET film/SUS316 belt | Δ Undulating surface | ○ | ◎ | ◎ |
| Example 13 | Porous film of PTFE: gas permeability 0.04 | PET film/SUS316 belt | ○ | ◎ | ◎ | ◎ |
| Example 14 | PFA film | PFA film/(silicone type tackifier) SUS316 belt | ◎ | ○ | ○ | ○ |
| Example 15 | FEP film | FEP film/(epoxy type adhesive agent) SUS316 belt | ◎ | ◎ | ○ | ◎ |
| Example 16 | PET film coated with silicon resin | PET film coated silicon resin/SUS316 belt | ◎ | ◎ | ◎ | ◎ |
| Example 17 | PI film | PI film/SUS band-shaped plate | ◎ | ○ | ◎ | ○ |
| Example 18 | PSF film | PSF film/SUS band-shaped plate | ◎ | ◎ | ○ | ◎ |
| Example 19 | PPS film | PPS film/SUS band-shaped plate | ◎ | ○ | ◎ | ○ |
| Example 20 | PES film | PES film/SUS band-shaped plate | ◎ | ○ | ○ | ◎ |
| Example 21 | PEI film | PEI film/SUS band-shaped plate | ◎ | ◎ | ○ | ◎ |
| Example 22 | PEEK film | PEEK film/SUS band-shaped plate | ◎ | ◎ | ○ | ◎ |
| Example 23 | PET film | Resin belt made of TPEE elastomer | ◎ | ◎ | ○ | ○ |
| Example 24 | SUS316 belt | SUS316 belt | Δ Adhesiveness | ◎ | ○ | ◎ |
| Example 25 | Belt made of PET film | Combination of belt made of PET film and SUS316 belt | ◎ | ◎ | ○ | ◎ |
| Comparative Example 3 | Air atmosphere | PET film/SUS316 belt | No evaluation available because of inclination of upper part toward no polymerization | | | ◎ |

Regarding the items of smoothness of upper surface, cell structures of upper and lower surfaces, and pinholes and voids shown in Table 2 above, the methods for testing and the bases for evaluation used therefore will be described below.

(1) Smoothness of upper surface

① Testing method

From a given polymer, six test pieces measuring 1×1 m were cut and these test pieces were visually examined to determine the degree of occurrence of such surface defects Δ An average of 1–2 test pieces are free from surface defect but are wholly deficient in smoothness X All six test pieces show sign of surface defect and conspicuous decline of smoothness (2) Pinholes or voids ① Testing method From a given polymer, three test pieces measuring 1×1 m were cut. Pinholes or voids found with slide calipers to measure not more than 2 mm on all the test pieces (upper and lower surfaces) are reckoned. The number of test pieces containing such pinholes or voids is used to calculate the average per 1 m² of the given polymer. The reason for the specification "not more than 2 mm" is that a pinhole or void exceeding 2 mm is so conspicuous for a defect as to lower the value of utility of the polymer as a product. The size beyond this upper limit is excluded from the criterion for the evaluation of interest because this invention is incapable of producing such a serious defect.

② Criterion for evaluation

The number test pieces containing pinholes or voids 2 mm in diameter per 1 m² is rated on the four-point scale, wherein ⊚ An average of 0–2 defects are contained ○ An average of 3–4 defects are contained Δ An average of 5–6 defects are contained X An average of not less than 7 defects are contained (3) Cell structure ① Testing method From a given polymer, test pieces measuring 2 cm in diameter are cut. They are washed with water and drained thoroughly. Subsequently, their surface parts are treated for electron photomicrography and photographed thereby at 1000 magnifications. The electron photomicrographs so obtained are visually examined to determine the conditions of the cell structure such as the magnitude of pore diameter of the cell structure, the clogging of the cell structure, and the wall thickness of the cell structure.

② Criterion for evaluation

The conditions of the cell structure such as the size of pore diameter, the thickness of wall, and the phenomenon of clogging are rated on the four-point scale, wherein ⊚ The pore diameters are large and uniform, the wall is not unduly thick, and such defects as clogging are nearly absent ○ Any of the defects such as the size of pore diameter, the thickness of wall, and the phenomenon of clogging is slightly recognized Δ Such defects as the size of pore diameter, the thickness of wall, and the phenomenon of clogging are recognized X Such defects as the size of pore diameter, the thickness of wall, and the phenomenon of clogging are conspicuous and the cell structure is not satisfactory

Example 26

A HIPE (1) manufactured in the same manner as in Example 1 was continuously applied to a PET film (lower sheet) of a horizontally disposed driving and conveying device formed of an endless steel belt and the PET film and provided in the opposite ends thereof with gaskets of tubes having a diameter of 10 mm and made of soft vinyl chloride resin so as to form a layer by the use of a coater. Then, the layer was overlaid with the PET film (upper sheet). It was passed over a period of 60 minutes through a polymerizing furnace provided with a 85° C. hot air circulation unit for delivering the hot air to the upper PET film and a 85° C. hot water shower unit for spraying the lower steel belt with the hot water so as to be polymerized therein. Consequently, a polymer sheet about 10 mm in thickness was obtained. Subsequently, the polymer sheet was continuously sliced at a slicing speed of 1.0 m/minute into an upper and a lower leaf with a horizontal endless band knife adapted to be conveyed by a belt conveyor and furnished with an upper and a lower guide constructed as illustrated in FIG. 4. The two leaves consequently obtained were both free from fold or crack. The upper and lower leaves had thicknesses both in the range of 5±0.2 mm. The results of the test for performance are shown in Table 3 below.

Example 27

A HIPE (1) manufactured in the same manner as in Example 1 was continuously applied to a PET film (lower sheet) of a horizontally disposed driving and conveying device formed of an endless steel belt and the PET film and provided in the opposite ends thereof with gaskets of tubes having a diameter of 10 mm and made of Teflon so as to form a layer by the use of a coater. Then, the layer was overlaid with the PET film (upper sheet). It was passed over a period of 10 minutes through a polymerizing furnace provided with a 95° C. hot air circulation unit for delivering the hot air to the upper PET film and a 95° C. hot water shower unit for spraying the lower steel belt with the hot water so as to be polymerized therein. Consequently, a polymer sheet about 10 mm in thickness was obtained. Subsequently, the polymer sheet was continuously sliced at a slicing speed of 1.0 m/minute into an upper and a lower leaf with a horizontal endless band knife adapted to be conveyed by a belt conveyor and furnished with an upper and a lower guide constructed as illustrated in FIG. 4. The two leaves consequently obtained were both free from fold or crack. The upper and lower leaves had thicknesses both in the range of 5±0.3 mm. The results of the test for performance are shown in Table 3 below.

Example 28

A HIPE (1) manufactured in the same manner as in Example 1 was continuously applied to a PET film (lower sheet) of a horizontally disposed driving and conveying device formed of a jacketed band-shaped steel plate and the PET film and provided in the opposite ends thereof with gaskets of tubes having a diameter of 10 mm and made of Teflon so as to form a layer by the use of a coater. Then, the layer was overlaid with a PET film (upper sheet). It was passed over a period of 60 minutes through a polymerizing furnace provided with a 85° C. hot air circulation unit for delivering the hot air to the upper PET film and a 85° C. hot water supply unit for spraying the lower jacketed band-shaped plate with the hot water so as to be polymerized therein. Consequently, a polymer sheet about 10 mm in thickness was obtained. Subsequently, the polymer sheet was continuously sliced at a slicing speed of 1.0 rm/minute into an upper and a lower leaf with a horizontal endless band knife adapted to be conveyed by a belt conveyor and furnished with an upper and a lower guide constructed as illustrated in FIG. 4. The two leaves consequently obtained were both free from fold or crack. The upper and lower leaves had thicknesses both in the range of 5±0.3 mm. The results of the test for performance are shown in Table 3 below.

Example 29

A HIPE (1) manufactured in the same manner as in Example 1 was continuously applied to a PET film (lower sheet) of a horizontally disposed driving and conveying device formed of an endless steel belt and the PET film and provided in the opposite ends thereof with gaskets of tubes having a diameter of 10 mm and made of Teflon so as to form a layer by the use of a coater. Then, the layer was overlaid with a PET film (upper sheet). It was passed over a period of 10 minutes through a polymerizing furnace provided with a 95° C. hot air circulation unit for delivering the hot air to the upper PET film and a 95° C. hot water shower unit for spraying the lower steel belt with the hot water so as to be polymerized therein. Consequently, a polymer sheet about 10 mm in thickness was obtained. Subsequently, the polymer sheet was continuously sliced at a slicing speed of 30.0 m/minute into an upper and a lower leaf with a horizontal endless band knife adapted to be conveyed by a belt conveyor and furnished with an upper and a lower guide constructed as illustrated in FIG. 5. The two leaves consequently obtained were both free from fold or crack. The upper and lower leaves had thicknesses both in the range of 5±0.5 mm. The results of the test for performance are shown in Table 3 below.

Example 30

A HIPE (1) manufactured in the same manner as in Example 1 was continuously applied to a PET film (lower sheet) of a horizontally disposed driving and conveying device formed of an endless steel belt and the PET film and provided in the opposite ends thereof with gaskets of tubes having a diameter of 10 mm and made of Teflon so as to form a layer by the use of a coater. Then, the layer was overlaid with a PET film (upper sheet). It was passed over a period of 60 minutes through a polymerizing furnace provided with a 85° C. hot air circulation unit for delivering the hot air to the upper PET film and a 85° C. hot water shower unit for spraying the lower steel belt with the hot water so as to be polymerized therein. Consequently, a polymer sheet about 15 mm in thickness was obtained. Subsequently, the polymer sheet was continuously sliced at a slicing speed of 1.0 m/minute into an upper leaf 5 mm in thickness and a lower leaf 10 mm in thickness with a horizontal endless band knife adapted to be conveyed by a belt conveyor and furnished with an upper and a lower guide constructed as illustrated in FIG. 4. The two leaves consequently obtained were each conveyed by a belt conveyor. Subsequently, the lower polymer sheet 10 mm in thickness was continuously sliced at a slicing speed of 1.0 m/minute into two leaves each 5 mm in thickness with a horizontal endless band knife 2 fitted with an upper and a lower guide constructed as illustrated in FIG. 4. The three leaves resulting from the slicing were invariably free from fold or crack. The three leaves had thicknesses invariably falling in the range of 5±0.2 mm. The results of test for performance are shown in Table 3 below.

Example 31

A HIPE (1) manufactured in the same manner as in Example 1 was continuously applied to a PET film (lower sheet) of a horizontally disposed driving and conveying device formed of an endless steel belt and the PET film and provided in the opposite ends thereof with gaskets of tubes having a diameter of 20 mm and made of Teflon so as to form a layer by the use of a coater. Then, the layer was overlaid with a PET film (upper sheet). It was passed over a period of 60 minutes through a polymerizing furnace provided with a 85° C. hot air circulation unit for delivering the hot air to the upper PET film and a 85° C. hot water shower unit for spraying the lower steel belt with the hot water so as to be polymerized therein. Consequently, a polymer sheet about 20 mm in thickness was obtained. Subsequently, the polymer sheet was continuously sliced at a slicing speed of 1.0 m/minute into an upper leaf 5 mm in thickness and a lower leaf 15 mm in thickness with a horizontal endless band knife 1 adapted to be conveyed by a belt conveyor and furnished with an upper and a lower guide constructed as illustrated in FIG. 4. The two leaves consequently obtained were each conveyed by a belt conveyor. Subsequently, the lower polymer sheet 15 mm in thickness was continuously sliced at a slicing speed of 1.0 m/minute into an upper leave 5 mm in thickness and a lower leaf 10 mm in thickness with a horizontal endless band knife 2 fitted with an upper and a lower guide constructed as illustrated in FIG. 4. The two leaves resulting from the slicing were each conveyed with a belt conveyor. The lower polymer sheet 10 mm in thickness was continuously sliced at a slicing speed of 1.0 m/minute into two leaves each 5 mm in thickness with a horizontal endless band knife 3 fitted with an upper and a lower guide constructed as illustrated in FIG. 4. The four leaves obtained by the slicing operation were invariably free from fold or crack. The four leaves had thicknesses invariably falling in the range of 5±0.2 mm. The results of the test for performance are shown in Table 3 below.

Comparative Example 4

A HIPE (1) manufactured in the same manner as in Example 1 was continuously applied to a PET film (lower sheet) of a horizontally disposed driving and conveying device formed of an endless steel belt and the PET film and provided in the opposite ends thereof with gaskets of tubes having a diameter of 10 mm and made of soft vinyl chloride resin so as to form a layer by the use of a coater. Then, the layer was overlaid with a PET film (upper sheet). It was passed over a period of 60 minutes through a polymerizing furnace provided with a 85° C. hot air circulation unit for delivering the hot air to the upper PET film and a 85° C. hot water shower unit for spraying the lower steel belt with the hot water so as to be polymerized therein. Consequently, a polymer sheet about 10 mm in thickness was obtained. Subsequently, the polymer sheet was continuously sliced at a slicing speed of 1.0 m/minute into an upper and a lower leaf with a horizontal endless band knife adapted to be conveyed by a belt conveyor and furnished with an upper and a lower guide constructed as illustrated in FIG. 6. The upper leaf incurred folds and cracks and the lower leaf was free from fold or crack. The thickness of the lower leaf was in the range of 5±0.2 mm. The results of the test for performance are shown in Table 3 below.

TABLE 3

|  | Thickness of polymer sheet (mm) | Structure of upper and lower guides | Slicing speed (m/min) | Slicing property and fold crack in polymer sheet | Accuracy of thickness of sliced leaf (mm) |
|---|---|---|---|---|---|
| Example 26 | 10 | FIG. 4 | 1 | Two leaves posing no problem | 5 ± 0.2 |
| Example 27 | 10 | FIG. 4 | 10 | Two leaves posing no problem | 5 ± 0.3 |
| Example 28 | 10 | FIG. 4 | 1 | Two leaves posing no problem | 5 ± 0.3 |
| Example 29 | 10 | FIG. 5 | 25 | Two leaves posing no problem | 5 ± 0.5 |

TABLE 3-continued

|  | Thickness of polymer sheet (mm) | Structure of upper and lower guides | Slicing speed (m/min) | Slicing property and fold crack in polymer sheet | Accuracy of thickness of sliced leaf (mm) |
|---|---|---|---|---|---|
| Example 30 | 15 | FIG. 4 | 1 | Three leaves posing no problem, two-stage slicing | 5 ± 0.2 |
| Example 31 | 20 | FIG. 4 | 1 | Four leaves posing no problem, three-stage slicing | 5 ± 0.2 |
| Comparative Example 4 | 10 | FIG. 6 | 1 | Upper: clear sign of fold and crack<br>Lower: No problem | 5 ± 0.2 |

Example 32

A cylindrical container was charged with 2.13 mass parts of 2-ethylhexyl acrylate, 1.28 mass parts of 55% divinylbenzene (p-ethyl-vinylbenzene as other component), and 0.27 mass part of diglycerol monooleate to form an oil phase. A water phase was prepared by mixing 10 mass parts of calcium chloride, 230 mass parts of purified water, and 0.125 mass part of t-butyl hydroperoxide (made by Nippon Oils & Fats Co., Ltd. and sold under the trademark designation of "Perbutyl H-69") and stirring them till uniform solution and then kept at 40° C. The oil phase was kept stirred and the water phase was added thereto at a uniform speed over a period of about 5 minutes. The resultant mixture was confirmed to have assumed the constitution of yogurt, a definite sign of the formation of an excellent water-in-oil type high internal phase emulsion. This mixture and a solution obtained by dissolving 0.125 mass part of formaldehyde sodium sulfoxylate (made by Mitsubishi Gas Chemical K.K. and sold under the trademark designation of "Superite C") in 10 mass parts of purified water were thoroughly stirred together to obtain a HIPE (W/O ratio= 67.9).

The HIPE thus obtained was cast into a retaining mold formed by opposing two stainless steel plates (10 cm×10 cm) across an interspace adjusted to 5 mm till it filled the empty spaces The retaining mold filled with the HIPE was retained at 65° C. and the HIPE therein was allowed to polymerize and harden for 1.5 hours. Thus the polymerization was completed.

The cured polymer was removed from the retaining mold (polymerization vessel), drained, and dried with a hot air drier for three hours to obtain a porous cross-linked polymer of the shape of a sheet possessed of open cells as aimed at by the present example (porous cross-linked polymer sheet (32)). The polymer sheet (32) thus obtained was tested for performance. The results are shown in Table 5 below. The electron photomicrograph of the polymer sheet (32) was substantially identical with FIG. 26, showing that open cells were formed in the surface and in the interior as well.

Example 33

A porous cross-linked polymer sheet (33) was obtained by using the same HIPE as used in Example 32 and following the procedure of Example 32 while forming the retaining mold with metal plates coated with a fluorine resin (tetrafluoroethylene-hexafluoroproplylene copolymer). The polymer sheet (33) thus obtained was tested for performance. The results are shown in Table 5 below. The electron photomicrograph of the polymer sheet (32) was substantially identical with FIG. 26, indicating that open cells were formed in the surface and in the interior as well.

Examples 34 and 35

Figure 27:
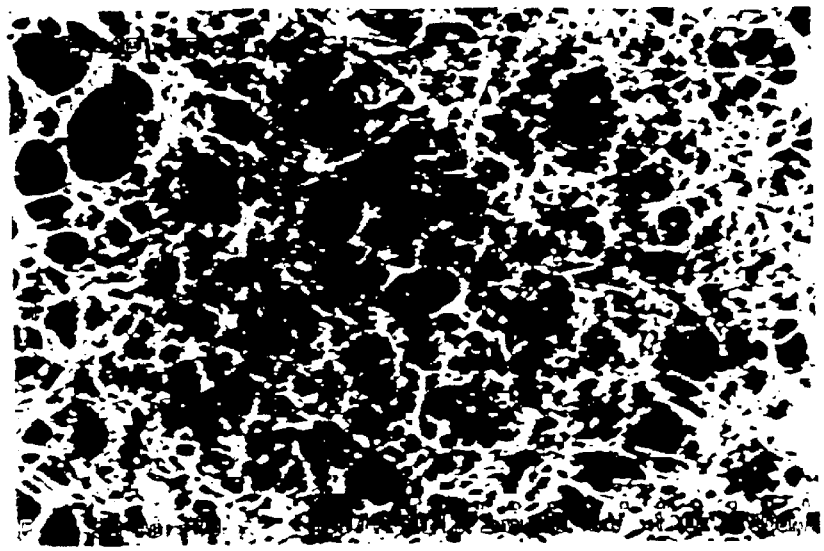
FIG. 27 is an electron photomicrograph (1000 magnifications) of the surface (the surface contacting polyimide (NPI), a material for the frame of a polymerization vessel) of a porous cross-linked polymer (34) of this invention obtained in Example 34.

Porous cross-linked polymer sheets (34) and (35) were obtained by following the procedure of Example 32 while using the materials shown in Table 4 below for the retaining mold. The electron photomicrograph of the surface of the polymer sheet (34) is shown in FIG. 27. Further, the surface of the porous cross-linked polymer sheet (35) was found to be very similar to that shown in FIG. 19. It is noted from these results that in the polymer sheets (34) and (35) of the present examples, open cells were formed in the surface and in the interior as well.

TABLE 4

|  | Drawing No. | Material for retaining mold |
|---|---|---|
| Example 34 | 27 | Polyimide (NPI) |

Comparative Example 5

A porous cross-linked polymer sheet (5) for comparison was obtained by repeating the procedure of Example 32 while using polypropylene as the material for the retaining mold. The porous cross-linked polymer sheet (5) for comparison was tested for performance. The results are shown in Table 5 below. The electron photomicrograph of the surface was substantially identical with FIG. 10. It is noted from this electron photomicrograph that the degree of aperture in the surface was not sufficient.

Comparative Example 6

Figure 28:
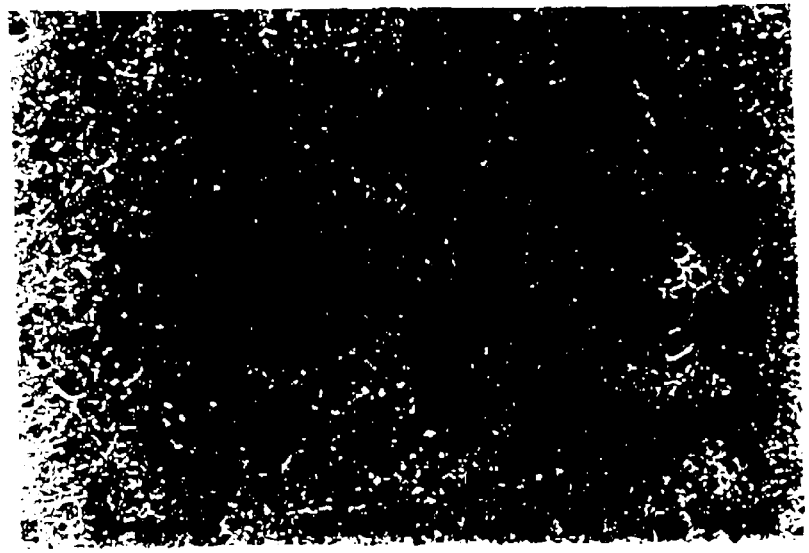
FIG. 28 is an electron photomicrograph (1000 magnifications) of the surface (the surface contacting polyvinyl chloride, a material for the frame of a polymerization vessel) of a porous cross-linked polymer for comparison (6) of this invention obtained in Comparative Example 6.

A porous cross-linked polymer sheet (6) for comparison was obtained by repeating the procedure of Example 32 while using polyvinyl chloride as the material for the retaining mold. The porous cross-linked polymer sheet (6) for comparison was tested for performance. The results are shown in Table 5below. The electron photomicrograph of the surface is shown in FIG. 28. It is noted from FIG. 28 that the surface of the porous cross-linked polymer sheet (6) for comparison of the present comparative example had no sufficient degree of aperture and was found to be in a clogged state.

Comparative Example 7

Figure 29:
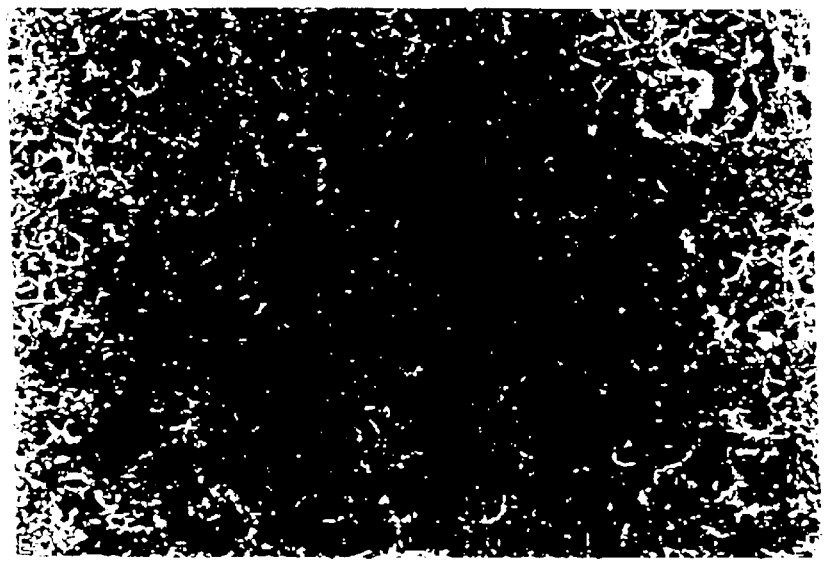
FIG. 29 is an electron photomicrograph (1000 magnifications) of the surface (the surface contacting polyethylene, a material for the frame of a polymerization vessel) of a porous cross-linked polymer for comparison (7) of this invention obtained in Comparative Example 7.

A porous cross-linked polymer sheet (7) for comparison was obtained by repeating the procedure of Example 32 while using polyethylene as the material for the retaining mold. The porous cross-linked polymer sheet (7) for comparison was tested for performance. The results are shown in Table 5 below. The electron photomicrograph of the surface is shown in FIG. 29. It is noted from FIG. 29 that the surface of the porous cross-linked polymer sheet (7) for comparison of the present comparative example had no sufficient degree of aperture and was found to be in a clogged state.

TABLE 5

| Example | Porous cross-linked polymer | Liquid passing speed (cc/sec) |
|---|---|---|
| Example 32 | Porous cross-linked polymer sheet (32) | 0.65 |
| Example 33 | Porous cross-linked polymer sheet (33) | 0.63 |
| Comparative Example 5 | Porous cross-linked polymer sheet (5) for comparison | 0.18 |
| Comparative Example 6 | Porous cross-linked polymer sheet (6) for comparison | 0.28 |
| Comparative Example | Porous cross-linked polymer sheet (7) for comparison | 0.14 |

Example 36

Seven sheet materials selected as the material to be used in the part of the polymerizing device of this invention which was fated to contact the HIPE were tested for resistance to a hot aqueous calcium chloride solution and to a HIPE. A sheet made of PET which is reported to form open cells in the prior literature was subjected to the same test for comparison. The results are shown in Table 6 below.

Testing condition: Samples of a given sheet, after being immersed in an aqueous 4% calcium chloride solution (pH about 9.5) at 120° C. for 8 days and in the HIPE at 95° C. for 30 days, were tested for change of tensile strength by aging.

TABLE 6

| | Strength retaining ratio (%) | |
|---|---|---|
| Sheet material | Aq. calcium chloride solution | HIPE |
| Polyphenylens sulfide | 100 | 89 |
| Polyimide (NPI) | 97 | Grew friable |
| Polyimide (AH) | 100 | Grew friable |
| Polyether ether ketone | 100 | — |
| Polyether sulfone | 80 | — |
| Polyeter imide | 100 | — |
| Polyethylene naphthalate | Grew friable | 85 |
| PET | Failed to retain the shape of sheet | Failed to retain the shape of sheet |

The PET, as described in the preceding examples, is a useful material as an oxygen intercepting film for use in continuous polymerization. From the results of Table 6, however, it is noted that the PET dictates attention because it offers no sufficient durability in such a harsh environment as under the testing conditions of the present example and ought to be used exclusively for a brief period incapable of inducing such trouble as rupture or under mild conditions. The materials cited as preferred examples in this invention have been demonstrated to excel the PET in durability.

Industrial Applicability

The method for the production of a porous cross-linked polymer contemplated by this invention is enabled to solve the numerous technical problems arising from the method for combination continuous and batch polymerization disclosed in the official gazette of WO-A-97-27240 by continuously performing a process from a step of supplying an emulsion through a step of polymerizing the emulsion while keeping the outer surface part of the emulsion under an atmosphere having a lower oxygen content than the ambient air by the use of means for decreasing an oxygen content. It can also solve the new technical problems arising from continuously performing the process from the step of supplying the emulsion through the step of polymerizing the emulsion. Specifically, it can solve such problems as the occurrence of pinholes and voids in the unhardened part peculiar to the surface part, depending on conditions, in spite of the use of prescribed polymerization conditions for the HIPE and the inevitable restriction of the range of applications due to the failure to impart a structure of open cells to the surface layer part, i.e. the new technical problems arising from continuously performing the process from the step of supplying the emulsion through the step of polymerizing the emulsion. It can freely control the surface properties of the outer surface part of the produced porous cross-linked polymer, freely control the width (W) and the thickness (T), design the polymer endowed with the optimum properties to suit the purpose of a varying use, complete very rapidly the operation of continuously performing a process from a step of supplying the HIPE through a step of polymerizing the HIPE, and allow production of the polymer in a required amount at a required time as in the case of the operation called "just-in-time system." The performance and the quality are dispersed only sparingly within one lot of products and among different lots of product. The method of this invention permits a porous cross-linked polymer of high quality and high performance to be mass-produced stably. It is enabled to cope with the large-variety small-quantity production by suitably replacing the means for decreasing an oxygen content such as, for example, a roll for taking up a sheet material or by suitably altering the composition of the HIPE.

Further, this invention, by continuously slicing the porous cross-linked polymer after the polymerization (by continuously transferring this polymer onto the supporting member of a conveying device connected to the conveying device and conveying it as retained in a stabilized state), enables the porous cross-linked polymer which is friable because of a large water content and liable to sustain a fold or a crack to be fabricated into leaves of an expected thickness without impairing the porous cross-linked structure of the sliced surface. Thus, the productivity of the porous cross-linked polymer obtained by the horizontal polymerization mentioned above can be further exalted.

Further, by the method of production according to this invention, the porous cross-linked polymer excelling in physical properties, manifesting liquid permeability, gas permeability, and ability to absorb energy such as heat and sound satisfactorily, and containing open cells in the surface and in the interior thereof can be easily manufactured without imposing any restriction on the composition of the HIPE and the conditions of polymerization. As a result, this method eliminates the need for stripping the produced porous cross-linked polymer of the skin layer on the surface and enhances the yield of product. It also enjoys a great effect in decreasing the cost of production because the durability (such as the strength retention ratio) of the polymerization device, particularly the part thereof fated to contact the HIPE, is exalted conspicuously.

The entire disclosure of Japanese Patent Application Nos. 11-254063 and 11-314397 filed on Sep. 8, 1999 and Nov. 4, 1999 including specification, claims, drawings and summary are incorporated herein by reference in its entirety.

What is claimed is:

1. A method for the production of a porous cross-linked polymer by the polymerization of a water-in-oil type high internal phase emulsion, characterized by causing the outer surface part of said emulsion by means for decreasing an oxygen content to assume an atmosphere or a state having a lower oxygen content than an ambient air and performing continuously a process ranging from a step of supplying said emulsion through a step of polymerizing said emulsion.

2. A method for the production of a porous cross-linked polymer according to claim 1, wherein said means for decreasing the oxygen content of the outer surface part of the emulsion comprises at least one member selected from the group consisting of:

(A) a means for decreasing an oxygen content by using a gas which represses or prevents the contact of the ambient air with said emulsion by replacing a part or whole of the ambient air contacting with the outer surface part of said emulsion with a gas having a lower oxygen content than the ambient air;

(B) a means for decreasing an oxygen content by using a liquid which represses or prevents the contact of the ambient air with said emulsion by forming a liquid layer or a liquid film on the outer surface part of said emulsion with a liquid exerting no influence on the polymerization; and (C) a means for decreasing an oxygen content by using a sheet which represses or prevents the contact of the ambient air with said emulsion by forming a sheet layer on the outer surface part of said emulsion with a sheet capable of decreasing or nullifying the oxygen-contacting content.

3. A method according to claim 2, wherein the gas permeability of said sheet layer formed on the outer surface part of said emulsion as the means for decreasing an oxygen content by using a sheet set forth in said means (C) is not more than 100 $cm^3/cm^2 \cdot s$.

4. A method according to claim 2, wherein said sheet to be used for the outer surface part of said emulsion as the means for decreasing an oxygen content by using a sheet set forth in said means (C) is one member or a combination of two or more members selected from the group consisting of ① at least one sheet material selected from the group consisting of a film, a non-woven fabric and a woven fabric, ② an endless belt and/or a band-shaped plate made of a metal and/or a resin, ③ an endless belt and/or a band-shaped plate made of a metal and using said sheet material on the surface thereof destined to contact with the outer surface part of said emulsion, and ④ an endless belt and/or a band-shaped plate made of a resin and using said sheet material on the surface thereof destined to contact with the outer surface part of said emulsion.

5. A method according to claim 2, wherein said sheet is formed of at least one material selected from the group (I) consisting of a fluorine resin, a silicone resin, heat-resistant resins, thermoplastic polyester resins, and thermoplastic polyester type elastomer resins, and/or is coated with at least one material selected from said group (I).

6. A method for the production of a porous cross-linked polymer having continuous open cells by the polymerization of a water-in-oil type high internal phase emulsion, characterized by the fact that the part of a polymerizing device contacting with the water-in-oil type high internal phase emulsion is made of at least one material selected from the group consisting of a fluorine resin, a silicone resin, polyimide, polyphenylene sulfide, polysulfone, polyether sulfone, polyether imide, polyether ether ketone, polybutylene terephthalate, polyethylene naphthalate, polybutylene naphthalate, polycyclohexane terephthalate, and stainless steel and/or is coated with at least one material selected from said group.

7. A method according to claim 6, wherein the monomer composition contained in said water-in-oil type high internal phase emulsion contains a (meth)acrylic ester as an essential component.

8. A method according to claim 2, wherein said sheet is formed of at least one material selected from the group (II) consisting of a fluorine resin, a silicone resin, polyimide, polyphenylene sulfide, polysulfone, polyether sulfone, polyether imide, polyether ether ketone, polybutylene terephthalate, polyethylene naphthalate, polybutylene naphthalate, polycyclohexane terephthalate, and stainless steel or is coated with at least one material selected from said group (II).

9. A method according to claim 1, wherein a process ranging from a step of supplying said emulsion through a step of polymerizing said emulsion is continuously carried out by the horizontal (transverse) method.

10. A method according to claim 2, wherein said means for decreasing an oxygen content by using a sheet set forth in said means (C) is characterized by the facts that:

(1) said sheet to be used on the outer surface part of said emulsion is one member or a combination of two or more members selected from the group consisting of ① endless belts and ② endless belts made of a metal or a resin and using said sheet material on the surface thereof contacting with the outer surface part of said emulsion and (2) said endless belt has the temperature thereof adjusted with a hot water shower.

11. A method according to claim 1, which further comprises continuously slicing said porous cross-linked polymer obtained by polymerization.

* * * * *